US011892097B2

(12) United States Patent
Inoue et al.

(10) Patent No.: US 11,892,097 B2
(45) Date of Patent: Feb. 6, 2024

(54) VALVE STATE GRASPING SYSTEM USING MOTION SENSOR FIXED TO VALVE STEM

(71) Applicant: KITZ CORPORATION, Chiba (JP)

(72) Inventors: Yu Inoue, Nagano (JP); Isao Nishizawa, Chiba (JP)

(73) Assignee: KITZ CORPORATION, Chiba (JP)

( * ) Notice: Subject to any disclaimer, the term of this patent is extended or adjusted under 35 U.S.C. 154(b) by 0 days.

(21) Appl. No.: 18/102,957

(22) Filed: Jan. 30, 2023

(65) Prior Publication Data

US 2023/0194016 A1 Jun. 22, 2023

Related U.S. Application Data

(62) Division of application No. 15/734,673, filed as application No. PCT/JP2019/022649 on Jun. 6, 2019.

(30) Foreign Application Priority Data

Jun. 6, 2018 (JP) ................................ 2018-109083

(51) Int. Cl.
*F16K 37/00* (2006.01)
*G05B 23/02* (2006.01)

(52) U.S. Cl.
CPC ...... *F16K 37/0025* (2013.01); *F16K 37/0041* (2013.01); *G05B 23/02* (2013.01); *G05B 23/0283* (2013.01)

(58) Field of Classification Search
None
See application file for complete search history.

(56) References Cited

U.S. PATENT DOCUMENTS

| 5,487,302 A | 1/1996 | Casada et al. |
| 5,887,608 A | 3/1999 | Bordelon |

(Continued)

FOREIGN PATENT DOCUMENTS

| CN | 204284634 | 4/2015 |
| DE | 10 2008 064 359 | 7/2010 |

(Continued)

OTHER PUBLICATIONS

International Search Report dated Sep. 3, 2019 in International (PCT) Application No. PCT/JP2019/022649.

(Continued)

*Primary Examiner* — Bernard G Lindsay
(74) *Attorney, Agent, or Firm* — Wenderoth, Lind & Ponack, L.L.P.

(57) ABSTRACT

The present invention is to provide a valve state grasping system that can be easily retrofitted to any of various existing or operating valves (rotary valves) and actuators, and in particular, even facilities to which commercial power is not supplied, and allows detailed and accurate state grasping and diagnosis or failure prediction for the valve or actuator. The valve state grasping system is configured to perform, based on angular velocity data of a valve stem which opens and closes the valve, state monitoring, diagnosis, and life prediction of this valve. To the valve stem, a monitoring unit having at least a semiconductor-type gyro sensor is attachably and detachably fixed. The angular velocity data includes angular velocity data acquired from this monitoring unit in accordance with a rotational motion of a valve body from being fully open or fully closed to fully closed or fully open.

3 Claims, 28 Drawing Sheets

(56) References Cited

U.S. PATENT DOCUMENTS

| | | | |
|---|---|---|---|
| 7,478,012 B2 | 1/2009 | Tewes et al. | |
| 8,841,762 B2 | 9/2014 | Koyama | |
| 2006/0146469 A1* | 7/2006 | Heagerty | H04Q 9/00 |
| | | | 361/115 |
| 2008/0156121 A1 | 7/2008 | Radomsky | |
| 2010/0179697 A1 | 7/2010 | Stelter et al. | |
| 2010/0305874 A1 | 12/2010 | Meier et al. | |
| 2011/0083746 A1* | 4/2011 | Hoang | F16K 37/0091 |
| | | | 137/511 |
| 2013/0019683 A1* | 1/2013 | Carder | F16K 37/0083 |
| | | | 73/632 |
| 2015/0088434 A1 | 3/2015 | Grabau et al. | |
| 2015/0108381 A1 | 4/2015 | Paden | |
| 2015/0142340 A1 | 5/2015 | Radomsky et al. | |

FOREIGN PATENT DOCUMENTS

| | | |
|---|---|---|
| JP | 2009-543194 | 12/2009 |
| JP | 4990338 | 8/2012 |
| JP | 2012-241768 | 12/2012 |
| JP | 2015-94587 | 5/2015 |
| JP | 2015-528085 | 9/2015 |
| WO | 2008/078323 | 7/2008 |
| WO | 2015/001548 | 1/2015 |
| WO | 2016/139376 | 9/2016 |
| WO | 2018/080865 | 5/2018 |
| WO | 2018/080867 | 5/2018 |

OTHER PUBLICATIONS

Spanish Search Report dated Apr. 7, 2021 in corresponding Spanish Application No. 202090061.
German Office Action dated Aug. 3, 2022 in German Application No. 11 2019 002 316.0 with English translation.
Chinese Office Action dated Aug. 19, 2022 in Chinese Application No. 201980037679.2 with English translation.
Barshan et al. "Evaluation of a Solid-State Gyroscope for Robotics Applications" IEEE Transactions on Instrumentation and Measurement, vol. 44. No. 1, Feb. 1994.

* cited by examiner

VALVE STATE GRASPING SYSTEM USING MOTION SENSOR FIXED TO VALVE STEM

TECHNICAL FIELD

The present invention relates to valve state grasping systems and, in particular, to a state grasping system for a rotary valve such as a ball valve.

BACKGROUND ART

Generally, in various locations including large-sized facilities such as various plants and buildings or small-sized facilities such as houses and shops, various plumbing facilities including various pipes and valves and, furthermore, various actuators for automatic control of these valves are provided. In these plumbing facilities, for example, among rotary valves such as ball valves and butterfly valves, those of a 90-degree rotation-type (quarter-turn type) are highly demanded. Also, as actuators for driving these, pneumatic actuators are often mounted, which are simple in structure, easily downsized, and also excellent in cost.

Normally, in these plumbing facilities, for automatic control of devices and the like such as the valves and the actuators and management and maintenance of the operating situation, means for monitoring the state of these devices and the like via some mechanical or artificial means are required. Furthermore, in recent years, shortage of skilled human resources and shortage of technological inheritance are becoming more conspicuous. Not only state monitoring for the valves and the actuators in the plumbing facilities but also failure prediction and life diagnosis of these devices and, furthermore, more precise state detection capability such as appropriate evaluation and discrimination for each failure and/or symptom at a product and/or component level, and systems capable of managing and controlling the devices based on that detection results from various viewpoints have also been increasingly demanded.

In particular, a rotary valve of a type such as a ball valve (in particular, of a floating type) or a butterfly valve including a valve seat made of resin such as PTFE or PEEK material and rotating by successively receiving the complicated and fine action of friction under a driving force by an actuator has been used as a typical open/close valve or flow-rate adjustment valve in any of various use modes under many environments irrespective of the area or location, and its precise state monitoring and diagnosing means has been increasingly demanded in recent years. For example, a ball seat of a ball valve is the core of the valve function and a portion that tends to change its state due to material characteristics and has the highest necessity to grasp the state in the operating ball valve.

By contrast, as means for the purpose of at least monitoring the state of a valve and/or an actuator in a plumbing facility, various techniques have been conventionally suggested. For example in PTL 1, based on a characteristic graph acquired from the operation of a device, especially, the valve and/or the actuator, various states of the device are tried to be checked. PTL 1 discloses a method for determining the state of a process configuration control component by using characteristic graphs and, specifically, the method in which a measurement for a characteristic graph is performed by a device for a predetermined period, and then a measurement for a characteristic graph is performed by the same device for another period, and these two characteristic graphs are displayed on a monitor via a calculation device, thereby the state of the device is evaluated at the calculation device by comparing the characteristic graphs (whether the state is between boundary values).

On the other hand, in various plumbing facilities as described above, irrespective of the structure and situation, artificial means by a worker, that is, an on-site check of the operating situation of the actuator and/or the valve, may be required due to various causes. For example, in a simple plant structure without a sophisticated instrumentation system such as a filed bus, remote monitoring and control by a control room or the like cannot be performed, and thus the worker has to appear at that site to check individual valves and actuators one by one. Also, even with remote monitoring system being provided, if that is out of order or the like, at least an on-site check is required.

However, in this on-site check, for example, even with a predetermined indicator or the like being provided to the control shaft of a valve actuator, if the valve or the actuator is installed in a complex conduit or a narrow place and this plumbing situation is not supported, an on-site check work is difficult. Moreover, a facility configured to be remotely-monitorable is often configured, with simplification of the system, as one where no on-site check is assumed. Also in this case, an on-site check is difficult. Furthermore, when a recording and display device is tried to be newly provided to an existing actuator or valve to promote an on-site check, works of disassembling, attaching, or replacing devices such as the actuator, valve, and plumbing are often required. In addition, if the device of this type is provided, the actuator or the like may be upsized and even cannot be arranged in the conduit.

For this reason, in the on-site check work around the plumbing facility as described above, the state of the valve and/or the actuator can be easily checked onsite. Also to a valve and/or actuator that has been already disposed in the plumbing facility or is operating, monitoring means configured as a unit type so as to be newly retrofittable with ease has been highly demanded. Furthermore, in recent years, a system configuration that can manage devices such as valves via so-called IOT (internet of things) technology and/or cloud computing technology has also been desired. Still further, there is a demand for a system that has an existing instrumentation system but can grasp the state of a device in a simple manner independently from that existing system. Several suggestions of techniques of this type have already been present and, for example, those of PTLs 2 and 3 have been suggested.

PTL 2 describes a predictable maintenance system for valves, specifically, the system configured to be such that, while a magnetic-type position sensor is accommodated in a box attachable and detachable to a support member on a housing side, magnets each generating a magnetic field to be measured by a sensor are arranged on a stem side with predetermined spacing and a state such as a damage on a ball or seat or a failure of an actuator is predicated based on at least an angular position of the stem acquired from an angle detection mechanism formed of these and torque information from a torque sensor included in the stem and, in particular, the state is evaluated from a torque-angle curve graph.

PTL 3 discloses an example configured to be such that, while an add-on-type valve monitoring unit is attached via a bracket to an upper part of an actuator mounted on a quarter-turn valve, a sensor capable of reading an actuator state (angular position of a stem) and transmitting an angular variation signal to the monitoring unit is attached on a valve's stem side, thereby allowing the state of the valve to be always monitored based on the angular position of the stem. For example, on a graph diagram of that PTL, a graph of stem angles with respect to time is depicted and, based on its pattern, a faulty state of the valve is inferred.

CITATION LIST

Patent Literatures

PTL 1: Japanese Unexamined Patent Application Publication (Translation of PCT Application) No. 2009-543194
PTL 2: WO 2016/139376
PTL 3: Japanese Unexamined Patent Application Publication (Translation of PCT Application) No. 2015-528085

SUMMARY OF INVENTION

Technical Problem

However, while the technique in PTL 1 can be considered as being widely applicable to general targets in view of comparison and evaluation of the characteristic graphs of the device, specific means such as a method of acquiring characteristic graphs is not disclosed. Thus, for example, it is impossible to perform precise state grasping and diagnosis of individual specific targets for each valve type such as a ball valve or butterfly valve or for each component such as a valve seat or packing and, furthermore, regarding a damage state, replacement timing, and so forth of these. Thus, the technique cannot be said to be able to perform the above-described precise state grasping and diagnosis for each specific target such as a ball valve or butterfly valve.

In this respect, while specifically described as examples of the characteristic graphs is a graph of the actuator pressure and movement position of a pneumatic actuator, to acquire this characteristic graph from an existing actuator, that is, after plumbing connection, it is required to once remove a plumbing system which intakes and exhausts air pressure, makes a pressure sensor or the like incorporated in the actuator, and then assemble the actuator again. Thus, easy retrofitting as a monitoring device to a device or the like is impossible.

Also in the device configuration of PTLs 2 and 3, separate attachment of a member as a measured target at least to a valve or actuator side such as a stem is a requisite. Thus, the devices of PTLs 2 and 3 are of an external-information measurement type and, since this measured member is required, the number of components of the device and the manufacturing and management steps are increased, time and effort for attachment is required to impair handleability and, furthermore, the application target is limited and usability is impaired. These can be said as disadvantages. Thus, the techniques in PTLs 2 and 3 are still insufficient in view of the above-described problems to achieve simple structure and easy retrofitting.

Furthermore, in PTLs 2 and 3, the state of the device is grasped merely based on the data of the angle sensor which detects the angle of the rotating shaft such as a stem. However, as will be described further below, to grasp in detail with a simple structure the motion of, especially, the rotating shaft rotating as receiving the random action of friction, the sensor formed of at least the angle sensor is still insufficient to achieve detailed analysis of the motion and, in particular, is insufficient as data acquiring means for use in life diagnosis. Specifically, in the angle sensor, only a linear or smoothly-curved graph can be acquired as temporal transitions of the angle. This means that, in the angle sensor, only rough, insufficient motion data with low accuracy is acquired. Thus, it is impossible to solve the above-described problems to achieve state grasping and diagnosis of a target more precisely by using angle information by the angle sensor.

In fact, in the angle-time graph disclosed in PTL 3, every graph of real-time measurement values assumes a linear shape or a smooth curve, and thus it can be said that only a rough rotating motion characteristic is captured. In particular, while measurement graphs vibrating like waves are depicted, these are merely examples in which valve rotation is reversed and a simply-overswinging and extremely-rare motion is merely captured.

In addition, for the above-described problems, at least for state monitoring of the valve and/or the actuator, it is required, as a matter of course, to provide a sensor capable of measuring these states (such as a rotation angle). In particular, a sensor that can be easily retrofitted is considered as effective. Several techniques of this type, for example, with an inertial sensor (inertial measurement unit (IMU)) provided to a valve and/or an actuator, have been conventionally suggested, but those are merely suggested as valve opening meters which measure an opening degree (rotation angle) of a valve. Thus, even if a sensor, such as an inertial sensor, that can be easily retrofitted to a target product is provided to the valve and/or the actuator, which data is to be acquired from this sensor by which way and how the acquired data is used to solve the above-described problems (precise state grasping and diagnosis) and so forth cannot be known, and it is thus impossible to solve the above-described problems.

Thus, the present invention was developed to solve the above-described problems, and has an object of providing a valve state grasping system that can be easily retrofitted to any of various existing or operating valves (rotary valves) and actuators, and in particular, even facilities to which commercial power is not supplied, and allows detailed and accurate state grasping and diagnosis or failure prediction for the valve or actuator.

Solution to Problem

To achieve the above-described object, the invention according to claim 1 is directed to a valve state grasping system configured to perform, based on angular velocity data of a valve stem which opens and closes a valve, state monitoring, diagnosis, and life prediction of this valve.

The invention according to claim 2 is directed to the valve state grasping system in which, to the valve stem, a monitoring unit having at least a semiconductor-type gyro sensor is attachably and detachably fixed, and the angular velocity data includes angular velocity data acquired from this monitoring unit in accordance with a rotational motion of the valve body from being fully open or fully closed to fully closed or fully open.

The invention according to claim 3 is directed to the valve state grasping system in which the valve is a rotary valve which opens and closes or controls a flow path by rotating the valve stem, and the valve stem is a rotating shaft formed of an output shaft and a control shaft of an automatic valve via the actuator or a stem of a manual valve via a manual handle.

The invention according to claim 4 is directed to the valve state grasping system in which the rotary valve is a quarter-turn-type ball valve or a butterfly valve.

The invention according to claim 5 is directed to the valve state grasping system in which the state monitoring includes grasping of a wearing state of at least a valve seat, a gland packing, and/or a stem bearing.

The invention according to claim 6 is directed to the valve state grasping system in which a rotation angle of the valve stem can be further calculated from the angular velocity data.

The invention according to claim 7 is directed to a valve state grasping system including a valve, a sensor unit fixed to this valve, and a server communicably connected to this sensor unit and including a database, wherein the system is configured to grasp a wearing state of a wear component based on a feature value included in measurement data measured by a sensor included in the sensor unit from a valve stem which opens and closes the valve.

The invention according to claim 8 is directed to the valve state grasping system in which the sensor is a gyro sensor which measures, as the measurement data, angular velocity data with which the valve stem rotates.

The invention according to claim 9 is directed to the valve state grasping system in which the feature value is feature data formed of all or part of: a time from full open of the valve to a predetermined opening degree or full close appearing in an angular velocity graph acquired from the angular velocity data in the axial center direction of the valve stem; a time from a predetermined opening degree to full close; number of steep gradients and the position, magnitude, or width of each steep gradient of angular velocity included in a predetermined time region; and/or a time until the angular velocity reaches a maximum value or a local maximum value and a magnitude or width of the maximum value or the local maximum value.

The invention according to claim 10 is directed to the valve state grasping system in which the database has stored therein a reference data table formed of a plurality of pieces of label data and the feature data in accordance with a predetermined open/close count of the valve for each specific condition, the sensor unit and/or the server is provided with first anomaly diagnosing means configured to grasp the wearing state and conduct an anomaly diagnosis of the valve, and this first anomaly diagnosing means includes specific data generating means which generates specific data formed of a specific condition of the valve, an open/close count of the valve, and specific feature data based on angular velocity data, data acquiring means which acquires from the reference data table reference data having an open/close count equal to the open/close count of the specific data and a substantially-equal specific feature value, and comparing and determining means which compares any one piece of label data included in this acquired reference data and a predetermined threshold to acquire a predetermined determination result.

The invention according to claim 11 is directed to the valve state grasping system in which the database has stored therein a learning model which calculates one piece of inferred label data from the feature data, the sensor unit and/or the server is provided with second anomaly diagnosing means configured to grasp the wearing state and conduct an anomaly diagnosis of the valve, and this second anomaly diagnosing means includes feature value generating means which generates the feature data based on the measurement data, inferred label data calculating means which calculates one piece of inferred label data via the learning model based on the feature data, and comparing and determining means which compares this inferred label data and a predetermined threshold to acquire a determination result.

The invention according to claim 12 is directed to the valve state grasping system in which the database has stored therein a learning model which calculates model data from accumulated feature data, the sensor unit and/or the server is provided with third anomaly diagnosing means configured to grasp the wearing state and conduct an anomaly diagnosis of the valve, and this third anomaly diagnosing means includes feature value generating means which generates predetermined feature data based on the measurement data, data accumulating means which accumulates the feature data in the database and generates the accumulated feature data, data control means which performs predetermined control, model data calculating means which calculates the model data via the learning model based on the accumulated feature data, index calculating means which calculates a predetermined index from the model data and new feature data, and comparing and determining means which compares the index and a predetermined threshold to acquire a determination result.

The invention according to claim 13 is directed to the valve state grasping system in which the wear component is a valve seat, the valve is a rotary valve, the sensor unit is a single unit capable of wireless communication with the server and including a power supply, and this sensor unit is attachably and detachably fixed in a mode capable of corotating with the valve stem.

The invention according to claim 14 is directed to the valve state grasping system in which the label data is formed of dimensional data formed of a dimension of the wear component in a non-wearing state and/or leakage amount data formed of a leakage amount when the valve is fully closed.

The invention according to claim 15 is directed to a valve state grasping system including a valve, a gyro sensor unit fixed to this valve, and a server communicably connected to this gyro sensor unit and including a database, wherein, this database has stored therein a second reference data table including output data and product data in accordance with an open/close count of the valve, the sensor unit and/or the server is provided with fourth anomaly diagnosing means configured to grasp a wearing state of a wear component included in the valve and conduct an anomaly diagnosis of the valve, this fourth anomaly diagnosing means includes data generating means which generates measurement data including output data and product data measured by the gyro sensor unit in accordance with an open/close count of the valve, data acquiring means which acquires, from the second reference data table, second reference data having output data substantially equal to the output data of the valve included in this measurement data, and failure determining means which determines failure prediction of the valve based on use frequency data of the valve included in this acquired second reference data.

Advantageous Effects of Invention

According to the invention in accordance with claim 1, the valve stem of the valve is a portion in conjunction with the valve body and directly receiving its motion, and is thus suitable as a portion for observing the motion of the valve body to which the performance and symptom of the valve at the present moment is directly reflected, such as the state of the valve seat through the action of friction. Also, since the valve stem is directly related to various important portions such as the bearing and the packing, the states of these also tend to be directly reflected.

On the other hand, essentially, unlike position (angle) data, (angular) velocity data with at least high accuracy indicates information to which the motion characteristics of a target at the moment of measurement is well reflected and, for example, in random motion under the action of friction, a fine motion characteristic not reflected on the position data is also reflected. Thus, if the angular velocity data of the valve stem of the valve is taken as a base, it is possible to easily and precisely achieve state monitoring, diagnosis, and life prediction of the valve.

According to the invention in accordance with claim 2, according to the gyro sensor, the rotating motion (rolling friction) can be acquired as an angular velocity graph having a non-linear region including a plurality of peaks. Thus, detailed diagnosis information that has been difficult to capture can be acquired in a simple manner, allowing the state of the valve to be grasped in detail based on this data. Also, since the gyro sensor is a sensor for detecting the rotating motion with respect to the reference axis with high accuracy, the gyro sensor is very useful as a sensor for life prediction even if it is an inexpensive, low-performance, or general-purpose sensor.

Also, at a stage of actual use, with substantially only a work of detachably attaching the monitoring unit to the valve stem portion of each target product, a simple valve state grasping system independent from the existing system can be configured. Also, the width of the attachment target (such as product type, plumbing situation, and whether operation is being performed) and the attachment method is very wide. Thus, the system can be very easily retrofitted to any of various target products by any worker. Furthermore, the functions can be concentrated in a compact form as a monitoring unit, handleability or usability as a product are excellent, also in view of cost and so forth.

According to the invention in accordance with claim 3, since at least the rotating shaft of the rotary valve is taken as a measurement target, the target motion to be measured by the gyro sensor is formed only of a simple axial rotating motion with respect to the non-displaced reference axis, and thus the function of the gyro sensor as an axial rotation motion sensor can be exerted most. Therefore, precise motion measurement can be performed with a simple structure.

According to the invention in accordance with claim 4, it is possible to grasp the state of a quarter-turn-type ball valve or butterfly valve, which has been widely spread in various scenes irrespective of whether the valve is of a manual or automatic type and is highly demanded at present or also will be in the future for various needs. Also, when angle calculation is performed from angular velocity data acquired, among others, from the motion of the valve, the accumulation range (angular displacement) is small, 90 degrees at maximum. Thus, accumulated errors can be only in a small range, which can also lead to a saving of computation resources and the structure of the device.

According to the invention in accordance with claim 5, the valve seat, the gland packing, and/or the stem bearing each assume an important part of the valve, and the performance of these including the wearing state influences the important functions of the valve. On the other hand, these are consumable members internally incorporated, and thus the wearing state of these is subjected to normally removal/ disassembling of the valve device, removal of components, and visual inspection and it is difficult to at least grasp the wearing state quickly in a simple and nondestructive manner. However, according to the present invention, detailed diagnosis with extreme ease can be achieved also for these important inner components and parts associated with the life of the product.

According to the invention in accordance with claim 6, the information about the angle and the opening degree is important as basic information about the valve in various scenes, and the angular velocity data can be effectively used at least for angle calculation.

According to the invention in accordance with claim 7, the wearing state of the wear component of the valve is diagnosed based on the feature value of the measurement data acquired from actual operation of the valve. Thus, anomaly diagnosis by a so-called nondestructive inspection scheme for grasping the state of the device from a driving signal. This is nothing but allowing rational replacement in view of maintenance of the entire system in a plumbing system where a plurality of valves are disposed on single plumbing. That is, even if maintenance is performed on only one valve, the operation of its plumbing has to be stopped, and entire replacement is performed under present circumstances even if there is another disposed valve that is still usable. According to the present invention, since a valve with less use frequency has a practical life expectancy longer than that of other valves of the same type and is therefore not required to be replaced, reduction in cost regarding maintenance can be achieved. Also, since data for the entire period is kept from a time when the product is new to a time when the product is failed, even if the gyro sensor is attached to a valve whose use period lapses to some extent, the use state can be grasped. Thus, failure prediction control can be quickly developed in the market.

According to the invention in accordance with claim 8, the rotating motion of the valve stem has a very strong tendency to be characterized by an angular velocity graph acquired by measurement by the gyro sensor, and thus the processing of the measurement data is also performed very easily. The invention is very suitable for grasping the state of the target also in view of a large amount of data processing such as, in particular, machine learning.

According to the invention in accordance with claim 9, the feature value is restricted to have only any of several recognizable graph patterns, and thus it is possible to extract feature data that is easy to process.

According to the invention in accordance with claim 10, based on the clear pattern acquired from the angular velocity data, the valve can be easily diagnosed from the reference table via simple processing. Also, the reference data acquired from actual operation of the valve product can be very effectively used. Furthermore, predetermined machine learning can also be applied.

According to the invention in accordance with claim 11, by using a machine learning scheme with unique data specialized for the target, a valve anomaly diagnosis is performed based on the label data acquired via this machine learning. Thus, with development of machine learning technology in recent years, an improvement in performance of calculators and data storage capability, and a decrease in cost, it is possible to easily perform an anomaly diagnosis with accuracy specialized for the target and high reliability.

According to the invention in accordance with claim 12, it is possible to perform a diagnosis based on real-time data in accordance with the individuality of the product in actual operation being used under specific conditions. Thus, the accuracy and reliability of the diagnosis can be enhanced in accordance with the product and, at least when the system is configured, it is only required to prepare a database only for an actually-operating product individual.

According to the invention in accordance with claim 13, since the sensor unit is a single unit capable of wireless communication, retrofitting to and withdrawal from the facility where the valve is disposed or valve state monitoring is very easy, and the unit itself is also easy to handle.

According to the invention in accordance with claim 14, a value that is important for the valve characteristics is selected as label data, and thus the invention is very suitable for valve anormal diagnosis.

According to the invention in accordance with claim 15, when the entire data from a state in which the valve is new to a state in which the valve is failed is stored in advance in the second reference data table, by the failure determining means which determines valve failure prediction based on the use frequency data of the valve, a notification of a replacement timing can be momently made stepwise, such as three months before or three months before. Furthermore, since data for the entire period is kept from a time when the product is new to a time when the product is failed, even if the gyro sensor is attached to a valve whose use period lapses to some extent, the use state can be grasped. Thus, failure prediction control can be quickly developed in the market.

DESCRIPTION OF EMBODIMENTS

Figure 1:
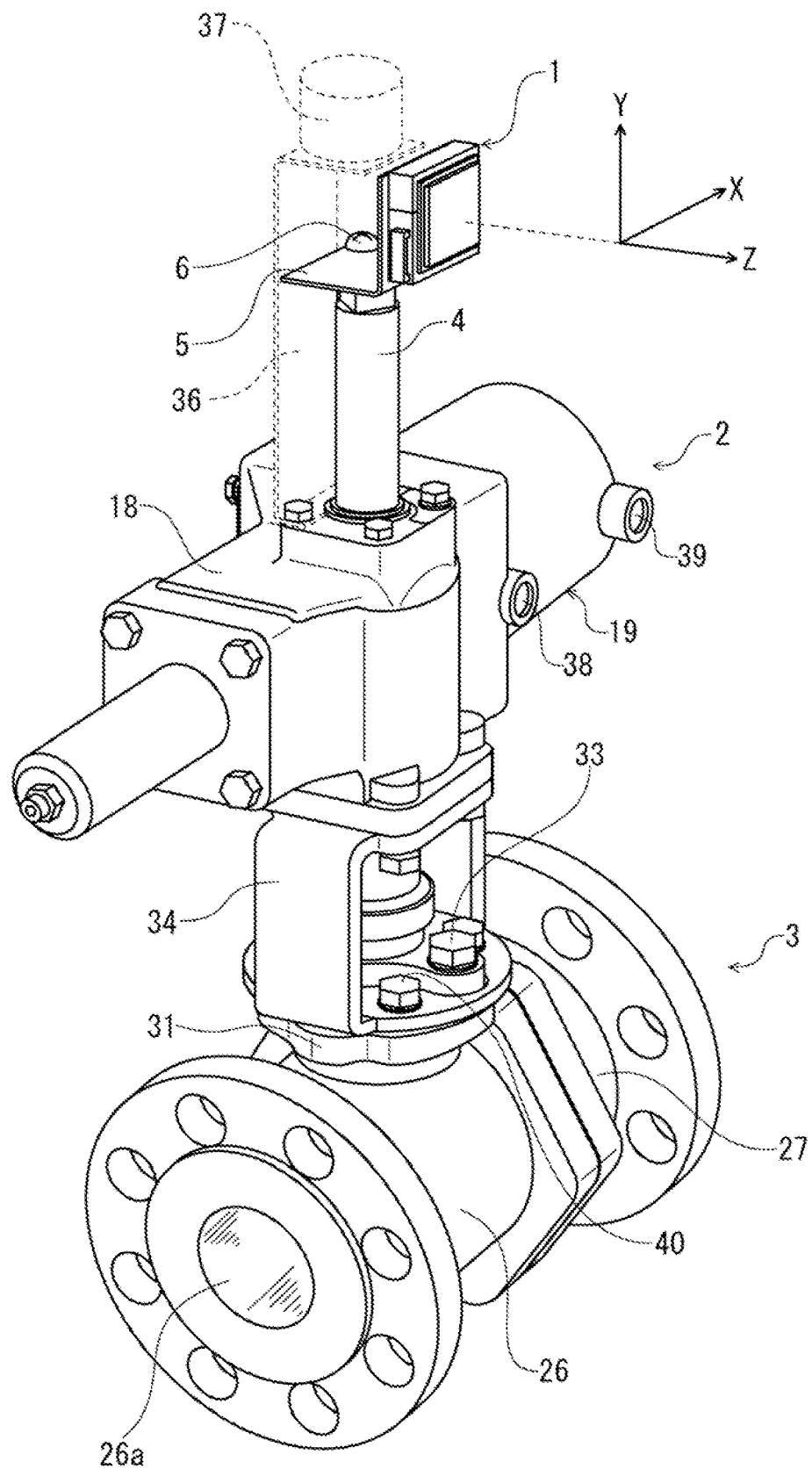
FIG. 1 is an external perspective view of a ball valve equipped with an actuator of the present example.
Figure 2:
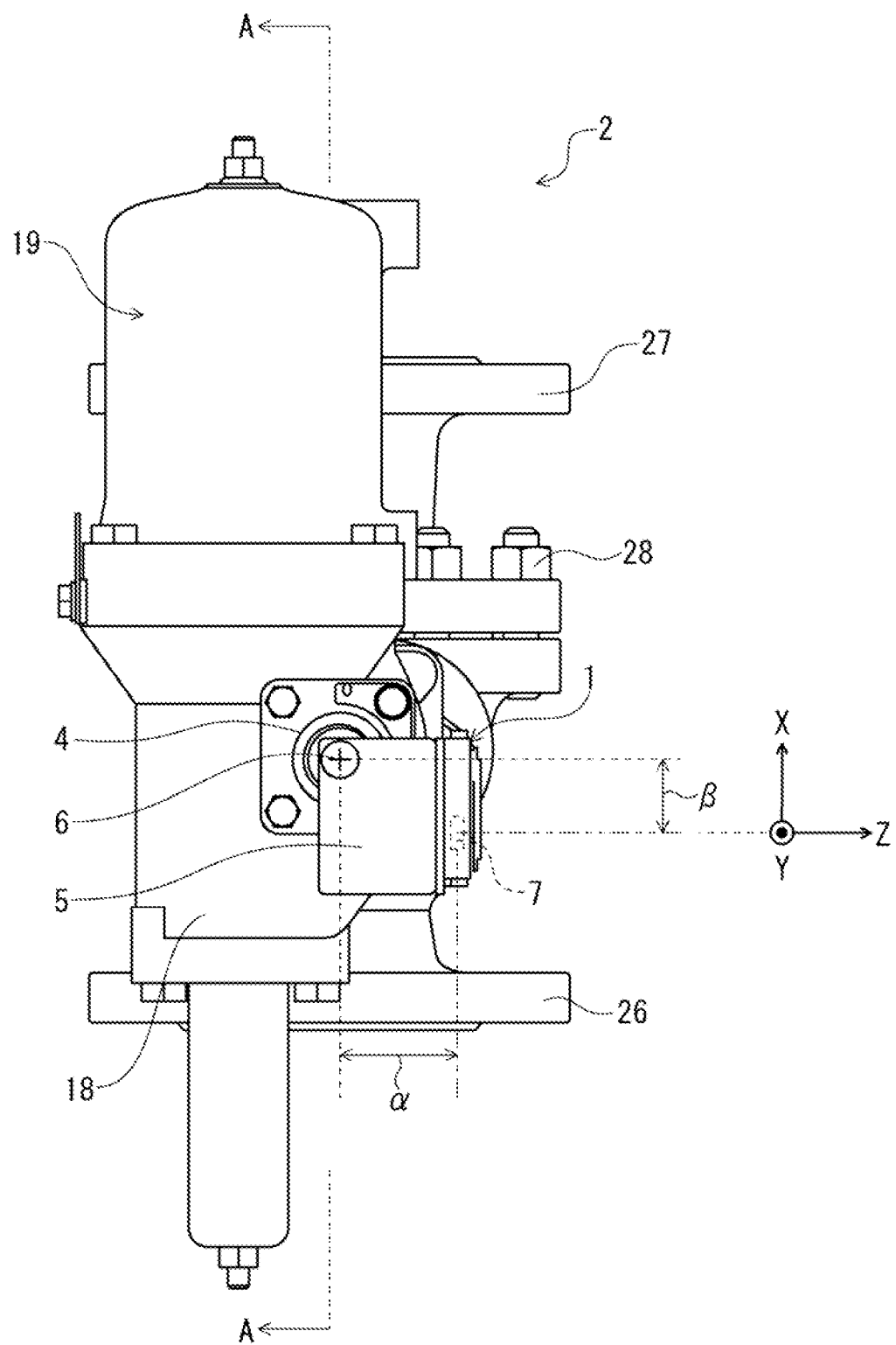
FIG. 2 is an external plan view of FIG. 1.

In the following, the valve state grasping system in an embodiment of the present invention is described in detail based on the drawings. FIG. 1 is an external perspective view of an actuator-equipped ball valve in a state in which a monitoring unit 1 is attached to an actuator 2 in the present embodiment, and FIG. 2 is an external plan view of the actuator 2 in FIG. 1 from above. Also, FIG. 1 depicts a full-open state of a valve 3, with the X axis matching a flow-path axial center direction, the Y axis being in a direction (upward direction in the drawing) in which a control shaft 4 extends out with respect to this X axis, and the Z axis being a right-turn direction on the X and Y axes.

In FIG. 1 and FIG. 2, as for a case (accommodating means) of a monitoring unit 1, any outer shape, material, and others can be selected as long as the case has a compact size and weight to the extent of being easily carriable with one hand. In the present example, the case is a resin-made housing formed in a rectangular plate shape having a length of approximately 15 cm×10 cm and a thickness of approximately 3 cm and having a weight on the order of several hundred grams as a finished product. For example, on a front surface side, product information, model number, or attachment direction (use method), and so forth are displayed. On a back surface side, a predetermined attachment part formed of a female screw hole, a bonding surface, and so forth not depicted is provided, allowing a fitting 5 to be attached thereto. Alternatively, for example, the case may be formed in a circular disk shape of an approximately similar size.

The fitting 5 is one example of attachment means and, in the present example, is formed of an L-shaped metal plate, with one side surface serving as an attachment surface fixedly attached to the back surface side of the monitoring unit 1 and the other surface side fixedly attached to an upper end part of the control shaft 4 of the actuator 2 with a bolt 6. Here, the NAMUR standard is a standard interface standard (VDI/VDE 3845-2010) for actuators, and the dimensions for valve attachment and attachment of an accessory on an upper part of the actuator are defined. If the actuator 2 complies with this NAMUR standard, a female screw part, not depicted, complying with this standard is provided to an upper end part of the control shaft 4. By using this female part, the monitoring unit 1 can be easily retrofitted to the actuator 2 via the fitting 5.

Here, in an actuator being already used, an accessory device such as an open/close limit switch may be attached to an upper part of the control shaft 4. In this case, by using the L-shaped metal plate of the present example, the monitoring unit 1 can be attached to the control shaft 4 while an upper space of the control shaft 4 with the accessory device attached thereto is ensured.

Figure 4:
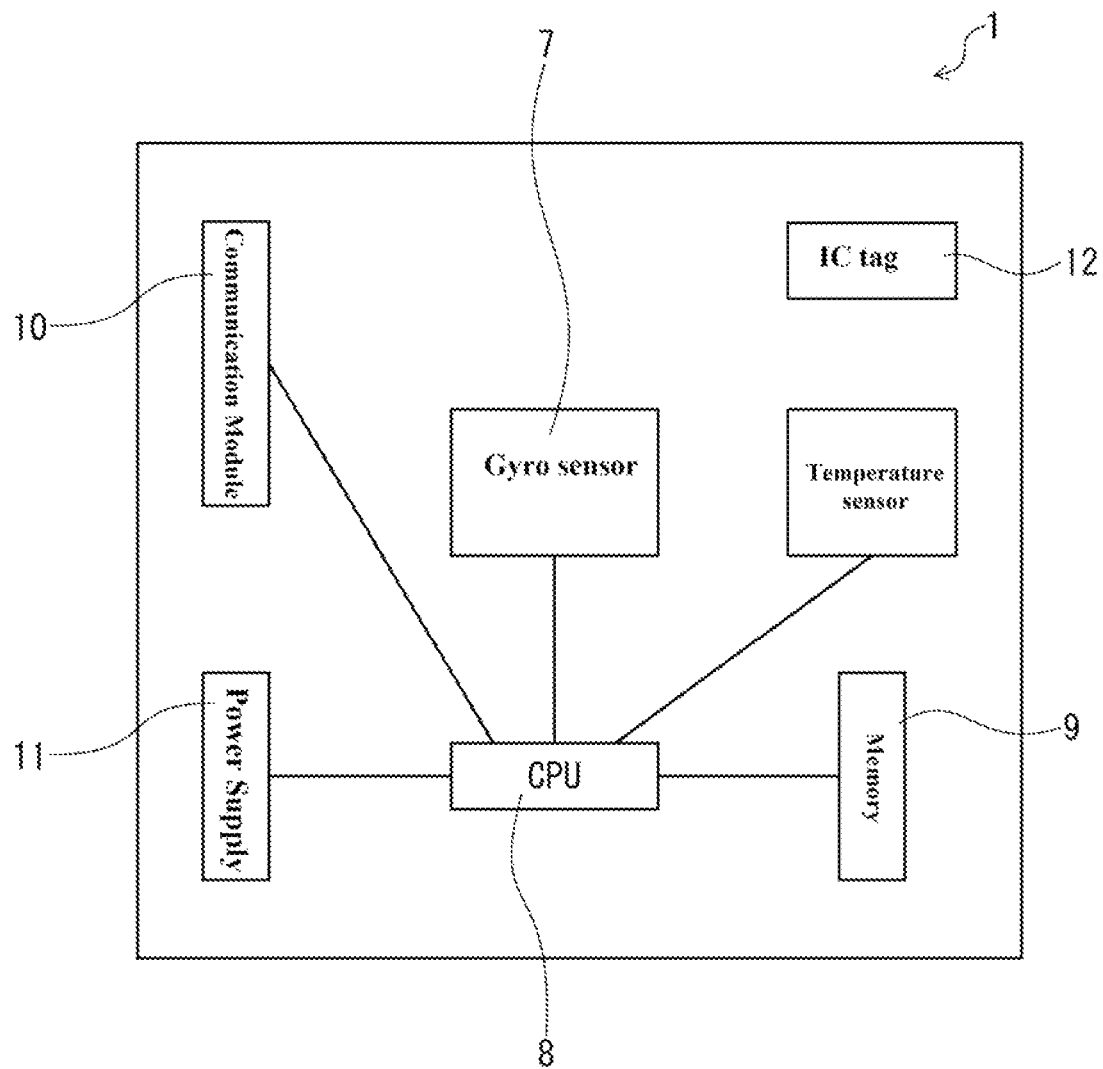
FIG. 4 is a block diagram depicting an inner structure of a monitoring unit of the present example.

In FIG. 1, FIG. 2, and FIG. 4, a gyro sensor 7, which is a rectangular semiconductor element incorporated in the monitoring unit 1 of the present example, is provided to an inner substrate so as to be parallel to the short sides and the long sides of the rectangular monitoring unit 1. Specifically, in FIG. 1 and FIG. 2, the monitoring unit 1 is attached so as to have an orientation parallel to the XY plane. In this state, the yaw axis of the gyro sensor 7 matches the Z-axis direction and the roll axis and the pitch axis match the Y-axis and X-axis directions, respectively.

In FIG. 2, in the present example, at a reference position where the valve 3 is in a full-open state, the gyro sensor 7 incorporated in the monitoring unit 1 is provided so as to be positioned doubly eccentrically with respect to the position of the control shaft 4. Specifically, the monitoring unit 1 is arranged at a position away in parallel from the axial center position of the control shaft 4 (axial center direction of flow paths 26a and 27a), by an eccentric distance $\alpha$ (rightward direction in the drawing) via the fitting 5 and, in accordance with the position of the gyro sensor 7 on the substrate, is arranged at a position away from the axial center position of the bolt 6 (vertical direction to the axial center of the flow paths 26a and 27a by an eccentric distance $\beta$ (downward direction in the drawing). In the present example, $\alpha=18$ mm and $\beta=33$ mm are set.

With the gyro sensor 7 arranged at this doubly eccentric position, at least, when the monitoring unit 1 is attached to a target product, a vacant space where no other member is present can be used with ease, and the monitoring unit 1 can be attached to the target product easily in a compact manner, and can also be easily retrofitted on-site to any of products with various sizes, structures, and orientations. In particular, rough-attachment workability is favorable, and the width of attachment targets is also widened. Also, while the position of the monitoring unit 1 is kept close in distance to the position of the control shaft 4, a large rotation radius $(\alpha^2+\beta^2)^{1/2}$ from the control shaft 4, which is a rotating shaft as a measurement target can be ensured. Note that the arrangement of the gyro sensor is not limited to the structure via the fitting 5, and may be fixed at a midway position of the control shaft in the axial direction by a fitting fixed in a form of nipping the control shaft.

In this manner, to the valve stem, the monitoring unit 1 having at least the semiconductor-type gyro sensor 7 is attachably and detachably fixed. Also, as will be described further below, in the present invention, based on angular velocity data of the valve stem which opens and closes the valve 3, state monitoring, diagnosis, and life prediction of this valve are performed. This angular velocity data includes data (FIG. 5 to FIG. 9, FIG. 15 to FIG. 23) formed in an angular velocity graph in accordance with a rotational motion of the valve body (ball 30) from being fully open or fully closed to fully closed or fully open acquired from the monitoring unit 1. Furthermore, while the monitoring unit 1 is attached to the control shaft 4 in the present example, it may be attached to an output shaft 14 via appropriate attachment means.

In FIG. 4, one example of a basic structure incorporated in the monitoring unit 1 is depicted as a block diagram. This structure is not restrictive, and any structure can be selected in accordance with implementation. However, the unit has at least the gyro sensor 7 (angular velocity sensor) as a motion sensor. The gyro sensor 7 of the present example is a vibrating-type gyro sensor with IC-type MEMS (Micro Electric Mechanical System) technology, and is of a semiconductor type and included in the inner substrate.

Specifically, the gyro sensor is a triaxial gyro sensor capable of measuring rotation in orthogonal three XYZ-axis directions, and one incorporated in general various consumer products is currently used. More specifically, a product "L3GD20" manufactured by STMicroelectronics is used, and its characteristics are, for example: power supply voltage: DC 3.3 V (operating range: DC 2.4 V to DC 3.6 V); consumed current: 6.1 mA; measurement range: ±250 dps (resolution power: 0.00875 dps), ±500 dps (resolution power: 0.0175 dps), and ±2000 dps (resolution power: 0.07 dps). However, these characteristics are not restrictive, and it goes without saying that any selection and adjustment can be performed in accordance with implementation.

In addition, in FIG. 4, the monitoring unit 1 includes at least a CPU 8 (central processing unit), a memory 9, a communication module 10, a power supply 11, and an IC tag 12, and also includes a temperature sensor in the present embodiment described further below. Furthermore, in addition to the above-described gyro sensor 7, an acceleration sensor and a magnetic sensor not depicted may be combined for use in the system of the present invention. Also, for power saving, a piezo sensor may be combined to activate the gyro sensor when needed.

The CPU 8 is meant to include a cache, one with general specifications can be used, and any can be selected in accordance with implementation. In particular, it is required to have processing capability which can achieve each function described further below (in particular, power saving function). This CPU 8 is connected to peripheral elements such as the memory 9 and the communication module 10 via a bus. As with the CPU 8, any memory 9 having capabilities (capacity and speed) capable of achieving each function described further below is also selected in accordance with implementation. If successive power supply is not assumed, a non-volatile memory is preferable. Furthermore, the capacity capable of sufficiently reading various applications which perform the power saving function and so forth is suitable.

The communication module 10 is desirably a near-field wireless communication module. In the present example, Bluetooth (registered trademark) is used. Via this communication module 10, at least the angular velocity data and its transition by the gyro sensor 7 are communicated with an external portable terminal not depicted. This portable terminal allows state recording and display check of an automatic valve via a dedicated application. Also, other than Bluetooth (registered trademark), infrared rays, Wi-Fi Direct, or the like can also be used.

The power supply 11 includes a predetermined power supply conversion circuit, and any can be selected in accordance with implementation. For example, the power supply is an independent power supply by a button battery, or a battery power supply. For example, in the case of a button battery, at its attachment and detachment position, a disk-shaped battery lid is engaged with and fixed to a hole part formed in a lid body via a seal member not depicted, and is attachably and detachably provided as being rotated by a minus driver or the like at a predetermined angle. The power supply 11 has connected thereto each of the elements including the gyro sensor 7, the CPU 8, the memory 9, and the communication module 10, and serves as a driving source for these.

In the IC tag 12, unique information about the actuator 2 and/or the valve 3 is accumulated. That information includes at least (1) the model type and order number of the actuator 2 and/or the valve 3 and (2) an URL for downloading application software. These pieces of accumulated information are inputted to a dedicated terminal or the like not depicted. The URL for downloading application software is for portable terminals. From this URL for downloading, application software can be acquired.

The above-described monitoring unit 1 has at least, as part of a state monitoring and grasping function for the target product (valve 3 and/or the actuator 2), a data measuring function and a function of accumulating the measurement data. The data of a measurement target includes angular velocity data in the control shaft 4 for at least each time or each open/close count. The acquired data is outputted from the gyro sensor 7, and is accumulated in the memory 9 via data processing in the CPU 8. In this case, the data may be converted into data displayable as a graph on an external monitor. Also, these pieces of data may be set so as to be accumulated in the memory 9 after at least simple data processing is performed, such as so-called "interpolation" in which these pieces of data are accumulated in the memory 9 from the CPU 8 at constant intervals, a data average value, or predetermined filtering (noise removal). In response to a request from the portable terminal, the accumulated data is transmitted to the portable terminal via the near-field wireless communication module 10, which is Bluetooth (registered trademark). By this portable terminal, the recordings of the state of the actuator 2 and/or the valve 3 is displayed and checked.

Also, as described further below, based on the monitored and grasped state of the valve, the monitoring unit 1 can include various functions required in a process (flow formed of various process steps) for performing symptom diagnosis such as failure prediction at the component/part level of the valve (target product), optional functions such as the power saving function and a data proofreading function by an auxiliary sensor (such as an acceleration sensor), or a function to be performed by a predetermined application externally acquired.

Also, these various functions may be performed in the monitoring unit 1 or in an external server or the like, and are appropriately allocated as required. In particular, when the structure is such that angle data can be further calculated based on the angular velocity data, it is suitable to use an acceleration sensor as appropriate for drift correction of the gyro sensor 7 according to a summation calculation (such as the rectangular method) by the four fundamental operations without intervention of integrating means, in view of data accuracy, power consumption, and load. Furthermore, a predetermined database for use in data analysis from the monitoring unit 1 may be constructed in an external server or the like.

In the present invention, basically, an angular velocity graph is acquired from the measured angular velocity data and, based on the shape/pattern analysis of this graph data, various diagnosis processes including a life prediction process are performed. This diagnosis processes include, for example, a process of recognizing and evaluating the graph pattern, a process of calling the existing accumulated data (graph data for comparison) for comparison with the acquired graph pattern, a symptom determination process, and a process of outputting and displaying the result, an alert, and so forth. A physical or logical system is configured so that these various processes can be appropriately performed.

Furthermore, a function of measuring and retaining various unique data, a function of externally outputting and displaying these pieces of data, or a function of using in any of the above-described processes may be provided, the various unique data including, as unique information of the target product: fluid pressure, viscosity, and temperature; temperature and humidity of a product environment; valve open/close count and operating time after installation; actuator supply pressure and activation speed; or, in a ball valve, material and wear coefficient of the ball seat or the packing and the size of the ball and the flow path.

In particular, the gyro sensor 7 has a large electric power consumption amount, and the monitoring unit 1 of the present invention is used as being left for a long period of time at a level of several years at the longest. Thus, in view of power saving, it is important to select a combination of the gyro sensor 7 and the power supply 11, and the power saving function is also important. For example, the CPU 8 may be normally in a power saving state of receiving data from the gyro sensor 7 but not accumulating these pieces of data in the memory 9 and, when the operation of the actuator 2 is detected, the power saving state may be cleared and at least angular velocity data detected by the gyro sensor 7 may be accumulated in the memory 9. The state may be back to the power saving state after the state in which the operation of the actuator 2 is not detected continues for a predetermined time. Note that, as the power saving function, for example, a gyro sensor of a self-generation type (such as vibration power generation or photovoltaic power generation) may be used.

Figure 3:
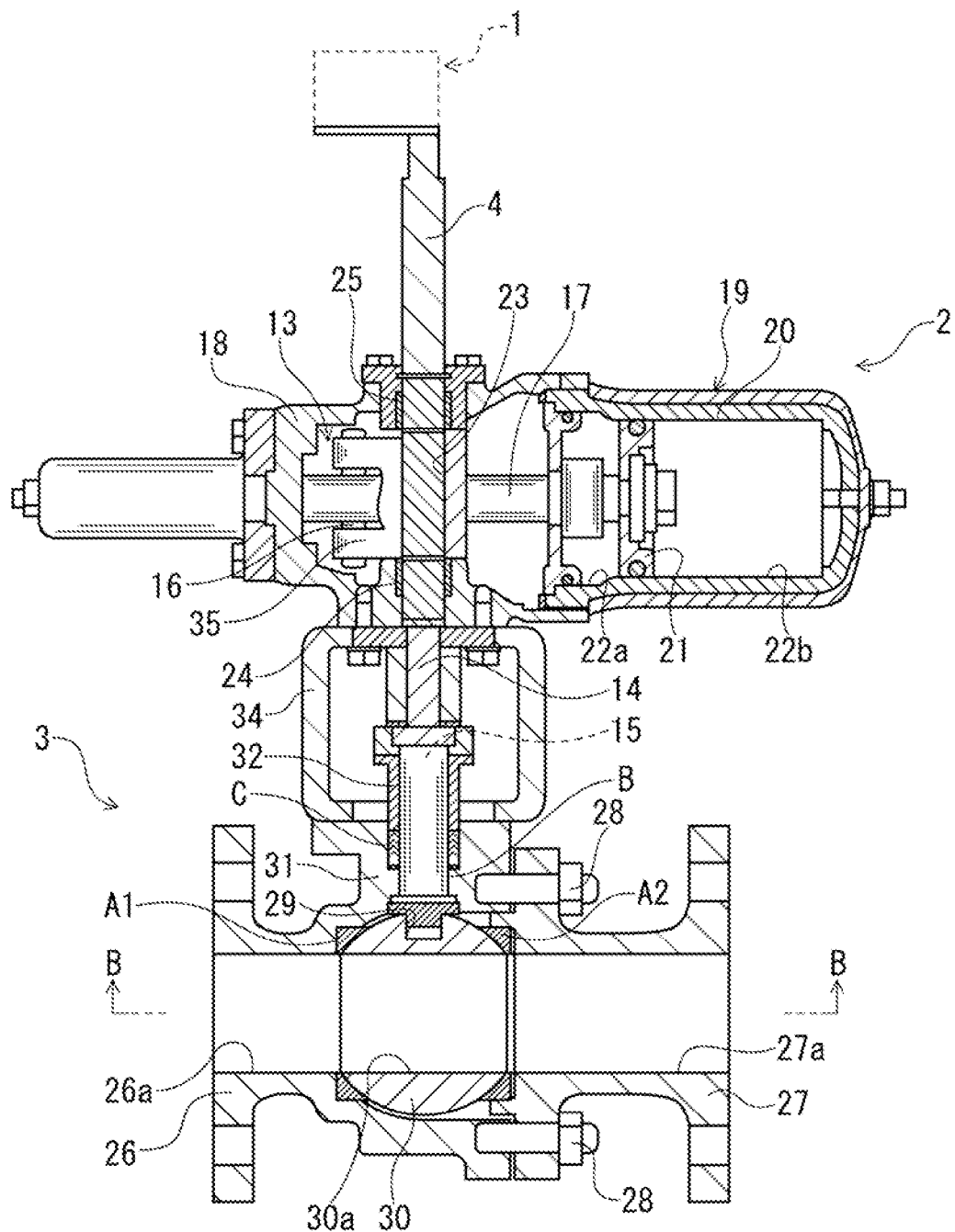
FIG. 3 is a sectional view of a portion along an A-A line in FIG. 2.

On the other hand, in FIG. 1 to FIG. 3, in the present example, as monitoring target products for the monitoring unit 1, the pneumatic rotary actuator 2 in a double-actuated scotch yoke structure and the 90-degree rotary ball valve 3 are described.

In FIG. 1 to FIG. 3, provided inside the main body of the actuator 2 is a converting mechanism 13 which converts a reciprocating motion to a rotational motion. The rotary force of this converting mechanism 13 can be outputted by the output shaft 14 to a stem 15 of the ball valve 3. The converting mechanism 13 is formed of a structure in which a scotch yoke 35 for transmission to the rotating shaft (valve stem) and paired pin rollers 16 with which this scotch yoke 35 is engaged are provided to a piston rod 17, and these are incorporated in a housing 18.

To one side of the housing 18, which is a right side in FIG. 3, a cylinder part 19 is fixed. Inside a cylinder case 20 of this cylinder part 19, a piston 21 integrated with the piston rod 17 is accommodated. The cylinder case 20 may be subjected to coating with a material, for example, PTFE (polytetrafluoroethylene), ENP (electroless nickel plating), or Hcr (hard chromium plating). The present example describes a double-actuated type, and the cylinder part 19 is provided with air intake/exhaust ports 38 and 39. In accordance with intake/exhaust of compressed air to air chambers 22a and 22b via these air intake/exhaust ports 38 and 39, the piston 21 makes a reciprocating motion, and the piston rod 17 makes a linearly reciprocating motion accordingly. This motion is transmitted to the scotch yoke 35 via the pin rollers 16 for conversion to a rotating motion.

To the scotch yoke 35, a rotating shaft is provided so as to be able to be inserted extracted via a fixedly attaching part 23 provided so as to be able to fit in by a spline not depicted. The rotation of the rotating shaft is transmitted via the fixedly attaching part 23 to the scotch yoke 35.

The rotating shaft of the present example is formed of the output shaft 14 on a ball valve 3 side (lower side in FIG. 3) and the control shaft 4 on its opposite side (upper side in FIG. 3). The output shaft 14 and the control shaft 4 are inserted via cylindrical members 24 and 25 to the housing 18, respectively. In the cylindrical members 24 and 25, a predetermined bearing is fitted inside a metal-made shaft bearing not depicted, these cylindrical members 24 and 25 are each fitted into a bearing part formed in the housing 18, and the output shaft 14 and the control shaft 4 are inserted inside. The rotating shaft is rotatably and pivotally attached to the main body of the actuator 2.

Note that in accordance with implementation, a pressure sensor (not depicted) can be provided to the actuator 2 as appropriate. In this case, for example, a speed controller (not depicted) is provided to each of the air intake/exhaust ports 38 and 39 and, between these air intake/exhaust ports 38 and 39, and speed controller a pressure sensor is connected via a coupling such as a tee tube, nipple tube, or the like. If so, with the pressure sensor inserted into a branching portion of the tee tube, intake/exhaust of compressed air is not affected, and pressure measurement by a pressure sensor can be made with a simple structure.

The state grasping target by the system of the present invention is a valve and, in the present invention, a rotary valve which opens and closes a flow path by rotating the valve stem. The valve stem is formed of the output shaft 14 and the control shaft 4 of an automatic valve via the actuator 2. However, the valve stem as a target is not limited to one of the automatic valve and, although not depicted, may be a rotating shaft formed of a stem of a manual valve via a manual handle. Also, while the rotary valve of the present example is a quarter-turn-type ball valve, the target can be any of various rotary valves including motor-driven types such as a plug valve, butterfly valve, or a ball valve of a 180-degree rotating-type.

The ball valve 3 of FIG. 1 to FIG. 3 is a floating-type ball valve, and a valve box is configured with a body 26 having a primary flow path 26a and a body cap 27 having a secondary flow path 27a fixedly attached with bolts/nuts 28. On each of the body 26 and the body cap 27, a flange is formed at a connecting part of the flow path 26a, 27a.

The ball 30, which is a valve body, is of a fullbore type having a substantially spherical portion and a through path 30a formed to have the same diameter as those of the flow paths 26a and 27a, and is supported by two annular ball seats A1 and A2, which are valve seats, from a primary side and a secondary side in the valve chamber. Fastening of the ball 30 by these ball seats A1 and A2 is adjusted by fastening of the bolts/nuts 28. At an upper end part of the ball 30, an engaging part 29 (for example, convexo-concave engaging part) which the stem 15 (valve stem) can be engaged with is formed. Via this engaging part 29, a rotational motion of the ball 30 is transmitted to the stem 15 with high accuracy.

The stem 15 is rotatably attached to a gland part 31 of the body 26 via a cylindrical stem bearing B. Also, between the stem 15 and the gland part 31, a gland packing C and a packing washer are press-fitted by a packing retainer 32. Fastening of the packing retainer 32 is adjusted by fastening of a retaining bolt 33. A bracket 34, which is a coupling member between the main body of the actuator 2 and the ball valve 3, is fixed with bolts 40. Also, at a lower part of the output shaft 14, a rectangular connecting part not depicted is formed. To this connecting part, a fit-in part not depicted and formed in an upper part of the stem 15 is fitted to couple the output shaft 14 and the stem 15, thereby a rotational motion of the output shaft 14 is transmitted to the stem 15 with high accuracy.

In FIG. 1, a rotary encoder 37 indicated by dotted lines is attached in advance to the target product before state monitoring by the system of the present invention to acquire necessary data for use in the present invention and, basically, is not assumed to be used in an actual use scene of the present invention. The encoder 37 of the drawing is connected to an upper end part of the control shaft 4 via a substantially C-shaped attachment plate 36 to accurately measure at least a rotation speed of the control shaft 4, and the measurement data is held as appropriate as unique data of the target product. In the present example, a product "E6C3-C" manufactured by OMRON Corporation is used.

Next, a basic use method in the valve state monitoring system of the present invention is described. The monitoring unit 1 can be attached as appropriate to a location where the target product (valve or actuator) can be easily placed, for example, is attached to a location where the unit can be left for a long period of time without hindering the actuation of the target product. Although the attachment mode depicted in FIG. 1 and FIG. 2 described above is not restrictive, the unit is required to be attached at least in a mode of corotating accurately with the rotation of the control shaft 4 (valve stem).

When the unit is fixed in the mode depicted in FIG. 1 and FIG. 2, a bolt hole of the fitting 5 is matched with the female screw part provided at the upper end of the control shaft 4 in the NAMUR standard and, with the fitting 5 oriented state to an appropriate fixing direction, only screwing the bolt 6 can make the unit fixed. Thus, the monitoring unit 1 of the present invention can be easily retrofitted to a predetermined position of the target product without removing the existing actuator 2 and/or valve 3 from plumbing equipment or removing the actuator 2 from the valve 3 or without adjusting the existing instrumentation system or the like at all.

After placement in this manner, the rotating motion characteristics of the control shaft 4 can be accurately grasped.

Also, the above-described attachment mode reduces external protrusion to prevent expansion of an installation space. Thus, the unit can be attached also to an automatic valve installed in a narrow space. The monitoring unit 1 can be placed also at a position shifted by 180 degrees with respect to the actuator 2 and, in this case, it can be placed only by attaching and detaching the bolt 6 in a manner similar to the above. This allows the monitoring unit 1 to be provided at any of sides opposing by 180 degrees, in accordance with the installation situation of the valve 3 and/or the actuator 2.

Furthermore, not only when the valve is in a full-open state but also even when this valve 3 is in an opening degree in the middle and the control shaft 4 is in the course of rotation, the monitoring unit 1 is attached to this control shaft 4 as being positioned as appropriate. Thus, even while the automatic valve is operating, the unit can be accurately attached to allow an initial setting work.

After attachment of the monitoring unit 1, the operating situation of the valve 3 at each site can be visually recognized by using the portable terminal. At this time, with the use of the communication module 10 of Bluetooth (registered trademark), even if the valve 3 and/or the actuator 2 is installed in a complex pipeline or a narrow place, without directly visually recognizing these, a check can be made by the portable terminal from a place nearby.

When an initial setting mode function is adopted in advance, to perform an initial setting work is performed at the portable terminal immediately after installation of the monitoring unit 1, it is only required to reset to the state of the initial setting mode as appropriate in accordance with the use mode of the monitoring unit 1. In this case, for example, data such as angle data is set at an initial value in accordance with a full-close state of the valve 3. Also at this time, no adjustment work is required on a target product side such as the actuator 2 and/or the valve 3, and setting can be made by using, for example, product information and/or order number retained in the IC tag 12. Also, for example, application software for portable terminals is downloaded from the URL for downloading and initial setting data is transmitted to the server, thereby allowing an installation date of the monitoring unit 1 to be recorded.

After the initial setting work ends, this initial setting mode is switched to a normal mode. As described above, at the time of switching to the normal mode, the power supply 11 may be set in an OFF state after a lapse of a predetermined time to make a transition to a power saving mode.

On the other hand, as the portable terminal described above, for example, a smartphone, a tablet, or the like not depicted is used. In this case, as functions regarding data inputs, the portable terminal has, for example, (1) a function of receiving data and unique information from the monitoring unit 1, (2) a function of transmitting the data and unique information received from the monitoring unit 1 to the server (not depicted), and (3) a function of retaining GPS (Global Positioning System) position information, camera images, and so forth and transferring them to the server.

In (1) the function of receiving data and unique information from the monitoring unit 1, the angular velocity data at the time of rotation of the control shaft 4 is received via the communication module 10. On the other hand, the unique information of the actuator 2 and/or the valve 3 is received via the IC tag 12.

In (2) the function of transmitting the data and unique information received from the monitoring unit 1 to the server, for example, a middle-field wireless communication module such as LTE (Long Term Evolution) or Wi-Fi not depicted is used, and transmission is made to the server from any of these. In this case, measurement data is not processed.

(3) The function of retaining GPS position information, camera images, and so forth and transferring them to the server is an optional function. In this function, an image taken by the camera of the portable terminal and indicating the state of the actuator 2 is transmitted to the server.

On the other hand, as functions regarding data outputs by using the portable terminal, the portable terminal has, for example, (1) a function of causing the information received from the server to be displayed based on the data transmitted to the server and (2) a function of causing information to be displayed, such as a preliminary anomaly report determined by application software based on the information received from the monitoring unit 1 but not via the server.

Although not depicted, in (1) the function of causing the information received from the server to be displayed based on the data transmitted to the server, information at least including diagnosis results of the valve and/or actuator can be displayed in a visually recognizable form with ease. For example, with angular velocity data being displayed on a graph in accordance with the valve open/close count measured, in a range of being fully open to fully closed (fully closed to fully open), together with comparison target data, and then the determination results are displayed. Also, it is possible to display each of the following: the actuation count, operating time, pressure data and actuation torque history, fluid pressure and temperature, environment temperature and humidity of the actuator 2 and, furthermore, drawings of the actuator 2, the valve 3, and so forth.

Also, as other functions, maintenance recommendation information based on the above-described history and so forth may be displayed, or when an erroneous input is suspected in the initial setting of the monitoring unit 1 or the target product with the monitoring unit 1 attached thereto is an imitation, an indication as such may be displayed. Examples of this case are such that the actuation time of the actuator 2 is extremely quick or slow to the model type and order number (special specifications varying for each order) of the actuator 2 and/or the valve 3 inputted to the IC tag 12, or the image of the on-site actuator 2 taken by the camera of the portable terminal is small.

On the other hand, as (2) the function of causing information to be displayed, such as a preliminary anomaly report determined by application software based on the information received from the device but not via the server, for example, when the actuation time is extremely long or when the value of the gyro sensor 7 is unchanged even though an air pressure is applied, that is, when the actuator 2 is not activated, a determination is made as anomaly, and is displayed as a preliminary report. Furthermore, when such an anomalous value is measured, an indication of encouraging data transmission to the server is also displayed.

Next, as a server for use in the above-described system, the system has (1) a function of accumulating unique information of the actuator 2 and/or the valve 3, (2) a function of accumulating measurement data of angular velocity data and air pressure of the actuator 2, (3) a function of calculating actuation torque of the actuator 2, and (4) a function of transmission to and reception from the portable terminal.

As (1) the function of accumulating unique information of the actuator 2 and/or the valve 3, the server accumulates drawing information and design information of the actuator 2 for use in calculation of activation torque. As (2) the function of accumulating measurement data of angular velocity data and air pressure of the actuator 2, when receiving measurement data from the portable terminal over a plurality of times, the server accumulates these pieces of measurement data as a series. As (3) the function of calculating actuation torque of the actuator 2, for example, it is calculated, based on air pressure data received from the portable terminal from the cylinder diameter of the actuator 2, the offset amount from the center axis of a pinion (or scotch yoke), conversion efficiency, and so forth not depicted. As (4) the function of transmission to and reception from the portable terminal, transmission and reception are performed by a middle-field wireless communication module such as LTE or Wi-Fi.

Note that while the example has been described in the above embodiment in which an air-pressure-type actuator is used as an actuator for automatic operation, a fluid-pressure-type actuator other than an air-pressure type may be used, or a motorized actuator may be used. The case of the fitting 5 and the monitoring unit 1 can be changed in accordance with the size of the valve 3 and/or the actuator 2 so as to suit its outer shape. Furthermore, while the control shaft 4 is provided according to the NAMUR standard in the above embodiment, it may be provided according to another standard. Also in this case, formation is made in accordance with the shape, thereby allowing attachment to the actuator with easy retrofitting, as with the case of the NAMUR standard.

Here, examples described further below are those in which a ball seat in a 90 degree-rotation floating ball valve is diagnosed. However, the system of the present invention is not limited to this target, and detailed diagnosis can be made at a level of a specific portion/specific symptom of the target product by analyzing the shape and pattern of a characteristic graph (angular velocity graph) generated from data including angular velocity data collected widely from the target product. In particular, in a valve, as a target portion/component, it is suitable to include wear grasping of at least the valve seat, the gland packing, and/or the stem bearing.

Also, as depicted in FIG. 5 to FIG. 9 and FIG. 15 to FIG. 23, which are angular velocity graphs of the examples, at least a plurality of peak values are indicated in each angular velocity graph. Such an opening-degree or time-evolution graph having these peak values cannot be acquired from, for example, a normal angle (position) sensor provided to a rotary valve. Thus, in conventional techniques, the system as in the present invention for making a detailed diagnosis based on the information about these peak values (such as positions, values, and peak width on the graph) cannot be configured. According to diligent studies by Applicant of the present application, it has been revealed that such an angular velocity graph can be acquired from at least the gyro sensor 7, as described above.

This is considered as follows, at least in a vibrating-type gyro sensor of a MEMS-made semiconductor type, from its measurement principle. That is, since a normal angle sensor can only catch a discrete angle for every duration, calculation as a gradient in a duration on a time-evolution graph is the only way to convert angle data to angular velocity. On the other hand, in the gyro sensor, an instantaneous Coriolis force sensed by a vibrating element is converted to an angular velocity for measurement. Thus, depending on the setting, a substantially actual angular velocity can be accurately measured. Also, in order to achieve this with an angle sensor, it is at least required to set an extremely small duration, and this is not practical.

In this respect, for smooth, slow, and continuous motions, there is not much difference between both (angular velocity data acquired from the angle sensor and that from the gyro sensor). However, for rotational motions of a target which makes motions as receiving the action of fine, random, and discontinuous friction, for example, the valve stem of a rotary valve, there is a difference between both. Specifically, in an angular velocity graph acquired from the angle sensor, fine motions cannot be followed in detail, and therefore a non-curved, vibrating pattern such as peaks cannot be acquired. However, the gyro sensor can well catch fine motions of the valve stem by the action of friction. Thus, there is a possibility that a precise angular velocity graph with occurrence of peaks at a plurality of points has been acquired.

Furthermore, inertial sensors, which typify the internal-information-type sensors, are normally classified into acceleration sensors and gyro sensors. In conventional technologies, there are also valve opening meters of a type including this acceleration sensor and easily provided to an upper end part of the stem of the rotary valve. That is, the rotation angle or the like of the valve handle is detected via this acceleration sensor or the like. However, while at least a MEMS-type acceleration sensor that has been frequently used in recent years is excellent, in principle, in detection of a translational motion or vibrating motion or a gradient with respect to the gravity direction, detailed detection of a rotational motion is not impossible but there is plenty of scope for improvement in detection with a simple structure.

The acceleration sensor of this type has a property in which a motion in a horizontal plane without a gradient with respect to the gravity direction is almost in a dead band and detection of such a motion is extremely difficult. Furthermore, the acceleration sensor easily catches an unnecessary component other than roll acceleration, such as gravity acceleration components and translational (vibrational) acceleration components. Also, it has been theoretically found that appropriately separating the measured needless acceleration from an output signal is impossible by using at least one acceleration sensor. In practice, the valve opening meter of this type has a limitation in plumbing orientation and direction of an attachment target and, in most cases, after the plumbing orientation of a valve as an attachment target is confirmed in advance, the sensor configuration is adjusted for use in accordance with that target. Thus, it is difficult to catch a rotational motion rotating as receiving random friction in detail even at least with a simple structure formed of only an acceleration sensor. Note that FIG. 31 and FIG. 32 described further below depict actual verification in which data regarding a rotational motion of a rotary valve cannot be caught in detail, depending on the acceleration sensor.

As specifically described in the following examples, the structure unique to the target product (ball valve) with the monitoring unit attached thereto is associated with the positions, sizes, and peak width of a plurality of peaks present in angular velocity data put in graph form as appropriate to perform precise state grasping and precise diagnosis of the target product based on that grasped details.

Examples

FIG. 5 to FIG. 23 each depict one example of implementation when the state of the valve is grasped based on the angular velocity data. FIG. 5 to FIG. 9 and FIG. 15 to FIG. 20 are examples of an angular velocity graph acquired from the gyro sensor 7 by using the monitoring unit 1 of the present invention when the ball 30 is rotated by 90 degrees from being fully closed to fully open in the quarter-turn actuator 2 and the floating ball valve 3 depicted in FIG. 1 to FIG. 3 described above, with the angular velocity indicated on the right vertical axis (unit: degree/second). Also, these angular velocity measurement values indicate measurement values in the Y-axis direction in the gyro sensor 7 depicted in FIG. 1. Note that while the measurement values in the X-axis direction and the Z-axis direction are not used as graph data in the present example, these may be used in a complementary manner for the purpose of correcting an attachment error of the gyro sensor.

Figure 5:
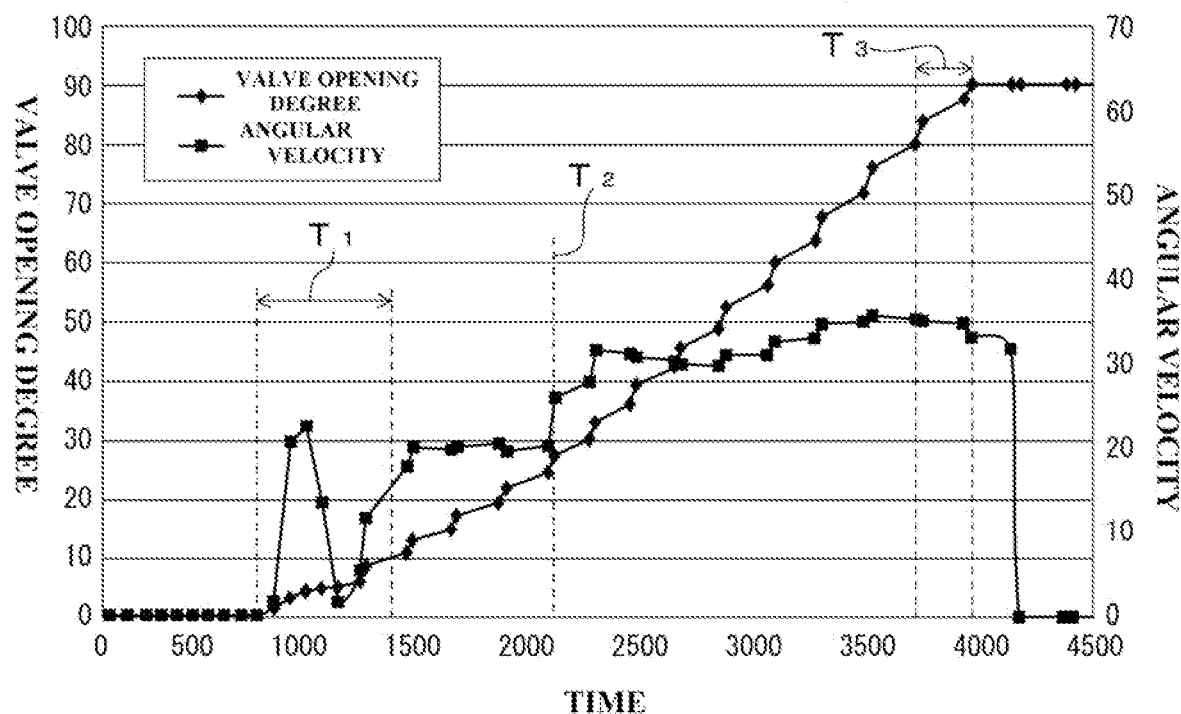
FIG. 5 is one example of an angular velocity graph acquired in an embodiment (test number 10) under specific conditions.
Figure 15:
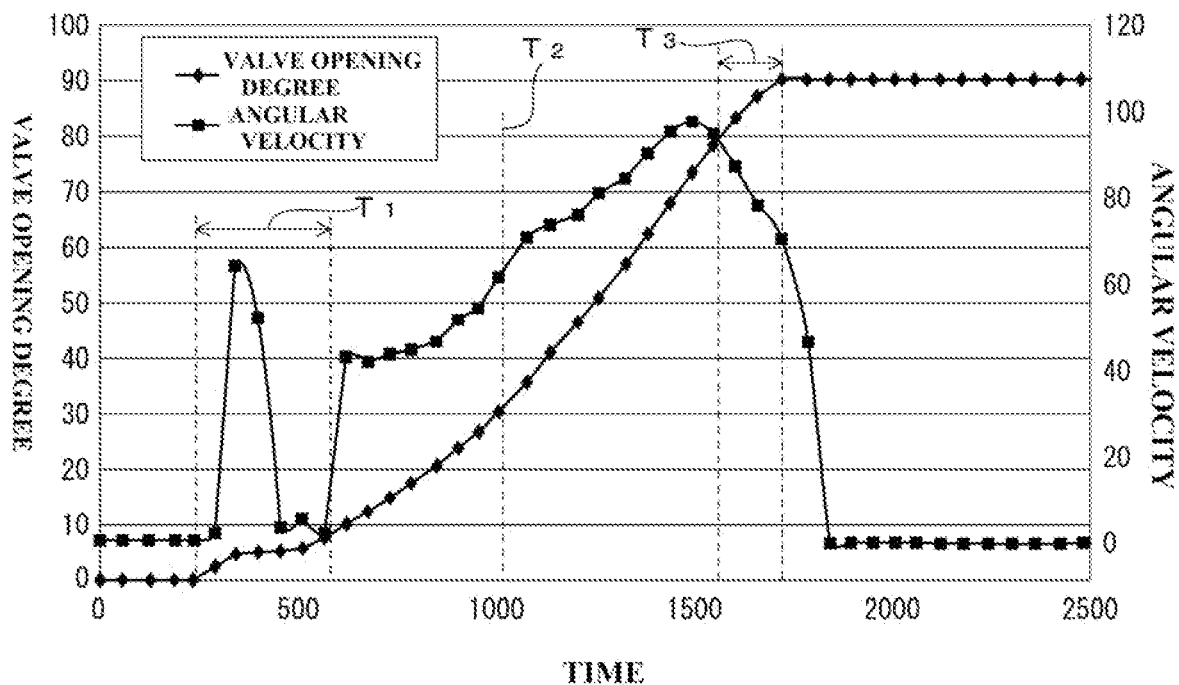
FIG. 15 is one example of an angular velocity graph acquired in an embodiment (test number 2) under specific conditions.
Figure 17:
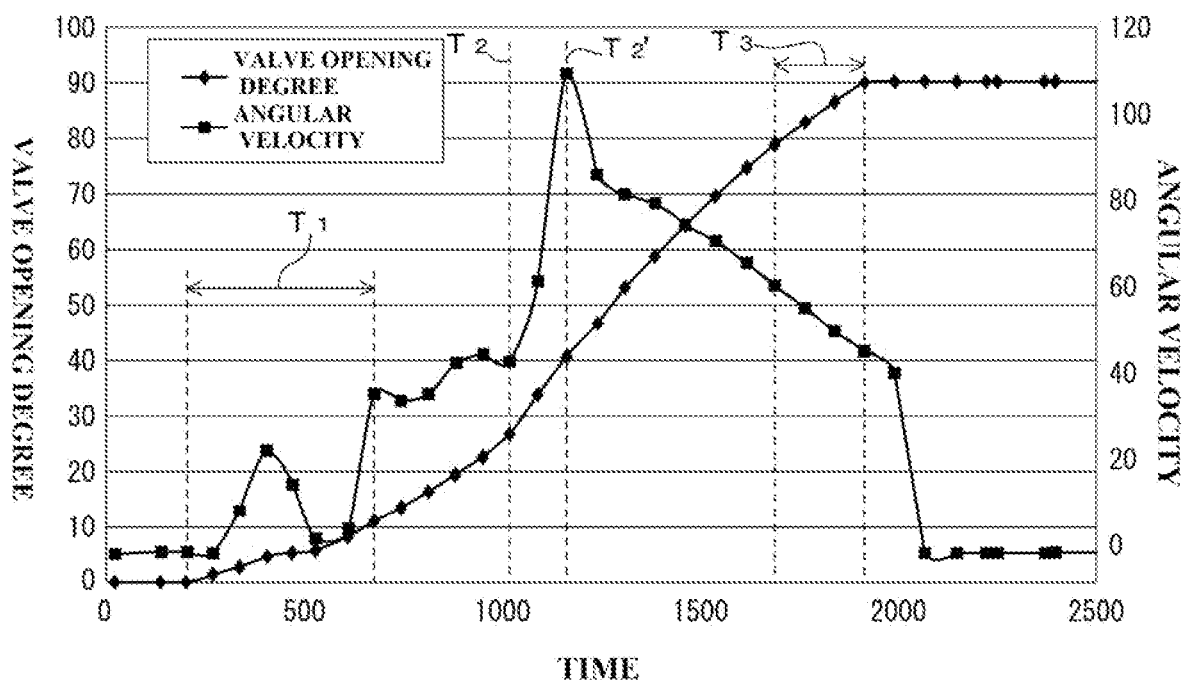
FIG. 17 is one example of the angular velocity graph acquired in the embodiment (test number 2) under specific conditions.
Figure 18:
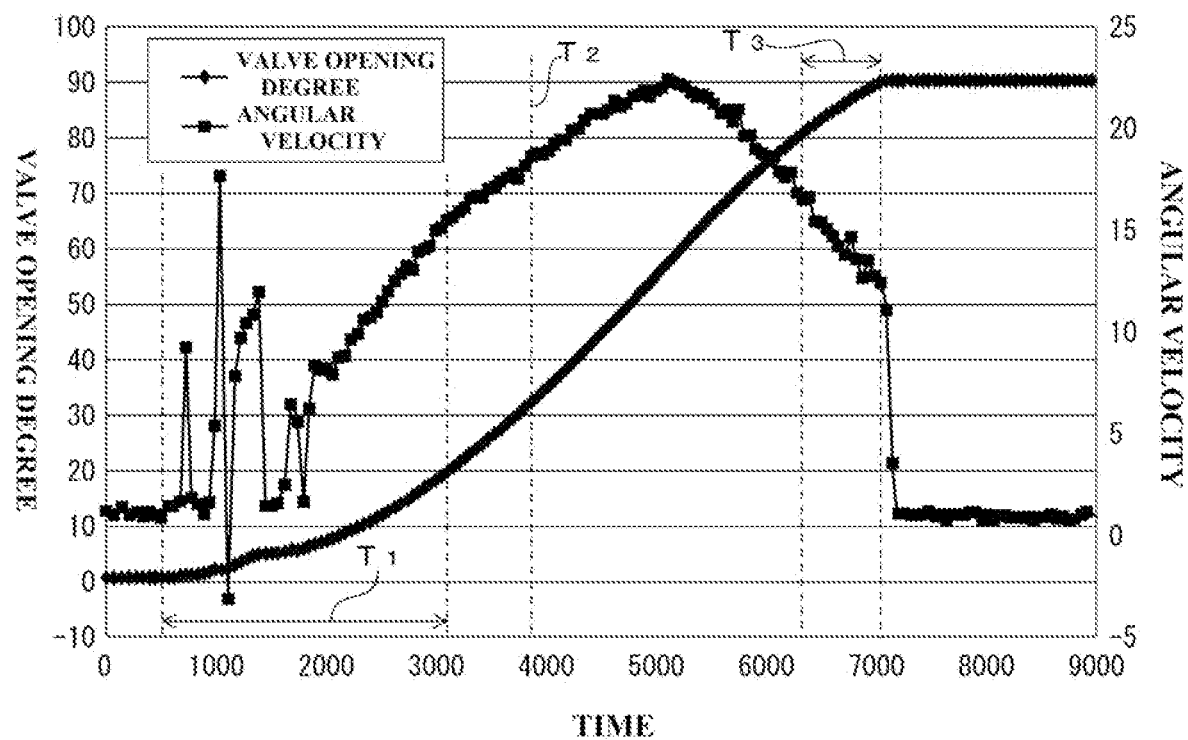
FIG. 18 is one example of an angular velocity graph acquired in an embodiment (test number 8) under specific conditions.

The lateral axis in each drawing indicates a valve actuation time, and is time after an air pressure is supplied to the actuator 2 via a speed controller (unit: millisecond). Specifically, the valve is a stainless-steel-made ball valve having a nominal diameter of 50 A and a nominal pressure of 20 K. Diagnosis targets are the PTFE+PFA-made ball seats A1 and A2, the glass-fiber-impregnated PTFE-made stem bearing B, and the packing C, which is a PTFE-made V packing (the ball seats A, the stem bearing B, and the gland packing C are collectively referred to as "wear components"). Also, as indicated by an open/close count depicted in the drawings, FIG. 5 depicts data acquired after opening/closing zero time, FIG. 6 after thirty times, FIG. 7 after five hundred times, FIG. 8 after thousand times, and FIG. 9 after ten thousand times. Also, FIG. 15 and FIG. 18 depict data acquired after opening/closing zero time, FIG. 16 and FIG. 19 after five hundred times, and FIG. 17 and FIG. 20 after fifteen hundred times.

Furthermore, in the present examples, the encoder 37 as depicted in FIG. 1 together with the monitoring unit 1 is attached to the control shaft 4, and angle data acquired by this encoder 37 is also indicated on the left vertical axis in each drawing as valve opening degree in FIG. 5 to FIG. 9 and FIG. 15 to FIG. 20 (unit: degree).

Figure 8:
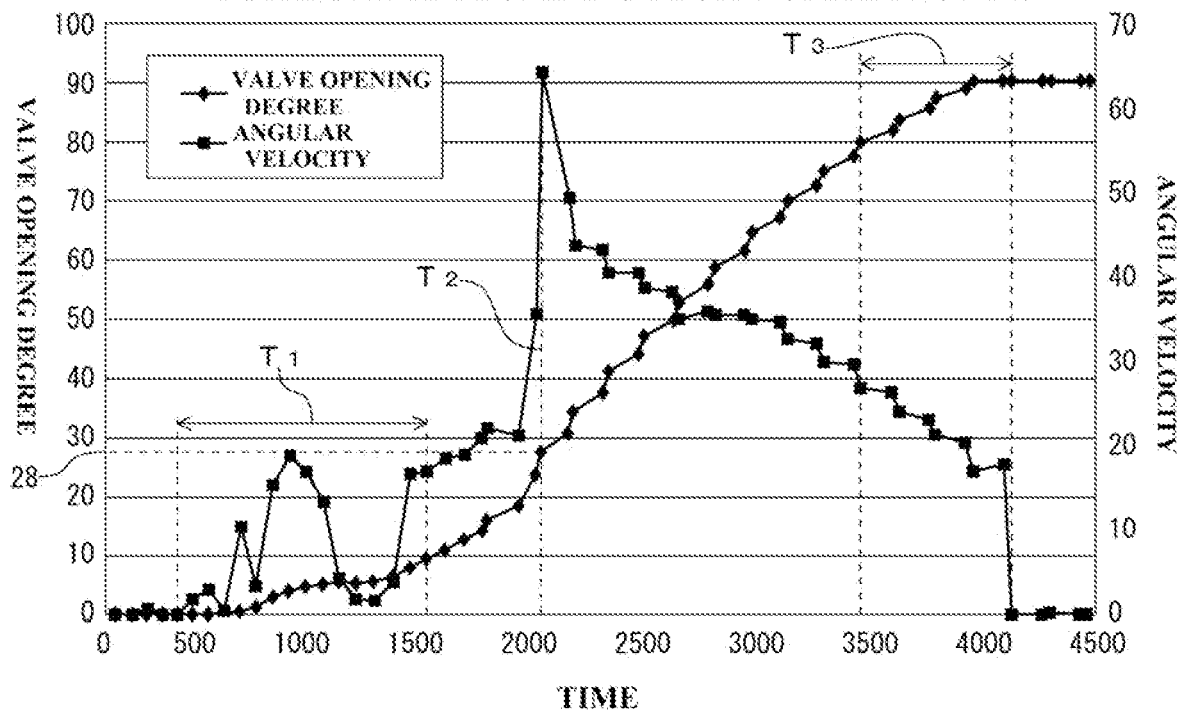
FIG. 8 is one example of the angular velocity graph acquired in the embodiment (test number 10) under specific conditions.
Figure 9:
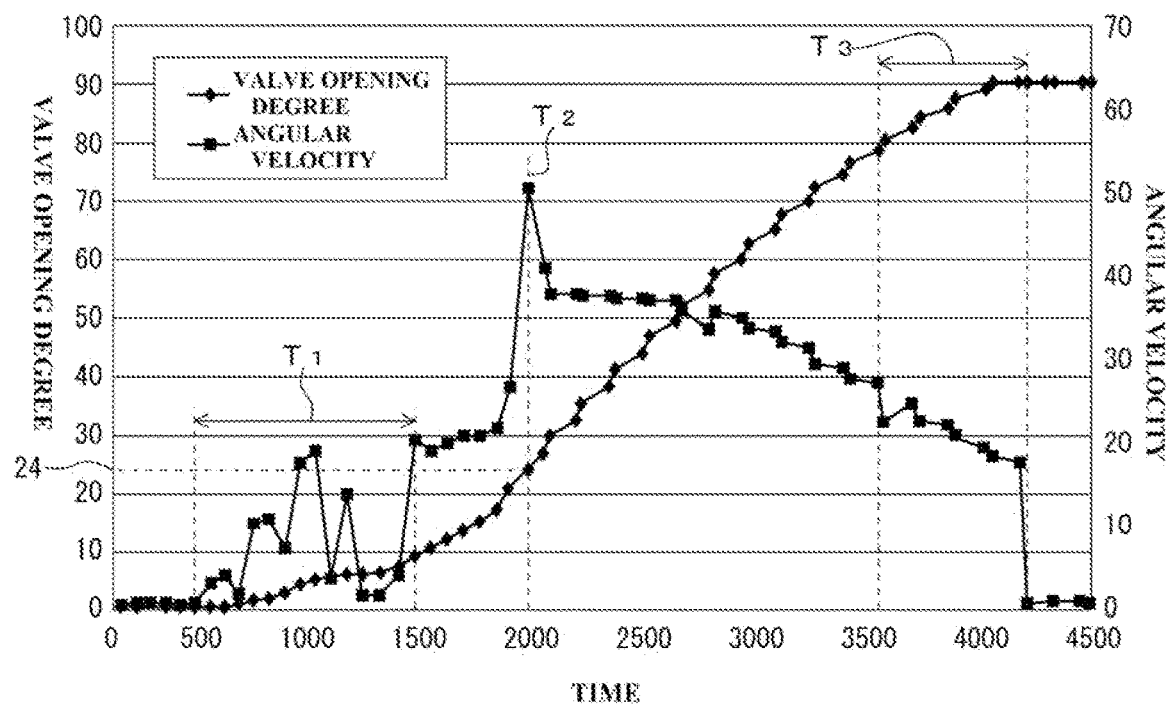
FIG. 9 is one example of the angular velocity graph acquired in the embodiment (test number 10) under specific conditions.
Figure 10:
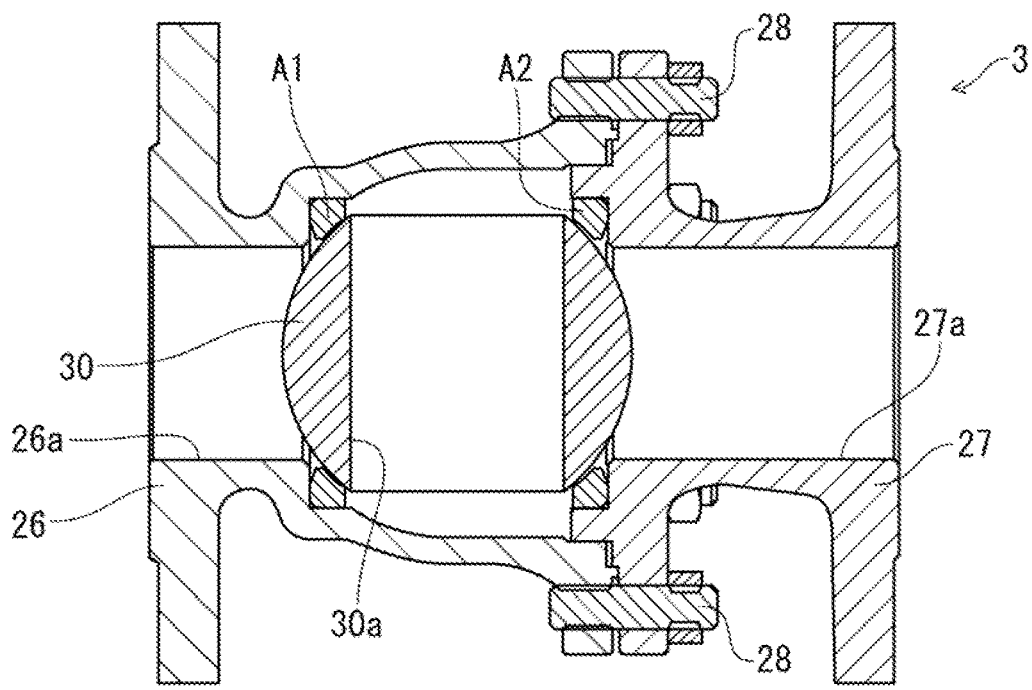
FIG. 10 is a sectional view of a B-B line of FIG. 3, the sectional view depicting one example of a ball valve in a fully-closed state.
Figure 11:
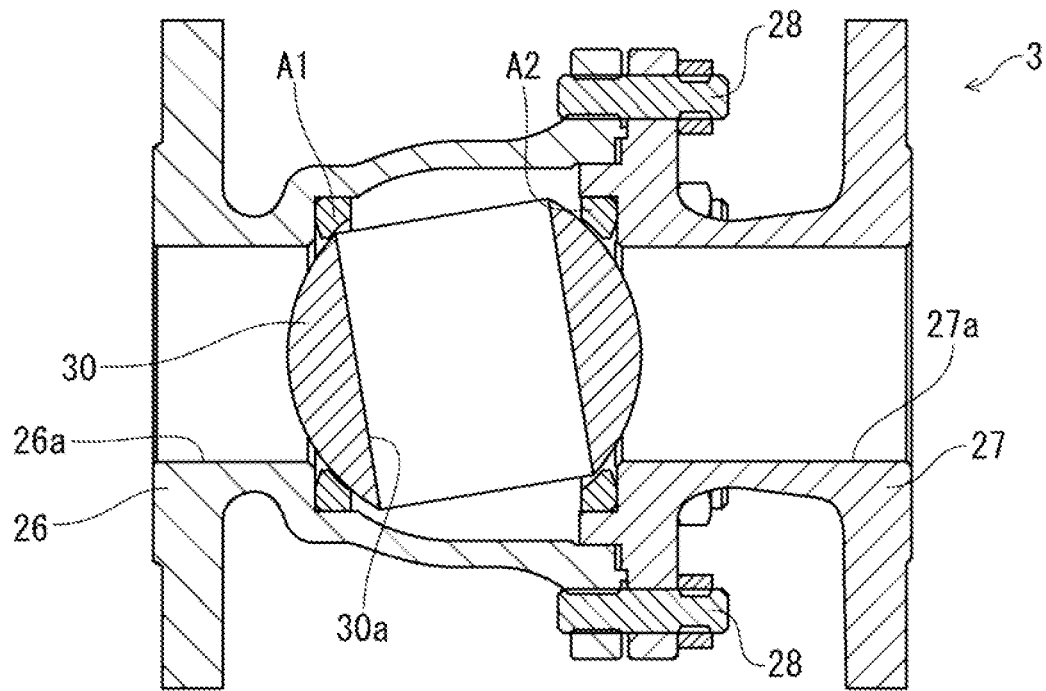
FIG. 11 is a sectional view of the B-B line of FIG. 3, the sectional view depicting one example of the ball valve with an opening degree in the middle.
Figure 12:
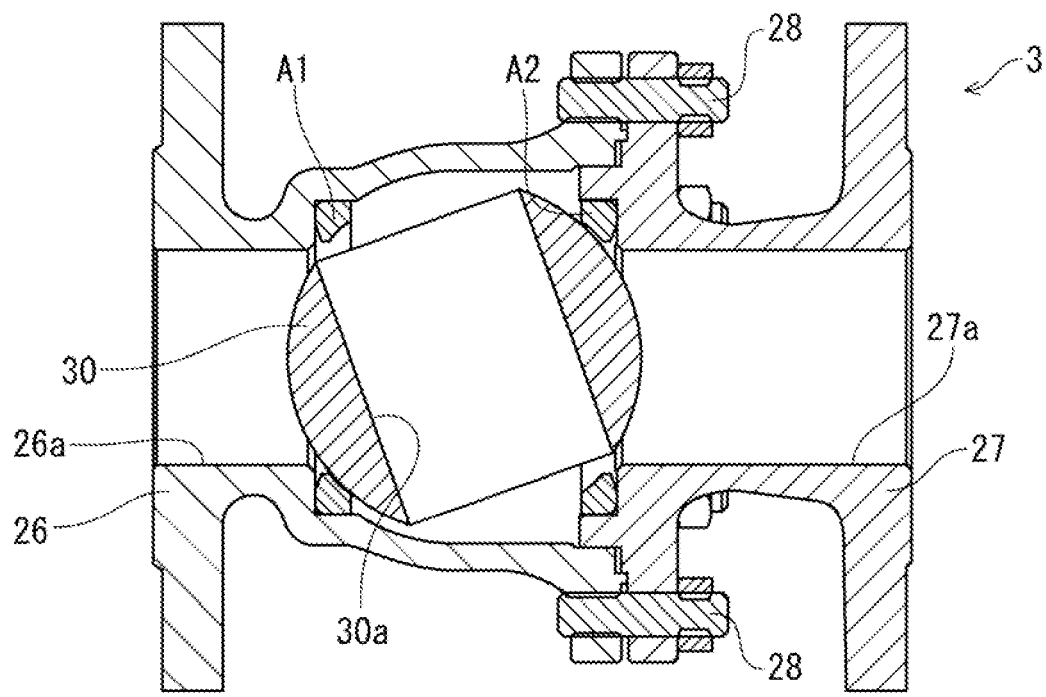
FIG. 12 is a sectional view of the B-B line of FIG. 3, the sectional view depicting one example of the ball valve with an opening degree in the middle.
Figure 13:
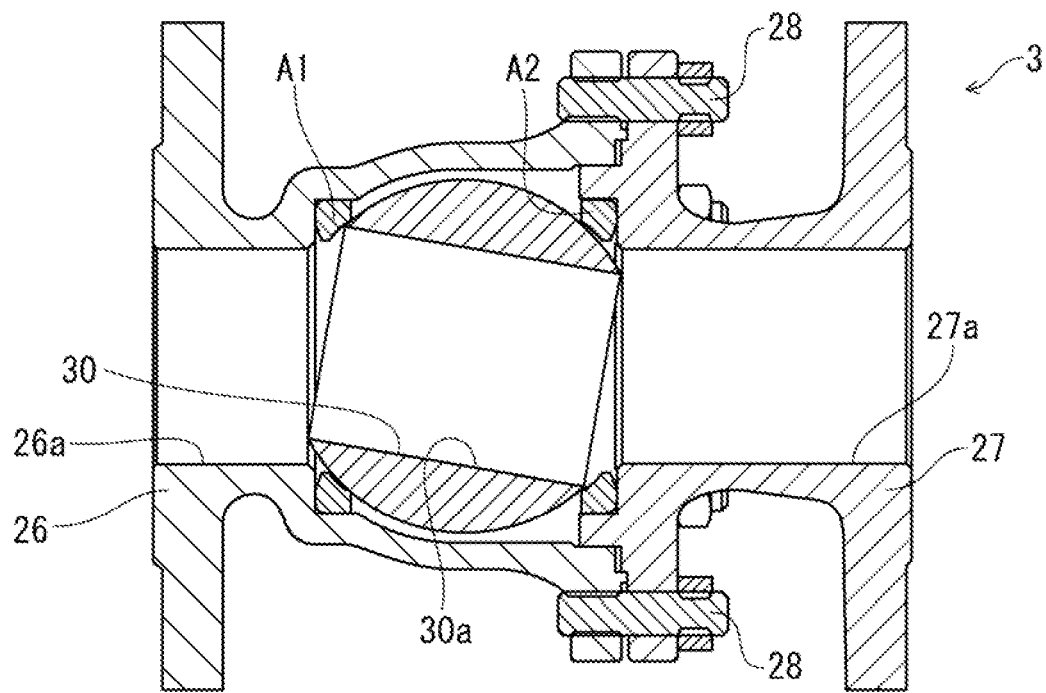
FIG. 13 is a sectional view of the B-B line of FIG. 3, the sectional view depicting one example of the ball valve with an opening degree in the middle.
Figure 14:
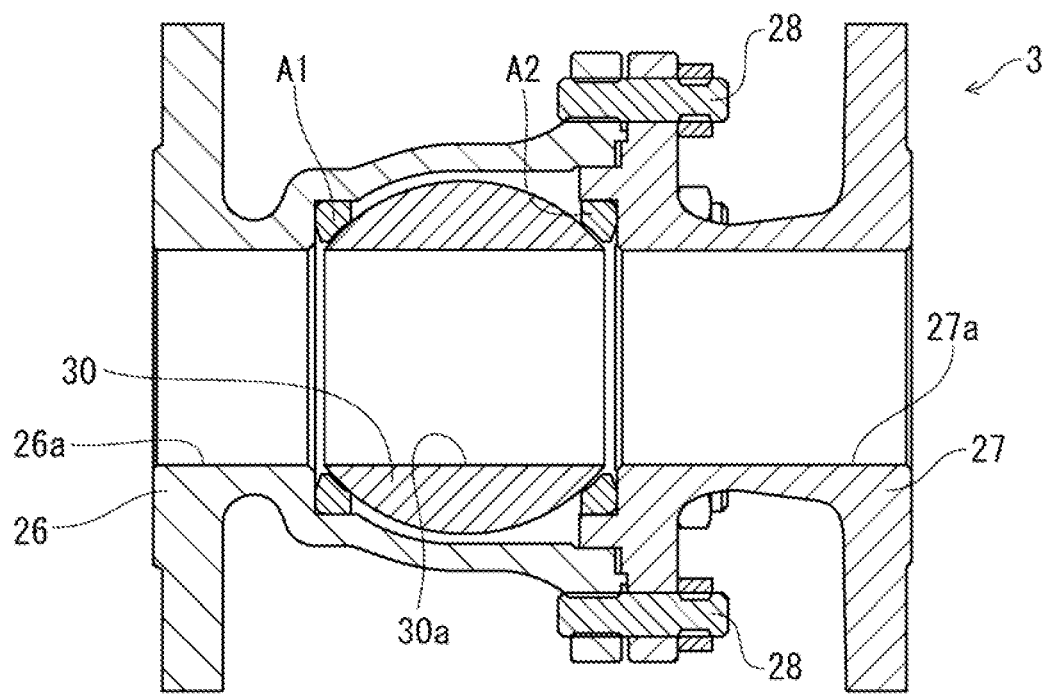
FIG. 14 is a sectional view of the B-B line of FIG. 3, the sectional view depicting one example of the ball valve in a fully-open state.

FIG. 10 to FIG. 14 schematically depict full opening to full closing of the valve depicted in FIG. 5 to FIG. 9 and FIG. 15 to FIG. 20 in this order of figure numbers and, specifically, are drawings for describing the position relation between the through path 30*a* of the ball 30 and the ball seats A1 and A2, and so forth. FIG. 10 depicts an opening degree of 0 (fully closed), FIG. 11 depicts an opening degree of approximately ten degrees, FIG. 12 depicts a opening degree of approximately twenty degrees, FIG. 13 depicts an opening degree of approximately eighty degrees, and FIG. 14 depicts an opening degree of ninety degrees (fully open). Note that FIG. 10 to FIG. 14 each correspond to a sectional view of the B-B line in FIG. 3.

Also, when the state in FIG. 10 is taken as 100%, a ratio of contact between the ball 30 and the ball seat A is still 100% in FIG. 11, is deceased to 85% in FIG. 12, is further decreased to 62% in FIG. 13, and is returned to 100% again in FIG. 14.

TABLE 1

| TEST NUMBER | DRIVING TIME (SECOND/90 DEGREES) | ATTACHMENT ORIENTATION | Act SUPPLY PRESSURE | FLUID | FLUID PRESSURE (MPa) | PLUMBING SUPPORT | AMBIENT TEMPERATURE (° C.) |
|---|---|---|---|---|---|---|---|
| 1 | 8 | SIDEWAY | 0.4 | AIR | 0.55 | 10 | 30 |
| 2 | 2 | SIDEWAY | 0.5 | AIR | 1 | 70 | 60 |
| 3 | 4 | VERTICAL | 0.5 | AIR | 1 | 10 | 0 |
| 4 | 8 | VERTICAL | 0.6 | HOT WATER | 0.1 | 70 | 0 |
| 5 | 2 | VERTICAL | 0.5 | HOT WATER | 0.55 | 40 | 30 |
| 6 | 4 | HORIZONTAL | 0.4 | HOT WATER | 0.55 | 70 | 60 |
| 7 | 2 | HORIZONTAL | 0.4 | COLD WATER | 0.1 | 10 | 0 |
| 8 | 8 | HORIZONTAL | 0.5 | COLD WATER | 1 | 40 | 60 |
| 9 | 4 | SIDEWAY | 0.6 | COLD WATER | 0.1 | 40 | 30 |
| 10 | 4 | HORIZONTAL | 0.5 | STEAM | 1 | 100 | 25 |
| 11 | 2 | HORIZONTAL | 0.2 | COLD WATER | 0.1 | 10 | 0 |

Figure 16:
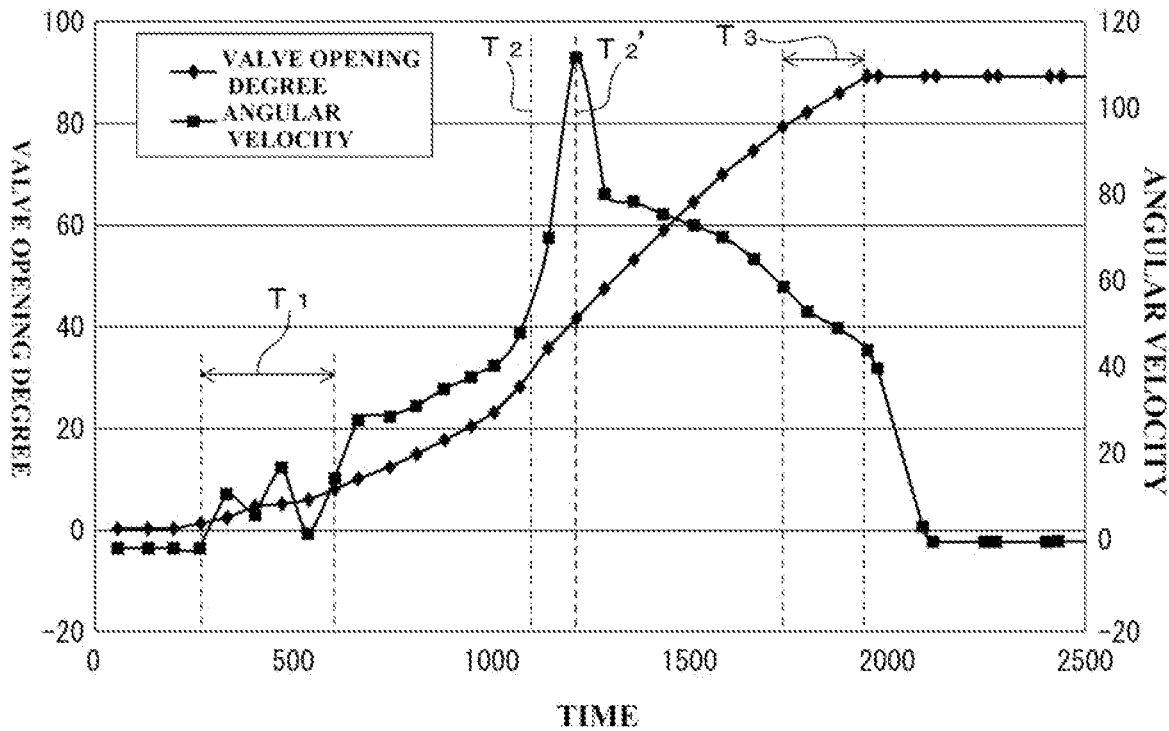
FIG. 16 is one example of the angular velocity graph acquired in the embodiment (test number 2) under specific conditions.
Figure 19:
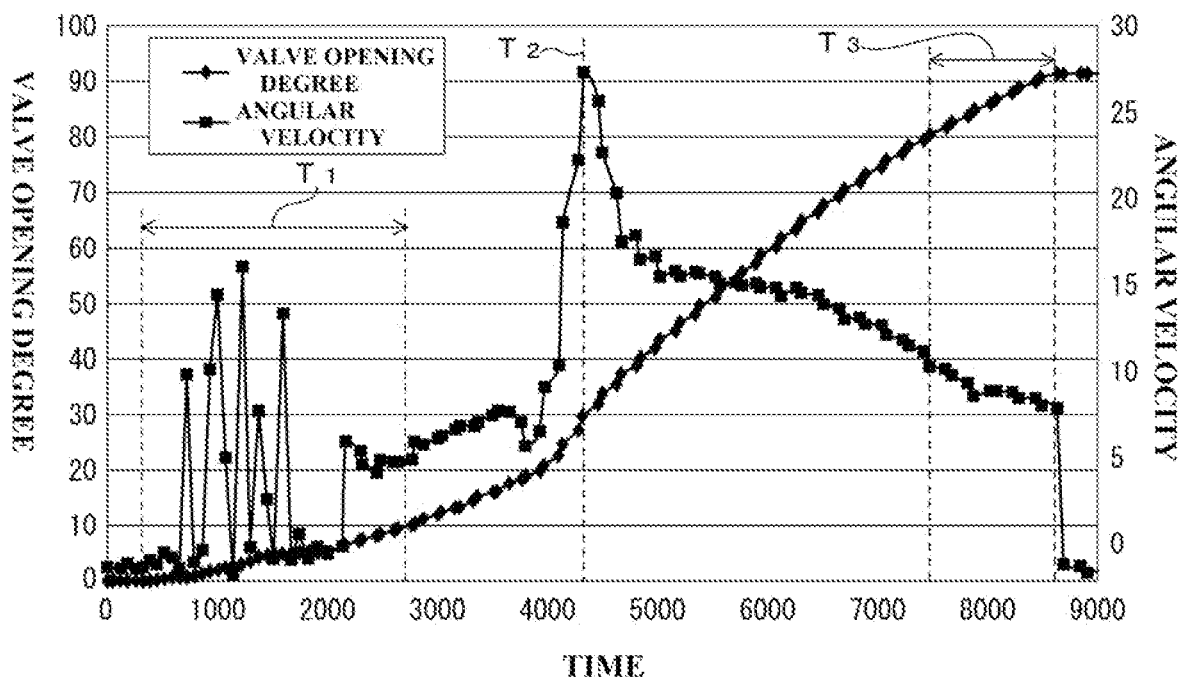
FIG. 19 is one example of the angular velocity graph acquired in the embodiment (test number 8) under specific conditions.
Figure 20:
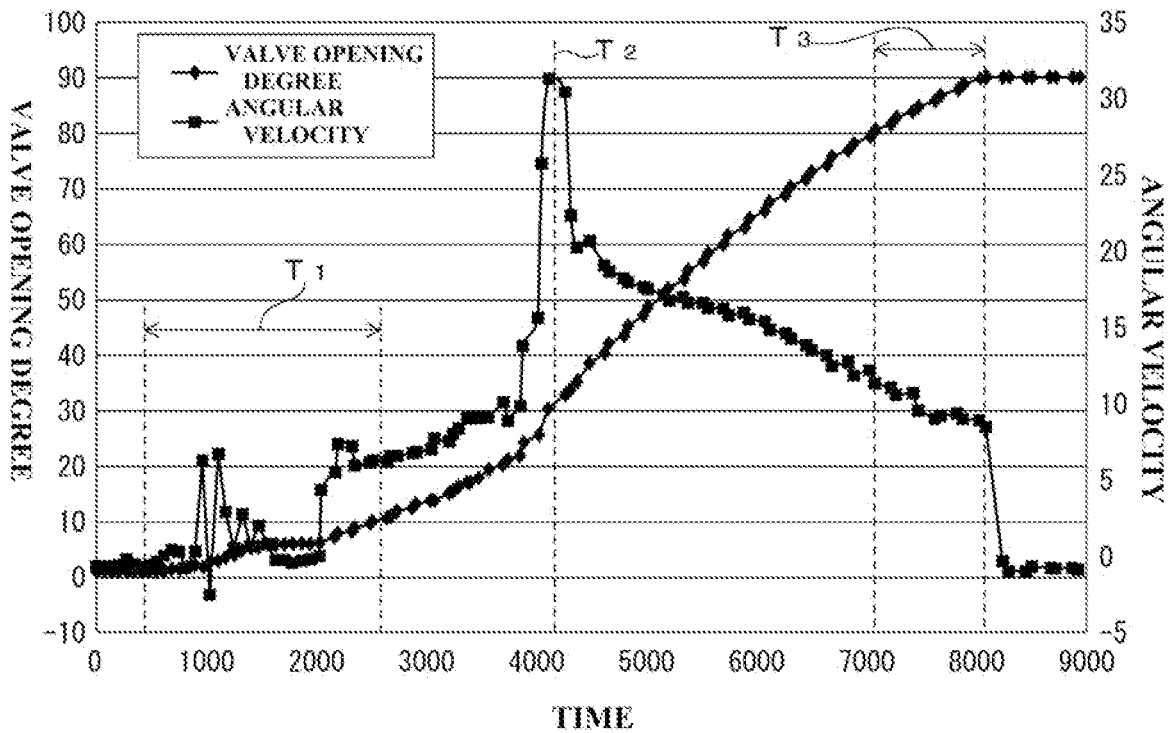
FIG. 20 is one example of the angular velocity graph acquired in the embodiment (test number 8) under specific conditions.

Ten test conditions in Table 1 are examples of conditions of test products required at minimum in view of quality engineering for examining the system of the present invention. FIG. 5 to FIG. 9 depict data of experiments under the conditions of test number 10 in the table (however, the nominal pressure of the valve for use was 10 K), FIG. 15 to FIG. 17 depict data of experiments under the conditions of test number 2, and FIG. 18 to FIG. 20 depict data of experiments under the conditions of test number 8 in the table.

In Table 1, the driving time is a setting time of a speed controller for driving 90-degree rotation of the valve from being fully closed to fully open, and the attachment orientation is the orientation of the valve with respect to plumbing, in which horizontal indicates an orientation in FIG. 1 with a lower side in the drawing taken as the ground, vertical indicates an orientation in FIG. 2 with a lower side in the drawing taken as the ground, sideways indicates an orientation of plumbing with the axial center of the flow path in FIG. 1 rotated about the rotation axis by 90 degrees. Also, Act supply pressure indicates an air pressure (MPa) to be suppled to the actuator, and fluid indicates test fluid type. Fluid pressure indicates pressure of the fluid, plumbing support indicates a distance (cm) from the flange position of the valve to a portion for supporting plumbing connected to the valve, and ambient temperature indicates temperatures of a test environment. Also, tests with test numbers 1 to 9 are performed in a bath at constant temperature and constant humidity, and a test with test number 10 is performed indoors.

In the following, by using each of the angular velocity graphs in FIG. 5 to FIG. 9 (test number 10), FIG. 15 to FIG. 17 (test number 2), and FIG. 18 to FIG. 20 (test number 8), with reference to the opening degree situations of the valve depicted in FIG. 10 to FIG. 14, a general outline of process for performing valve state monitoring is described. In this process, attention is directed to grasping, in particular, a wearing state of the ball seats A, as a valve state. Note that the diagnosis process as described below can be physically and logically introduced to the system of the present invention after specifically implemented as information processing (a set of processing steps) capable of using computer hardware resources.

Also, valve failure prediction and life prediction using angular velocity data by the system of the present invention may be grasped from a rotational motion of the valve from being fully open or fully closed to fully closed or fully open regarding the above-described valve opening degree, that is, from transitions of angular velocity data in accordance with the entire full strokes of the valve, or may be grasped from transitions of angular velocity data in accordance with a part of strokes, for example, regions of valve opening degrees that are characteristic such as regions $T_1$ to $T_3$ as described further below. Furthermore, as other data usable in the system of the present invention, for example, the operating state of the valve in a plant or building facility or angular velocity data in a state of checking the operation of the valve (so-called a partial stroke test) may be used.

First, in FIG. 5 to FIG. 9 (test number 10), the region $T_1$ is an region in which the valve opening degree by encoder measurement is from a fully-closed state to an opening degree of approximately 10 degrees. The operation of the ball 30 corresponds to the states from FIG. 10 to FIG. 11.

Within this region $T_1$ (a region in which the angular velocity frequently goes up and down in a state in which the ball 30 makes a contact seal with the entire circumference of each of the ball seats A1 and A2), the ball seats A1 and A2 are both in a state of being in contact with the ball 30, and this state corresponds to a state immediately after a transition from static friction to dynamical friction. As for the frequency of decrease in angular velocity in this region, the frequency can be read as twice in FIG. 6, but is increased to four times in FIG. 9. In this data characteristic, for example, it can be estimated that some difficulty occurs with the rotation of the ball 30, in which, for example, the ball 30 is moved by the wear of the ball seats A1 and A2 to a secondary ball seat A2 side to increase a pressing force and increase a dynamical friction force. Thus, this can be used for, by way of example, prediction of a failure with attrition of the ball seats A1 and/or A2 or deterioration of the seal surface.

Also, a change in time until reaching the region $T_1$, that is, time required from a time when an air pressure is supplied to the actuator 2 to the ball 30 starts rotation, can also be used for failure prediction. Specifically, in FIG. 6, the region $T_1$ starts from a time near 1000 milliseconds, and a time lag from air pressure supply to the actuator 2 to rotation is on the order of one second. By contrast, in FIG. 8, it starts from a time near 350 milliseconds. Thus, as the valve open/close count increases, this time lag decreases. From this data characteristics, it can be estimated that the static friction force of the ball seats A decreases.

Furthermore, the duration of the region $T_1$ can also be used for failure prediction. Specifically, while the region $T_1$ can be read as approximately 1000 milliseconds to 1800 milliseconds in FIG. 7, it is from approximately 350 milliseconds to 1500 milliseconds in FIG. 8. As the valve open/close count increases, the time required for region $T_1$, that is, the time required for rotation of the ball 30, increases. From this data characteristic, it can be estimated that an increase in the dynamical friction force of the ball seats A occurs. Thus, this can be used for, by way of example, prediction of failure with attrition of the ball seats A.

In FIG. 5 to FIG. 9, the region $T_2$ is a small band with an opening degree near approximately 30 degrees, and this corresponds to, as operation of the ball 30, a state in which the ball further rotates (opening degree of approximately 20 degrees to 30 degrees) near approximately from the state in FIG. 12. Near this region $T_2$, a state is included in which, from an entire peripheral surface contact state in the region $T_1$, the through path 30a of the ball 30 reaches the ball seats A to make a transition to a partial contact state and, with valve opening, the fluid pressurizes the inner wall of the through path 30a of the ball 30 to cause a force in a valve-opening direction to act on the ball 30. In the present example, the fluid flows from left to right in FIG. 10 to FIG. 14.

This action of the valve-opening force by the fluid is also caught in the angular velocity graph (characteristic graph) as an upsurge. Specifically, while the local maximum value near the region $T_2$ in FIG. 6 can be read as approximately 44 degrees/second, the local maximum value in FIG. 8 near the same is approximately 63 degrees/second. Thus, an increase in the local maximum value of the angular velocity with the increase in the valve open/close count can be read. According to this data characteristic, it can be estimated that a decrease in the dynamical friction force of the ball seats A occurs. Thus, this can be used for, for example, prediction of failure with attrition of the ball seats A. In a state in which the ball 30 partially makes contact with the ball seats A1 and A2, in addition to a decrease in the dynamical friction force, with a force applied to the rotating direction of the ball 30 by the action of the fluid pressure, the decrease in the dynamical friction force further proceeds. Thus, the fluid pressure is grasped as a friction element is suitable in the region $T_2$.

Also, as with the region $T_1$, a time until reaching the region $T_2$ can also be used for failure prediction. While the region $T_2$ occurs approximately near 2300 milliseconds in FIG. 6, it occurs approximately near 2000 milliseconds in FIG. 8. Thus, the time degreases as the valve open/close count increases, and rotation starts at an early stage. Thus, it can be estimated that the static friction force or dynamical friction force of the ball seats A decreases, and this can be used for prediction of failure with attrition of the ball seats A.

In FIG. 5 to FIG. 9, the region $T_3$ is a region from an opening degree of approximately 80 degrees to a full-open state (an opening degree of 90 degrees and an angular velocity of 0), and this corresponds to, as operation of the ball 30, a state from FIG. 13 to FIG. 14. In this region $T_3$, a state is included in which a transition is made from the partial contact state to the entire peripheral surface contact state again with respect to the ball seats A and a transition is made from the dynamical friction force to the static friction force.

Figure 6:
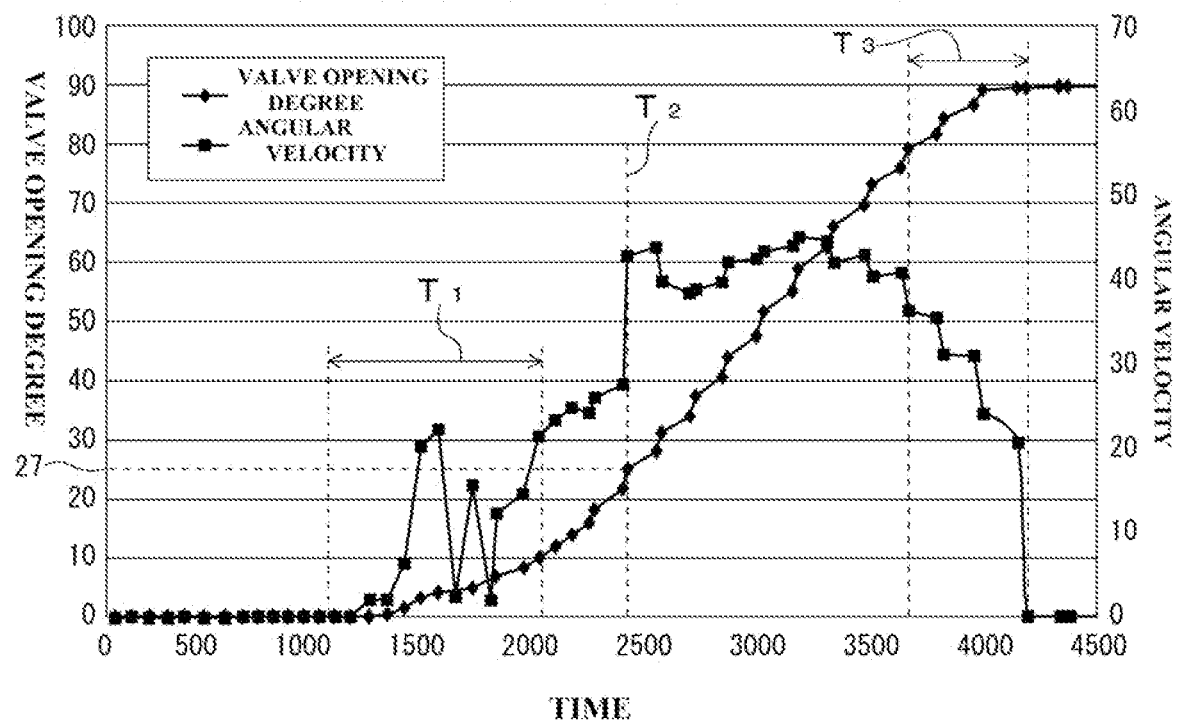
FIG. 6 is one example of the angular velocity graph acquired in the embodiment (test number 10) under specific conditions.

In the region $T_3$, while a tendency is indicated in FIG. 6 in which the magnitude of the angular velocity decreases from approximately 42 degrees/second, a decreasing tendency from approximately 30 degrees/second is indicated in FIG. 8. According to this data characteristic, even if a transition is made to the state in which the ball 30 seals with the entire peripheral surface of the ball seats A1 and A2, this does not lead to a decrease in angular velocity. Thus, it can be estimated that, for example, a decrease in the dynamical friction force occurs, and this can be used for prediction of failure with attrition of the ball seats A.

The duration of the region $T_3$ can also be used for failure prediction. Specifically, while the region $T_3$ can be read as approximately 3500 milliseconds to 4000 milliseconds in FIG. 7, it is from approximately 3500 milliseconds to 4100 milliseconds in FIG. 8. As the valve open/close count increases, the time required for region $T_3$, that is, the time required for rotation of the ball 30, increases. From this data characteristic, it can be estimated that an increase in the dynamical friction force of the ball seats A occurs. Thus, this can be used for, by way of example, prediction of failure with attrition of the ball seats A. Note that while the state is exemplarily depicted in the present example in which the required time increase as the open/close count of the valve 3 increases in region $T_3$, this is not meant to be restrictive and the wearing state of the ball seats A1 and A2 may be grasped with reference to a state in which the required time decreases.

Figure 24:
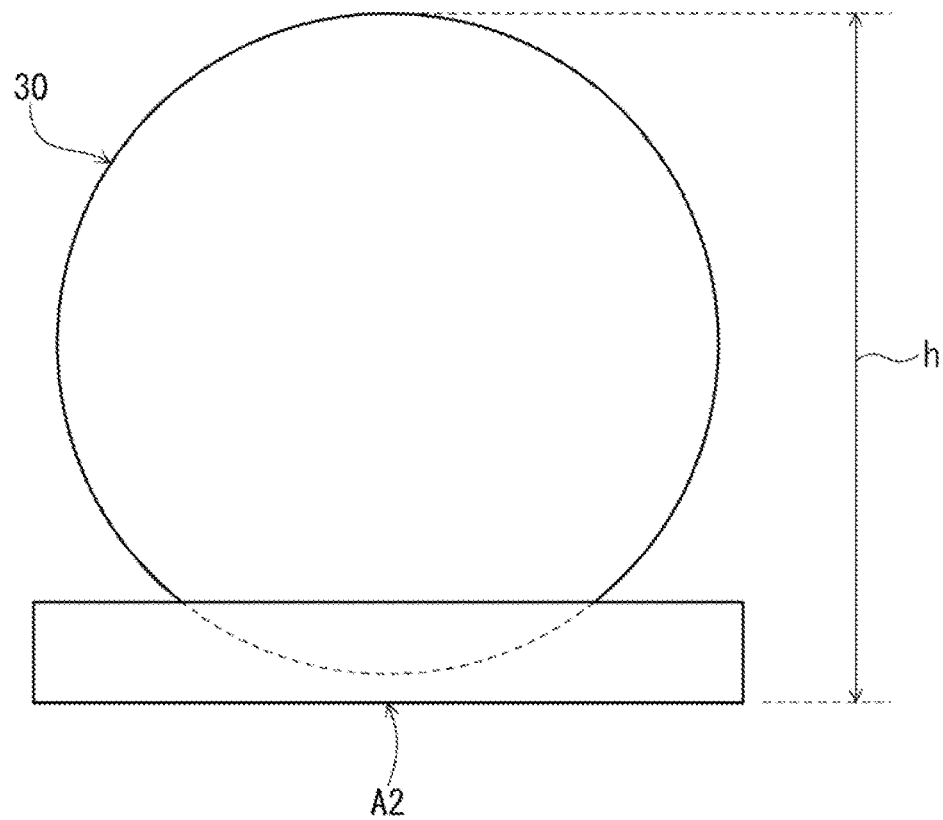
FIG. 24 is a schematic descriptive diagram describing one example of a situation of measuring a wearing amount of a ball seat.

Next, description is made to the results of measuring an actual wearing amount of the ball seat A2 in the examples of the test number 10 described above. Note that FIG. 24 is a schematic descriptive diagram describing this measurement situation. In the measurement, after operation at each open/close count (thirty times, five hundred times, thousand times, and ten thousand times), the ball valve 3 was disassembled to extract the ball 30 and the secondary ball seat A2 and, as depicted in the schematic diagram of FIG. 24, the extracted ball seat A2 was placed on an appropriate horizontal surface and, with the extracted ball 30 being placed on its seal surface, an overall height h from a bottom surface side of the ball seat A2 to the apex of the ball 30 was measured for every open/close count. That is, in accordance with an increase of the wearing amount of the ball seat A2, this overall height h slightly decreases and, therefore, from that amount of decrease, at least the degree of a wearing state can be grasped (the overall height h is referred to as a "G dimension" of the ball seat A).

Figure 7:
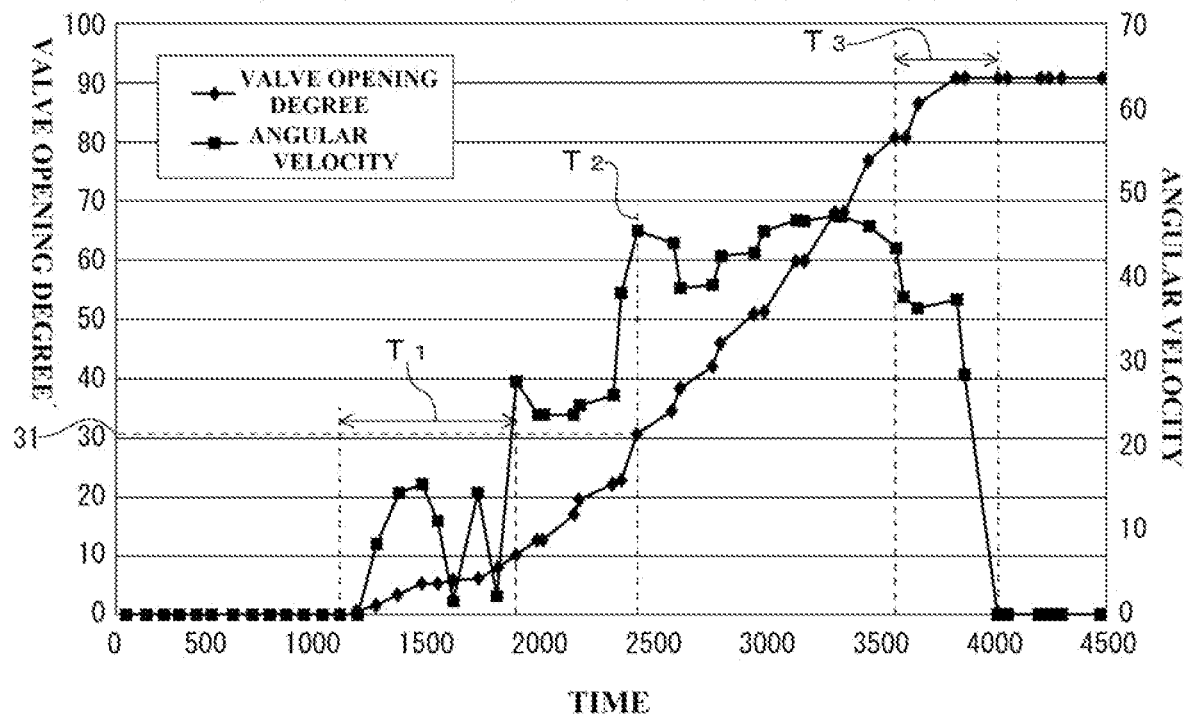
FIG. 7 is one example of the angular velocity graph acquired in the embodiment (test number 10) under specific conditions.

Actually, the amount of decrease=0.26 mm was the same between the open/close count of thirty times (corresponding to FIG. 6) and the open/close count of five hundred times (corresponding to FIG. 7). However, the amount of decrease=0.36 mm for the open/close count of thousand times (corresponding to FIG. 8) and the amount of decrease=0.48 mm for the open/close count of ten thousand times (corresponding to FIG. 9), and it was thereby confirmed that the decrease amount increases as the actuation count increases and wearing actually proceeds. Note that as a result of checking the actual seal surface by visual inspection after actuation with each open/close count, a change of the seal surface was hardly observed at the open/close counts of zero time and thirty times but a linear or groove-shaped trace of contact with the ball was observed at the open/close count of thousand times and a sign of rubbing with a metal (ball) and a band-shaped contact trace were observed at the open/close count of ten thousand times.

Note that a valve seal leakage was confirmed after actuation ten thousand times in the present example. Therefore, with acquisition of at least the angular velocity data in FIG. 9, prediction of failure due to waring of the ball seats and so forth and life prevision can be performed.

Next, a general outline of process of state monitoring in FIG. 15 to FIG. 17 (test number 2) and FIG. 18 to FIG. 20 (test number 8) is described. Also in each of FIG. 15 to FIG. 20, regions $T_1$ to $T_3$ indicate the same meaning similar to the above. From these graphs, as with the above, valve state monitoring can be made.

That is, by reading the time until reaching the region $T_1$, the duration, or a change in frequency of appearance of the local maximum or local minimum peak of the angular velocity in that region in accordance with the valve open/close count, at least the wearing state of the ball seats can be inferred and used for valve failure prediction. Also in the region $T_2$, by reading a change in the position or magnitude of the local maximum peak in accordance with the open/close count, at least the wearing state of the ball seats can be inferred and used for valve failure prediction. However, in FIG. 16 and FIG. 17 (test number 2), the position of the local maximum peak differs from the other results, and can be found to be shifted to a position near a region $T_2'$ (a small band with an opening degree near approximately 40 degrees). Also in the region $T_3$, by reading a change in time and duration until reaching that region or in rate of change of the angular velocity in that region in accordance with the open/close count, at least the wearing state of the ball seats can be inferred and used for valve failure prediction.

Figure 21:
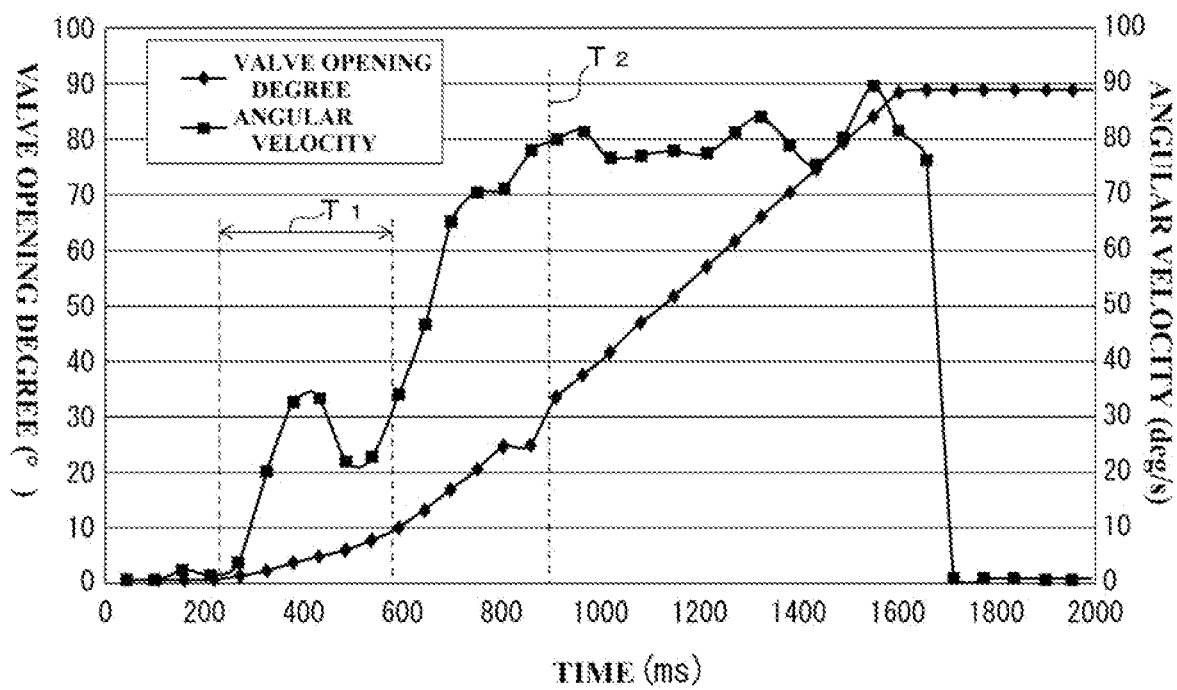
FIG. 21 is one example of an angular velocity graph acquired in an embodiment (test number 11) under specific conditions.
Figure 22:
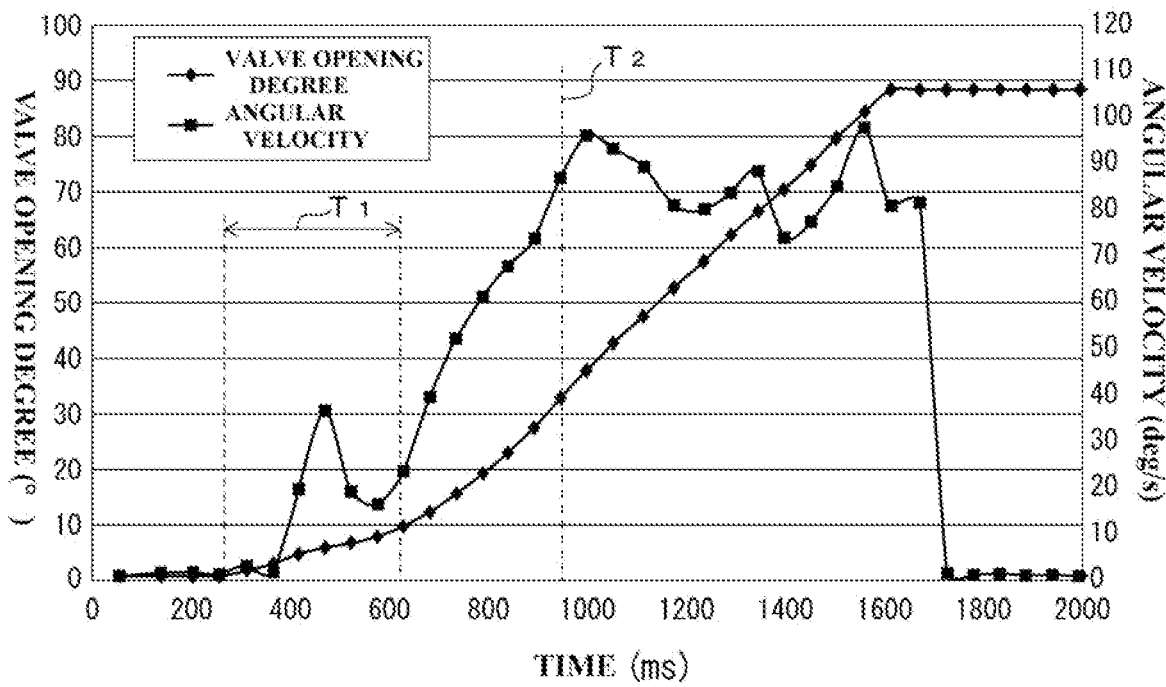
FIG. 22 is one example of the angular velocity graph acquired in the embodiment (test number 11) under specific conditions.
Figure 23:
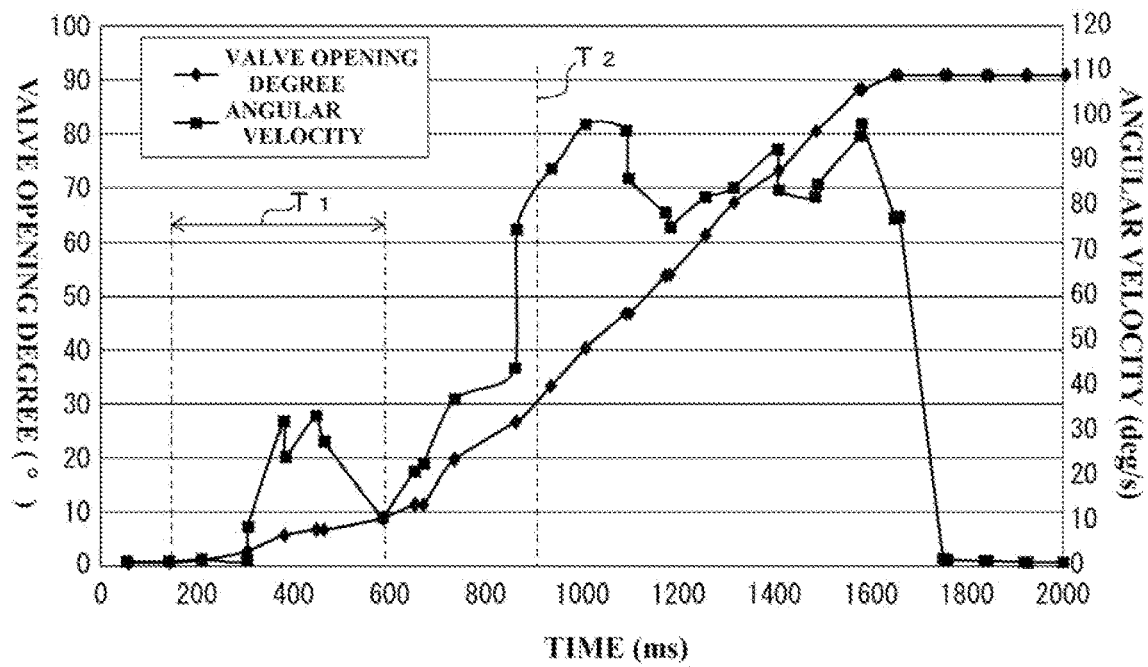
FIG. 23 is one example of the angular velocity graph acquired in the embodiment (test number 11) under specific conditions.

Next, in each of FIG. 21 to FIG. 23 (test number 11), although no structural diagram is depicted, but depicted is one example of an angular velocity graph acquired from the gyro sensor by using the monitoring unit of the present invention when the valve body rotates from being fully closed to fully open by 90 degrees in a double-actuated pneumatic actuator in a rack-and-pinion structure and a quarter-turn-type butterfly valve. Details of graph marking are similar to the above, and the test conditions correspond to those of test number 11 in Table 1.

Specifically, this butterfly valve has a center-type butterfly valve structure made by aluminum die-casting and having a nominal pressure of 10 K and a nominal diameter of 50 A. To its valve stem, the monitoring unit of the present invention is attached in a manner similar to the above-described mode. The graphs in the drawings are also similar to the above, and angles by encoder measurement and angular velocities acquired by the gyro sensor (Y-axis measurement values) incorporated in the monitoring unit are put in graph form. The diagnosis target is an EPDM-made rubber seat. Also, FIG. 21 depicts data acquired after opening/closing with the open/close count of zero time, FIG. 22 after five hundred times, and FIG. 23 after one thousand five hundred times.

Also in FIG. 21 to FIG. 23, each of regions $T_1$ and $T_2$ means the same as above. From these graphs, valve state monitoring can be made in a manner similar to the above. That is, the region $T_1$ is a region in which the valve body leaves the state of making contact with the rubber seat, and is also a region where a so-called jumping phenomenon occurs. In this region, as actuation repeats with the open/close count to five hundred times and then one thousand five hundred times, a change can be observed in the increasing/decreasing tendency of the angular velocity. According to this data characteristic, for example, this can be used for prediction of failure with attrition of the rubber seat and deterioration of the seal surface.

Also in the region $T_2$, the valve body leaves the rubber seat to become oriented with an intermediate opening degree. In this state, unbalanced torque by the fluid acts on the valve body, causing the valve body to become further open with ease. As actuation repeats with the open/close count to five hundred times and then one thousand five hundred times, an increase in the angular velocity becomes steep, and a tendency in which the time until reaching the region $T_2$ is shortened can also be read. According to this data characteristic, this can be used for prediction of failure with attrition of the rubber seat, for example, in a vertical direction (around the stem) of the valve body.

Figure 25:
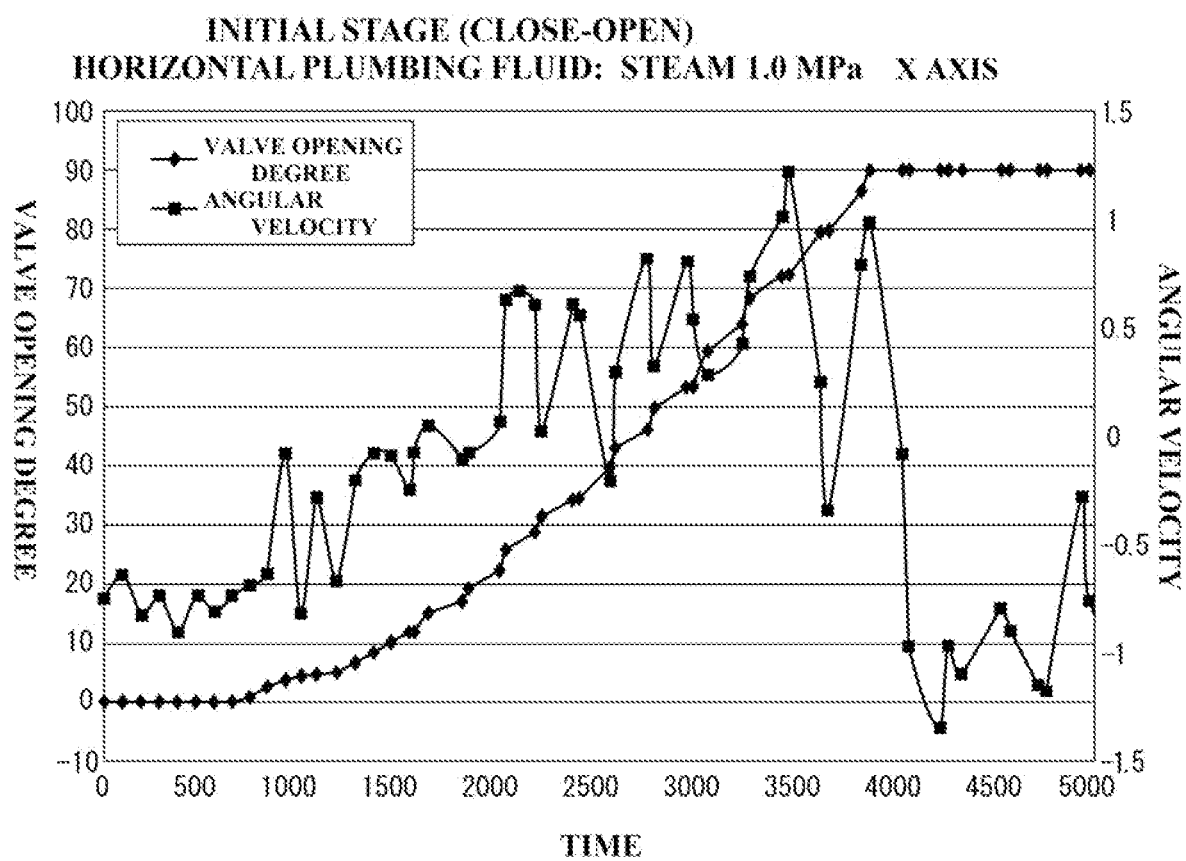
FIG. 25 is an example of an X-axis angular velocity graph acquired in another example (initial motion).
Figure 26:
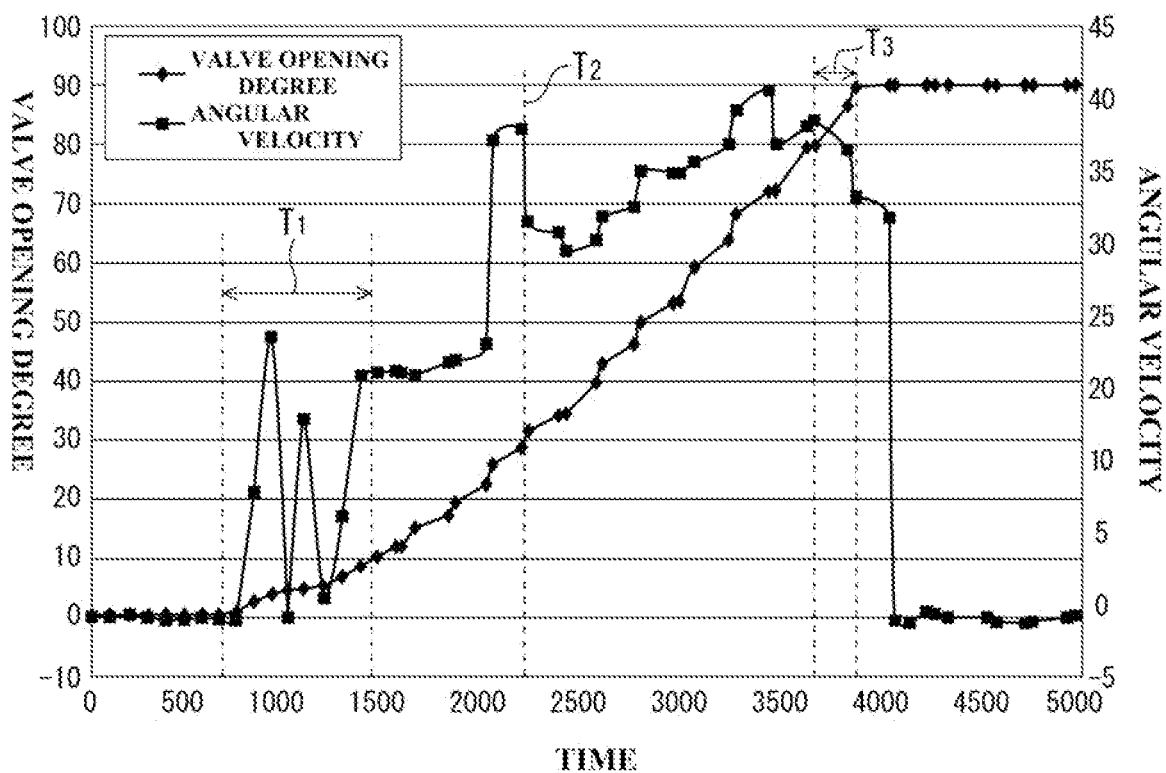
FIG. 26 is an example of a Y-axis angular velocity graph acquired in the other example (initial motion).
Figure 27:
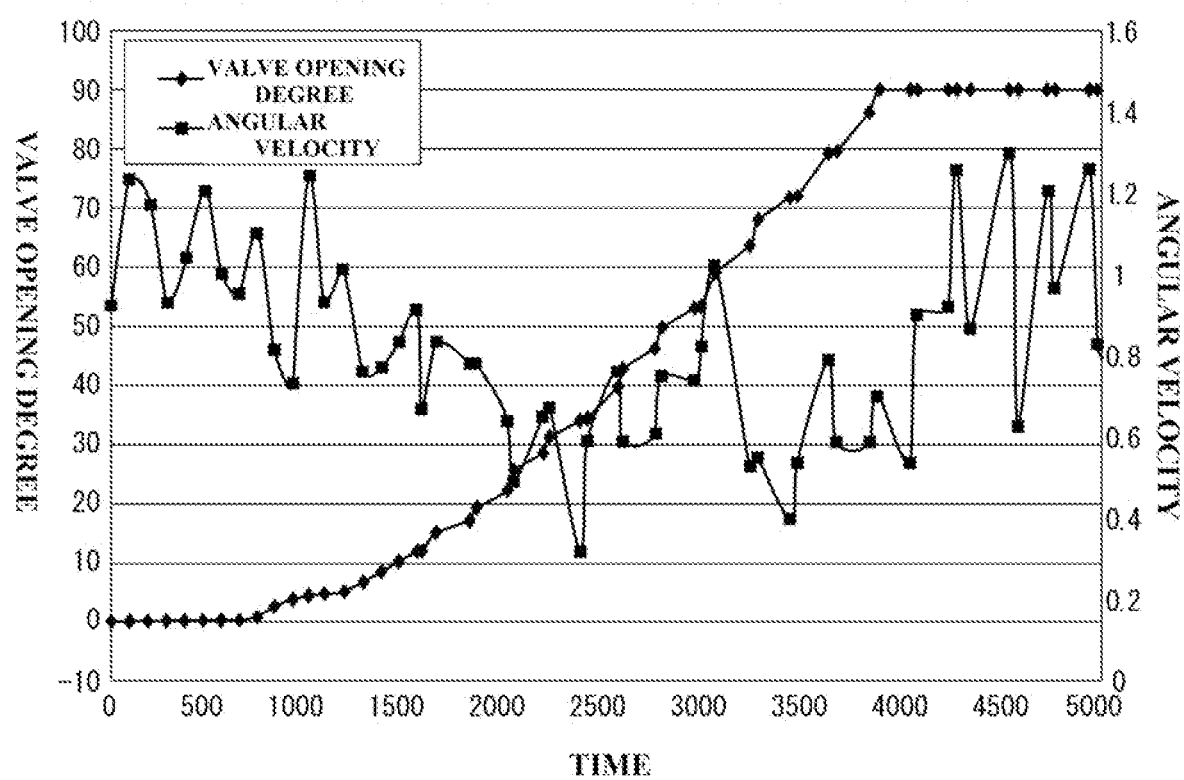
FIG. 27 is an example of a Z-axis angular velocity graph acquired in the other example (initial motion).

Next, FIG. 25 to FIG. 30 each depicts an angular velocity graph acquired in another example different from the above-described example. In this other example, tests were performed under substantially the same conditions as those of test number 10 described above (conditions including horizontal plumbing using the ball valve depicted in FIG. 1, steam, and 1.0 Mpa), and graph marking (such as the amount indicated by each axis and line types) is also similar to that of FIG. 5 and so forth. However, unlike the above-described example, angular velocity data on the X axis and the Z axis (other than the roll axis) of the gyro sensor 7 depicted in FIG. 1 is also measured. That is, FIG. 25 is a graph in which angular velocity data in the X-axis direction at initial motion is put in graph form, FIG. 26 is a graph in which angular velocity data in the Y-axis direction at initial motion is put in graph form, and FIG. 27 is a graph in which angular velocity data in the Z-axis direction at initial motion is put in graph form. Thus, FIG. 5 and FIG. 26 depict angular velocity graphs under substantially the same conditions.

Figure 28:
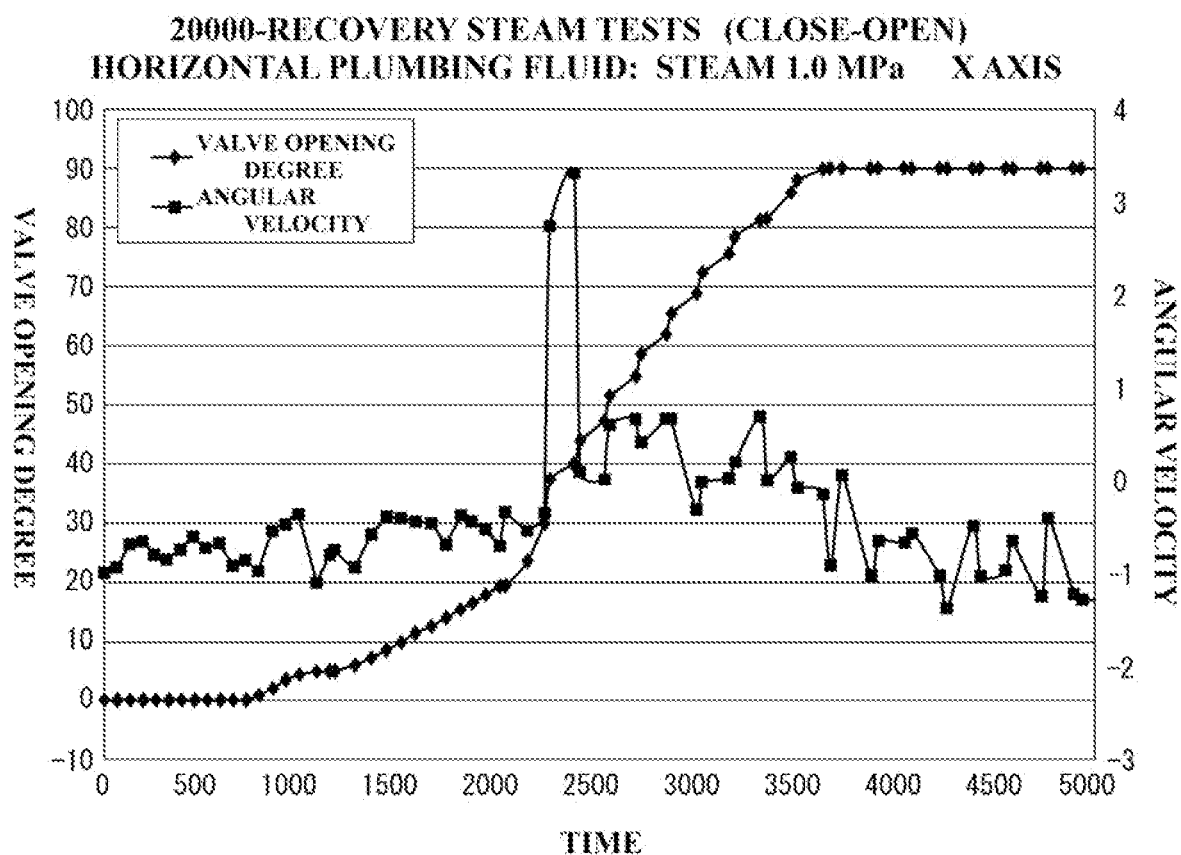
FIG. 28 is an example of an X-axis angular velocity graph acquired in another example (twenty thousand times).
Figure 29:
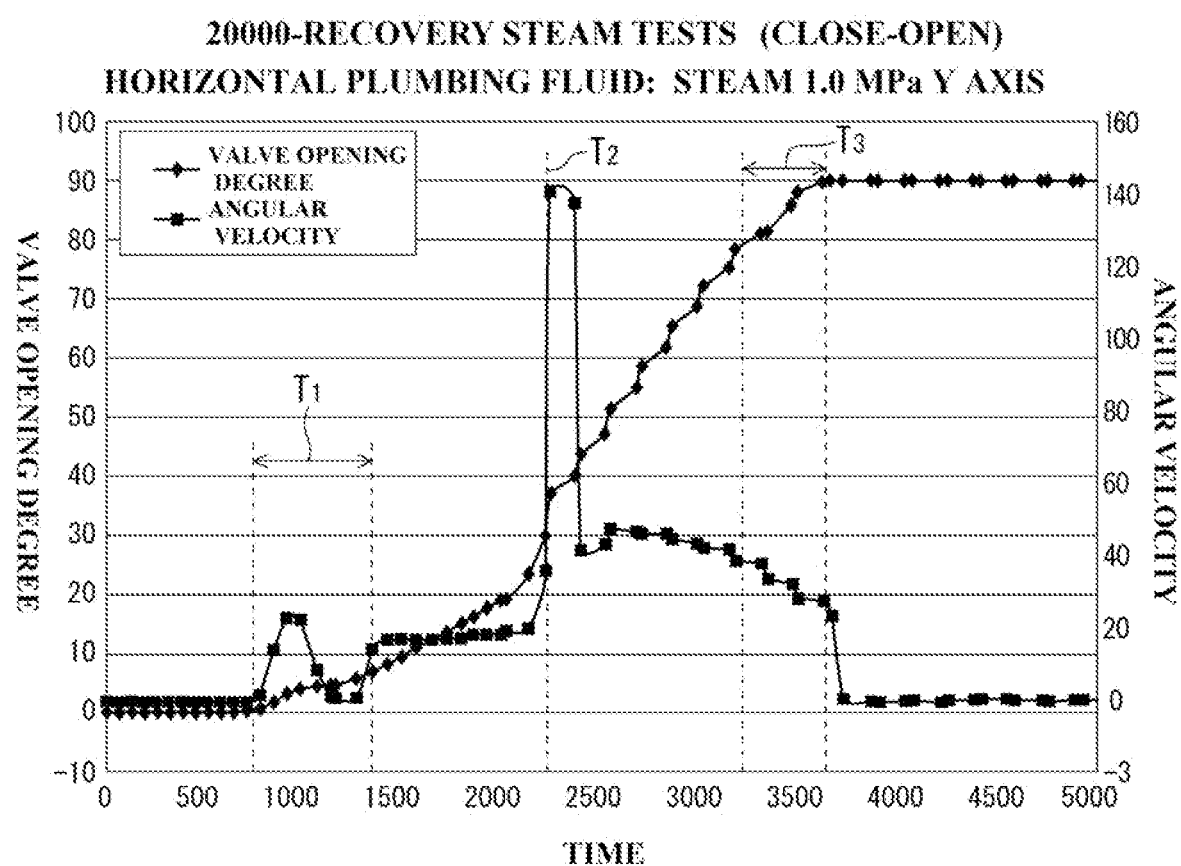
FIG. 29 is an example of a Y-axis angular velocity graph acquired in the other example (twenty thousand times).
Figure 30:
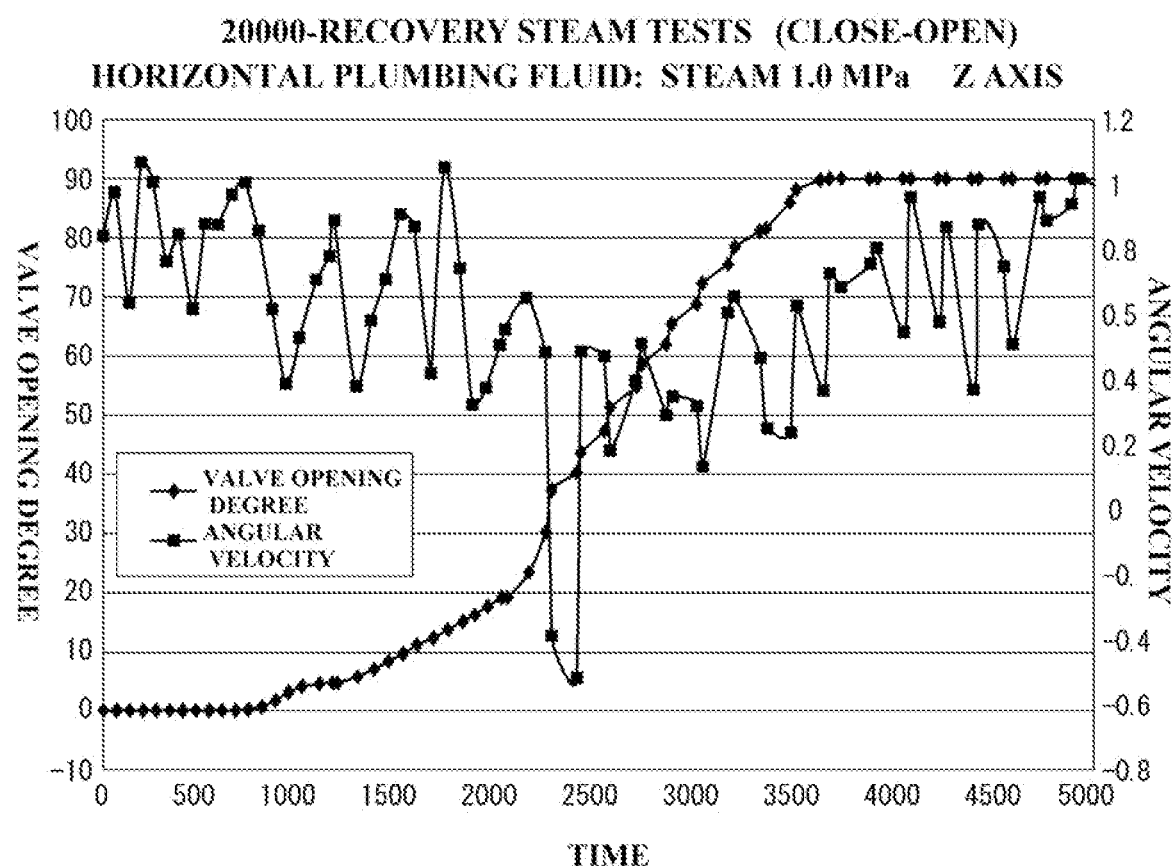
FIG. 30 is an example of a Z-axis angular velocity graph acquired in the other example (twenty thousand times).

Also, FIG. 28 to FIG. 30 are angular velocity graphs after the valve is open and closed twenty thousand time after the initial motion in FIG. 25 to FIG. 27, angular velocity data in the X-axis direction in FIG. 28, in the Y-axis direction in FIG. 29, and in the X-axis direction in FIG. 30 are put in graph format, in a manner similar to those of FIG. 25 to FIG. 27. Thus, FIG. 28 corresponds to FIG. 25, FIG. 29 corresponds to FIG. 26, and FIG. 30 corresponds to FIG. 27. In particular, FIG. 29 can be said to depict data acquired after FIG. 9, which is a graph after the valve is open and closed ten thousand times under substantially the same conditions.

As depicted in FIG. 26 and FIG. 29, from the angular velocity graphs in the Y-axis direction, a tendency similar to that of the other graphs in the Y-axis direction can be read. In particular, in FIG. 26, as with FIG. 5, one or plurality of peak-like features appear in the region $T_1$, at least one steep pattern appears near the region $T_2$, and a decreasing pattern appears in the region $T_3$. Also in FIG. 29, features substantially similar to the above is acquired. However, compared particularly with FIG. 9, while the peak-like (maximum value) feature in the region $T_2$ is more significant, a gradual pattern in which the angular velocity decreases as a whole is acquired. In any case, it can be said that features that are easy to catch are acquired.

On the other hand, in FIG. 25, FIG. 27, FIG. 28, and FIG. 30, which are graphs regarding directions other than the Y-axis directions, at least features as described above do not significantly appear, and many random amplitudes that are not easy to catch are observed. Thus, as angular velocity data to be put in graph form, it can be said that angular velocity data in the roll-axis (Y-axis) direction of rotation is preferable.

Figure 31:
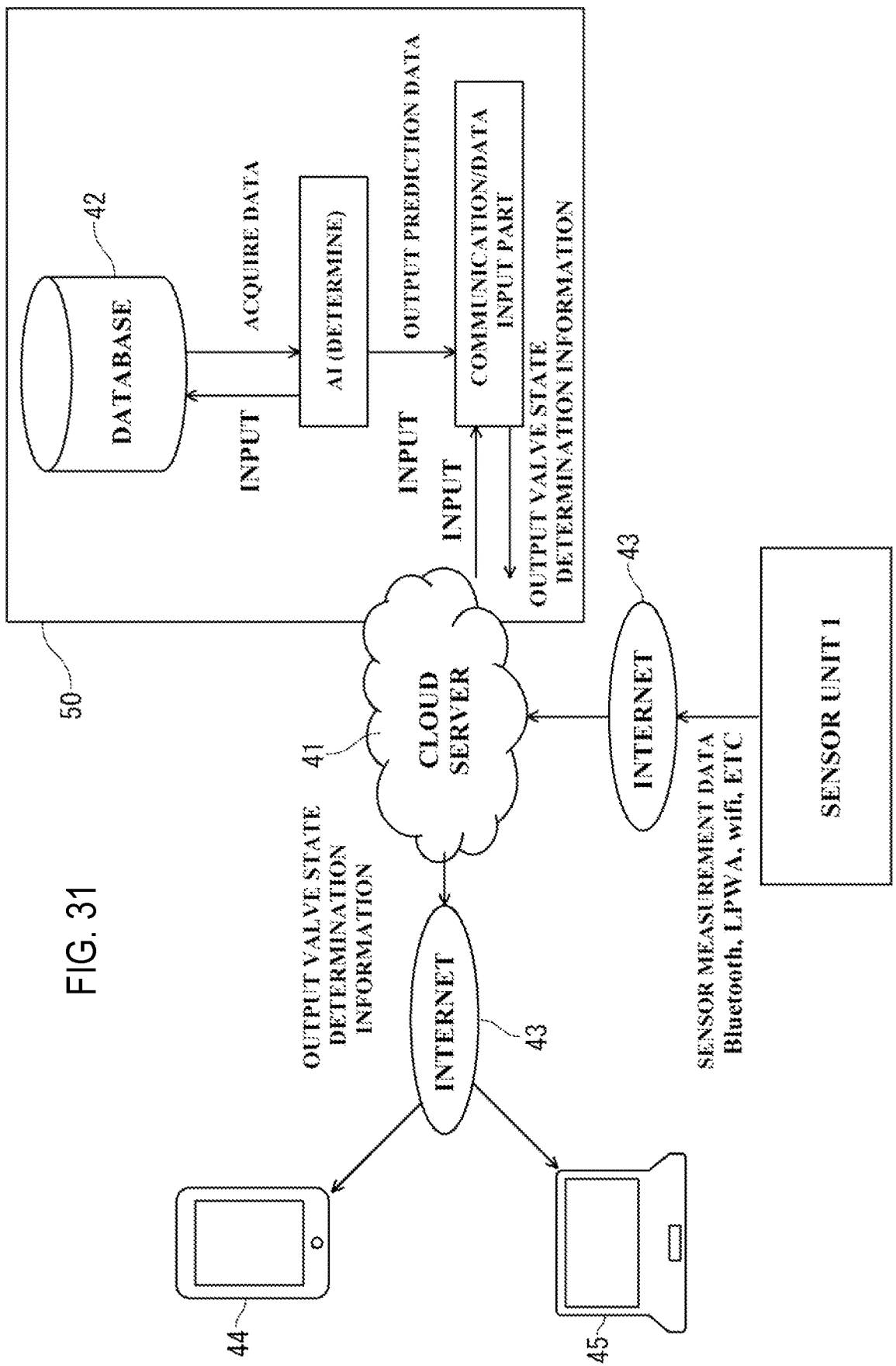
FIG. 31 is a block diagram depicting a general outline of a valve state grasping system of the present invention.
Figure 32:
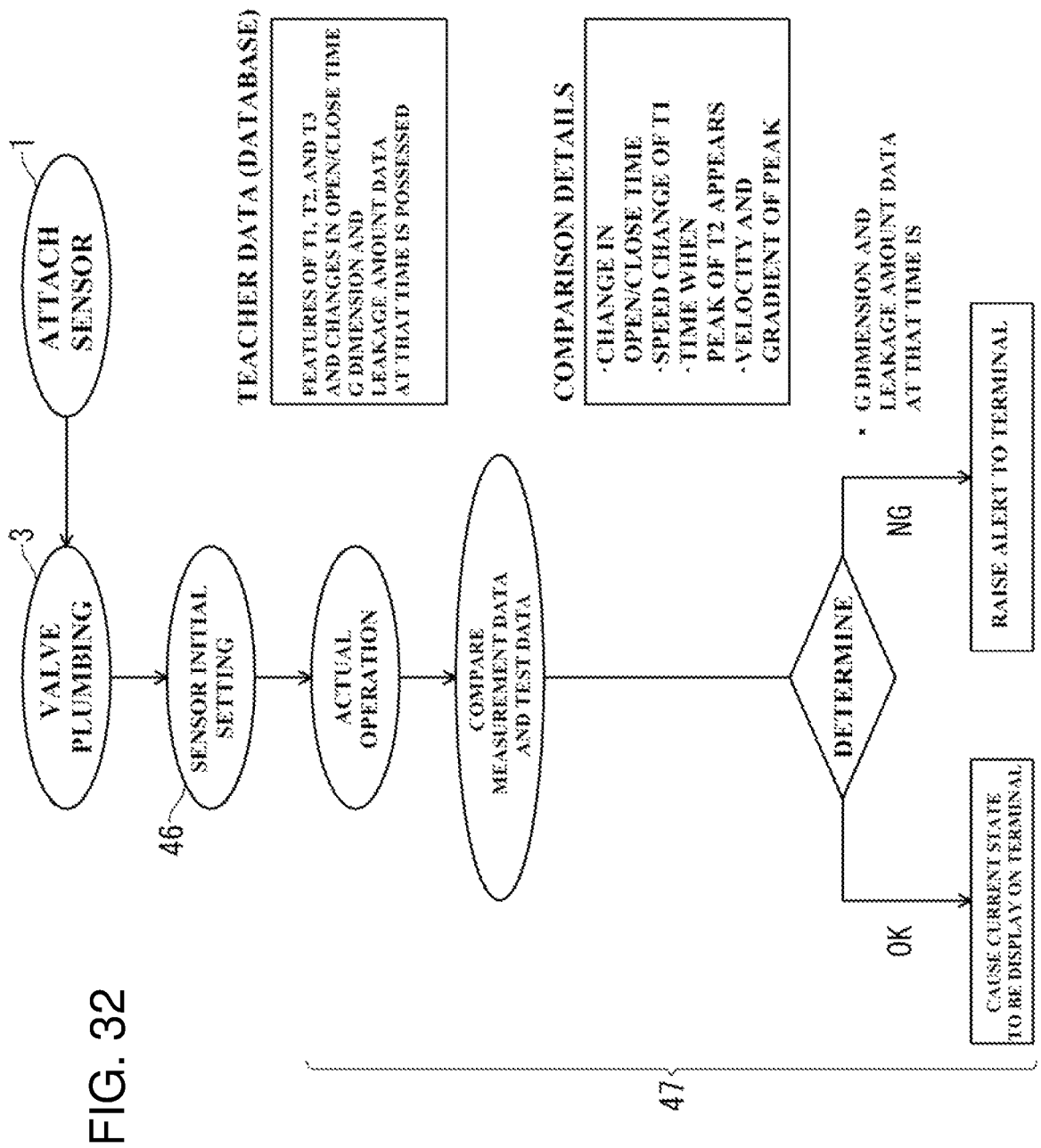
FIG. 32 is a flowchart diagram depicting a general outline of an anomaly diagnosis process of the valve state grasping system of the present invention.

Next, in FIG. 31 and FIG. 32, the valve state grasping system of the present invention is described. The present invention is directed to a valve state grasping system, and the system includes the valve 3, a sensor unit 1 fixed to this valve 3, and a server 41 communicably connected to this sensor unit 1, based on a feature value included in measurement data measured by the sensor 7 included in the sensor unit 1 from a valve stem 4 which opens and closes the valve 3, a wearing state of a wear component (A, B, C) is grasped.

In FIG. 31, the valve 3 is the above-described ball valve depicted in FIG. 1, and the sensor unit 1 is also the above-described monitoring unit 1 depicted in FIG. 1. Also, as depicted in FIG. 2, as with the monitoring unit 1, the sensor unit 1 is attachably and detachably fixed as a single independent unit including a power supply 11 in a mode capable of corotating with the valve stem 4, and is connected by the communication module 10 via the Internet 43 to the server 41 and so forth by using a predetermined wireless communication protocol so as to allow wireless communication. Also, as a wear component, the above-described ball seats A are selected.

In FIG. 31, a tablet 44 and a PC 45 are examples of a terminal for checking information regarding the valve 3 to be transmitted from the sensor unit 1, and include display means capable of displaying transmission data from the sensor unit 1. For this display means, for example, any application for display that can be acquired from an application server included in the server 41 may be used.

In FIG. 31, the server 41 uses a cloud server. The cloud server is suitable for various computation process and security measures described further below. Also, the server includes a database and an entire or part of anomaly diagnosing means not depicted, which will be described further below. Furthermore, the server may include a predetermined application server for terminal display or the like. In this case, a user having a terminal can access the server anytime and anywhere to view a valve state.

A feature value of measurement data for use in valve state grasping may be a time from full open of the valve 3 to a predetermined opening degree appearing in an angular velocity graph (FIG. 5 to FIG. 9, FIG. 15 to FIG. 23, FIG. 26, and FIG. 29) acquired from angular velocity data in the axial center direction (Y-axis direction) of the valve stem 4 (for example, a time $T_1$ from 0 degree until the opening degree reaches 10 degrees and a time $T_2$ from 0 degree until 30 degrees), a full-close time from full open until full close, or a time from a predetermined opening degree to full close (for example, a time $T_3$ from 80 degrees until the opening degree reaches 90 degrees). Also, the feature value may be the number of steep gradients and the position, magnitude, and/or width of each steep gradient of angular velocity included in a predetermined time region (for example, the time region $T_1$ or $T_3$), may be a time until the angular velocity reaches a maximum value or a local maximum value or the magnitude or width of the maximum value or the local maximum value, or includes all or part of these. Furthermore, the feature value may be a start/end time of a predetermined time (such as the time $T_1$) and, as for a leakage value, may be a value indicating the presence or absence of leakage (binary value). In accordance with these types of feature values, feature data as numerical data (scalars, vectors) is generated.

Here, for example, as appearing in each of FIG. 5 to FIG. 9, FIG. 15 to FIG. 20, FIG. 21 to FIG. 23, and FIG. 25 to FIG. 30, the steep gradient indicates a portion of one or some plurality of points at uneven positions lopsided with respect to the time axis between full open and full close in an angular velocity graph in which the valve opening degree abruptly changes. A gradient for being read as a steep gradient (rate of change) can be set as appropriate in accordance with implementation. For example, any of the following gradients can be read as a steep gradient: a gradient of a unimodal locus depicted in the region $T_1$ in FIG. 5 to FIG. 9, FIG. 15 to FIG. 20, and FIG. 21 to FIG. 23; a gradient near the region $T_2$ in FIG. 5 to FIG. 9, FIG. 19, FIG. 20, and FIG. 23; and a gradient near the region $T_2'$ in FIG. 16 and FIG. 17.

Also, the number of steep gradients is, for example, the number of steep gradients appearing on a graph and their readable times. The position of a steep gradient may be a time when that steep gradient starts or ends or a time in the middle of these times or, in the case of a unimodal locus, a time at a local maximum value. Also, a displacement of a steep gradient is a difference between values (opening degrees or angular velocities) corresponding to the start and end times of that steep gradient and, in the case of a unimodal locus, can be set at the peak height of an appropriate local maximum value. Similarly, the width of a steep gradient is, for example, a difference between the start and end times of that steep gradient and, in the case of a unimodal locus, can be set at a width in accordance with the peak height of an appropriate local maximum value.

In this manner, if a feature easily catchable appears in the pattern of data that can be acquired in accordance with valve opening and closing one time, the size of the amount of information required for processing in data statistical operation described further below can be reduced or optimized. In particular, since the angular velocity graph by the gyro sensor can be easily characterized, teacher data (test data) is easily generated, as described further below. In a sensor other than the gyro sensor, a feature is difficult to appear in the pattern of data that can be acquired in accordance with valve opening and closing. Thus, when this information with less features is used for machine learning, it is required to separately perform statistical processing to extract features and use most or all pieces of the acquired data. However, in the angular velocity graph data for use in the present invention, a characteristic steep gradient easily appears. Thus, only with this less information regarding steep gradients (a set of several numerical values such as the position, number, displacement, and/or width), statistical operation can be performed with high accuracy, thereby leading to a saving of computation resources.

By using these pieces of feature data acquired from the angular velocity graphs, valve state grasping is performed in the present invention by first anomaly diagnosing means, second anomaly diagnosing means, or third anomaly diagnosing means in the following manner. The means performing each function described in the following is not particularly restrictive, and can be provided to the system as appropriate in accordance with implementation.

In the first anomaly diagnosing means, a database 42 has stored therein a first reference data table (not depicted) formed of a plurality of pieces of label data and feature data in accordance with a predetermined open/close count of the valve for each specific condition, the sensor unit 1 and/or the server 41 is provided with first anomaly diagnosing means configured to grasp a wearing state and conduct an anomaly diagnosis of the valve 3, this first anomaly diagnosing means includes specific data generating means which generates specific data formed of a specific condition of the valve 3, an open/close count of the valve 3, and specific feature data based on angular velocity data, data acquiring means which acquires from a first reference data table first reference data having an open/close count equal to the open/close count of the specific data and a closest specific feature value, and comparing and determining means which compares any one piece of this acquired label data contained in the first reference data and a predetermined threshold to acquire a predetermined determination result.

A label is, for example, dimensional data or leakage amount data, and label data is a numeral value of the label. In the present example, the dimensional data or leakage amount data is used as label data. For the label, it is suitable to use a characteristic value of a type that is important for state grasping of the wearing state of a wear component of the valve 3.

One example of the dimensional data is, for example, in the case of the ball seats A, the G dimension depicted in FIG. 24 described above, and is formed of dimensional data of any portion of a wear component in a non-wearing state and decreases in accordance with the increase in the wearing amount. The leakage amount data is, for example, in the case of the valve 3, in the full-close state depicted in FIG. 14, a value measured by a predetermined measurement device the amount of the fluid leaking between the ball 30 and the ball seats A, and is a characteristic value to which seal performance of the valve is directly reflected. As the leakage amount is more, the valve state is evaluated as being degraded more.

The first reference data is, for example, a record in each row indicated in the following Table 2 (one example of a reference data table), and is formed of, for each specific condition and in accordance with the open/close count of the valve 3 including a specific wear component, a plurality of combinations of of labels (the valve open/close count, dimensional attrition amount of the ball seats, and the presence or absence of leakage) and a combination of feature data (start time of the region $T_1$ and local maximum value near the region $T_2$). The specific conditions are various conditions required for identifying a valve in a use state, such as the valve type and product manufacturer name, as well as use conditions (such as the installation environment including temperature and the fluid in use) and the type of the wear component and the portion of dimensional data. The first reference data acquires, under the same specific conditions, from the valve as a measurement target, data in accordance with the first reference data including angular velocity data, and is accumulated in advance in the database 42. The accumulated first reference data is managed as being classified by the specific condition, and a sufficient amount of data in accordance with the plurality of combinations of labels is acquired in advance.

Also, the angular velocity data for use in at least the first anomaly diagnosing means includes data required for acquiring an angular velocity graph and to be measured by the gyro sensor 7, as well as information regarding the open/close count of the valve 3 and the specific condition. Furthermore, as for the open/close count of the valve 3, for example, if the number of times of measurements is defined in advance for each specific condition, records of the open/close count can be made uniform. Thus, when the data acquiring means described further below refers to the first reference data table, the open/close count of the specific data and the open/close count of the record of a referent can be matched.

Therefore, as for the first reference data, only with the sensor unit 1 attached to the valve for starting, the first reference data under various specific conditions can be easily acquired by, for example, a valve manufacture or maintenance firm, and accumulated in the database without hindering actual operation of the valve. Also, the specific feature data means one piece of feature data selected in advance from the feature data, and a notable characteristic value with a tendency of strong correlation with the labels is selected.

TABLE 2

| TARGET DRAWING | VALVE OPEN/CLOSE COUNT (TIME) | DIMENSIONAL ATTRITION AMOUNT OF BALL SEAT (mm) | VALVE SEAT SEAL LEAKAGE | START TIME OF REGION T1 (ms) | LOCAL MAXIMUM VALUE OF REGION T2 (opening degree/s) |
|---|---|---|---|---|---|
| FIG. 5 | 0 | 0 | NONE | 800 | 35 |
| FIG. 6 | 30 | 0.26 | NONE | 1000 | 44 |
| FIG. 7 | 500 | 0.26 | NONE | 1000 | 45 |
| FIG. 8 | 1,000 | 0.36 | NONE | 350 | 63 |
| FIG. 9 | 10,000 | 0.48 | PRESENT | 400 | 51 |

The specific data generating means is means which identifies and reads, from graph data acquired by conversion from angular velocity data (raw data) measured by the gyro sensor 7 to angular velocity graph data in the Y-axis direction, a specific feature value appearing on this graph, and combines a specific condition of this valve 3 and the valve open/close count at the time of this measurement and outputs them as a set of numerical values. Note that the graph data acquired herein may be outputted to a predetermined display device so as to be displayable.

The data acquiring means is means which takes specific data as an input; accesses the reference data table of the database 42 to search for a table matching a specific condition included in this specific data; if the table hits, refers, from this table, to a record with the open/close count equal to the valve open/close count included in the specific data and acquires a specific feature value (record feature value) of a record corresponding to a specific feature value (specific data feature value) included in the specific data; and, furthermore, determines whether this record feature value is substantially equal to the specific data feature value. Here, a range in which they are determined as being substantially equal to each other is set as appropriate in advance.

The comparing and determining means is means which takes, as inferred label data of the valve 3, a plurality of pieces of label data included in a record having a record feature value determined as being substantially equal to the specific data feature value, compares this inferred label data with a plurality of thresholds each set in advance for each label data and, in accordance with the comparison result, outputs a predetermined determination result. For example, when the inferred label data is equal to or larger than the threshold, predetermined warning information (alert) is outputted as the determination result. When the label data is smaller than the threshold, predetermined information regarding the current state is outputted as the determination result. For example, when the safest measure is taken, an alert is outputted if any one piece of label data exceeds the threshold.

Here, a specific way of reading of Table 2 is described. In a series of drawing indicated in the table, in a region in which the valve opening degree is from full close to an opening degree of approximately 10 degrees (region $T_1$), for example, when the valve open/close count is thousand times (FIG. 8), the timing when the angular velocity starts increasing is earlier compared with the case of five hundred times (FIG. 7), that is, 350 milliseconds, which is significantly below 1000 milliseconds from the start of valve opening operation. Here, the amount of decrease of the overall height (h dimension in FIG. 24) of the ball seat is 0.36 mm, which is larger than the case of five hundred times (amount of decrease of 0.26 mm), and it can be grasped that the ball seat is proceeding to wear away.

These pieces of information are stored in advance by the valve manufacturer, maintenance firm, or the like in the memory 9, the server 41, or the like as reference data, and are then compared with actual measurement data (angular velocity data) of the valve 3 for use in an operating plant or the like, thereby allowing the wearing state of the ball seat in that valve to be grasped.

Specifically, in the actual measurement data of the valve with the open/close count of thousand times, if the timing of an increase in the angular velocity in the region $T_1$ is 400 milliseconds, this value is close to the reference data of 350 milliseconds, and thus a situation can be inferred in which the ball seat as a seal member has worn almost to 0.36 mm. Note that the timing of an increase in the angular velocity in the region $T_1$ is determined only from one point, 400 milliseconds, this may be determined based on a plurality of values such as an average value per unit time. Here, while the time required for opening and closing the valve in the present example can be grasped by using a clock incorporated in the CPU 8, another separate timer may be used. Also, the valve open/close count is counted by using, in addition to the encoder, a microswitch (limit switch) which detects a valve full-open/full-close position, or the like.

In a small region in which the valve opening degree is approximately near 30 degrees (region T2), for example, when the valve open/close count is thousand times (FIG. 8), the value of an abruptly-increasing angular velocity is larger compared with the case of five hundred times (FIG. 7), that is, 63 opening degrees/second (rad/sec), which is significantly over 45 opening degrees/second. Here, as described above, the amount of decrease of the overall height (h dimension in FIG. 24) of the ball seat is 0.36 mm, which is larger than the case of five hundred times (amount of decrease of 0.26 mm), and it can thus be grasped, from the abrupt increase of the angular velocity in the region T2, that the ball seat is proceeding to wear away.

These pieces of information are stored in advance by the valve manufacturer, maintenance firm, or the like in the memory 9, the server 41, or the like as reference data, and are then compared with actual measurement data (angular velocity data) of the valve 3 for use in an operating plant or the like, thereby allowing the wearing state of the ball seat in that valve to be grasped.

Specifically, in the actual measurement data of the valve with the open/close count of thousand times, if the angular velocity in the region T2 is 65 (rad/sec), this value is close to the reference data of 63 (rad/sec), and thus a situation can be inferred in which the ball seat as a seal member has worn almost to 0.36 mm.

Furthermore, as for a specific way of reading of Table 2, in combination with valve leakage data, the life of the seal component can be predicted based on the measured angular velocity. Specifically, when the valve open/close count is ten thousand times (FIG. 9), the amount of decrease of the overall height (h dimension in FIG. 24) of the ball seat is 0.48 mm, which is larger than the case of thousand times (amount of decrease of 0.36 mm), and it can be grasped that the ball seat is proceeding to wear away. And, since a valve seat leakage in the valve is confirmed, it is determined that the life of the ball seat ends when the valve open/close count reaches ten thousand times. Here, the valve seat leakage test for the valve in the present example was performed on condition that nitrogen is used as a test fluid and this fluid pressure is 0.6 MPa.

These pieces of information are stored in advance by the valve manufacturer, maintenance firm, or the like in the memory 9, the server 41, or the like as reference data, and are then compared with actual measurement data (angular velocity data) of the valve 3 for use in an operating plant or the like, thereby allowing the life of the ball seat in that valve to be predicted.

Specifically, for example, in the actual measurement data of the valve with the open/close count of thousand times, if the timing of an increase in the angular velocity in the region T1 is 400 milliseconds or the angular velocity in the region T2 is 65 (rad/sec), it can be determined that this is the state of the valve along the reference data in Table 2, and the life of the ball seat ends with the open/close count of ten thousand times, and maintenance can be performed in a planned manner before the open/close count of the valve reaches ten thousand times.

Still further, as for a specific way of reading of Table 2, in combination with the dimension or consumption data serving as a reference for seal component replacement, the life of the seal component can be predicted based on the measured angular velocity. Specifically, if the reference for replacement is such that the amount of decrease of the overall height (h dimension in FIG. 24) of the ball seat becomes 0.40 mm, it is determined based on a proportional relation between the valve open/close count of thousand times and that of ten thousand times in the reference data in Table 2 that the life of the ball seat ends when the valve open/close count reaches three thousand times.

Specifically, in the actual measurement data of the valve with the open/close count of thousand times, if the angular velocity in the region T2 is 65 (rad/sec), this value is close to the reference data of 63 (rad/sec), and thus a situation can be inferred in which the ball seat as a seal member has worn almost to 0.36 mm and it can be determined that the life ends with the above-described count of three thousand times.

Note that as for data for use in the first anomaly diagnosing means, for example, as depicted in Table 2, feature data with two (or more) pieces of label data is accumulated in the database as test data, and thus this is a so-called multi-label (multiclass classification) problem. Thus, a known learning model regarding multiclass classification can be applied to the accumulated reference data.

Next, the second and third anomaly diagnosing means conducts anomaly diagnosis by a scheme of machine learning with a single label. In the database 42, a predetermined learning model generated based on labeled training data is stored. Inferred label data for use in this second anomaly diagnosing means is an inferred value outputted from the learning model.

The above-described learning model is generated as follows, for example. In the state of the same specific condition, in a range in which label data (dimension, leakage amount) can be regarded as the same, the valve is open and closed a sufficient number of times to acquire angular velocity data and, from these, each piece of feature data is generate (that is, a feature value is read from an angular velocity graph). To these, the same label data is provided to generate teacher data for training. These pieces of teacher data is sampled in sufficient quantity for each piece of label data and is stored in the database 42.

To a sample group of the teacher data for each piece of the same label data, machine learning (statistical operation) is applied to generate a model (identification model or generation model). While this may be taken as a learning model, examination by test data may be further performed, an optimum statistical model may be found, or a parameter group for each statistical model may be adjusted, thereby enhancing accuracy and reliability. Therefore, a learning model is generated with a scheme of so-called supervised machine learning. As machine learning, selection and improvement can be made as appropriate in accordance with implementation. For example, a known scheme can be applied as appropriate. If the label data have continuous values, a scheme of regression (such as linear regression, logistic regression, or SVM) is normally taken. In this case, the learning model corresponds to a regression function f that can be inferred as "inferred label data=f (feature data)", and the function is identified with a predetermined parameter.

Furthermore, a case can be thought that a wear component is replaced by another component in the course of operation of the valve and the label data of that other replaced component has not been sufficiently sampled in advance or is not present at all. In this case, no learning model of the replacement component is not present in the database, and thus the anomaly diagnosing means cannot be executed. In this case, the learning model stored in the database can be corrected for use. For example, a known scheme like transfer learning can be taken. For example, a predetermined weight may be given to the label data of a known learning model to correct and use the label data for the replacement component.

By contrast, the sensor unit 1 and the server 41 is provided with anomaly diagnosing means not depicted and configured to grasp a wearing state and conduct an anomaly diagnosis of the valve. This anomaly diagnosing means is formed of at least feature value generating means which generates predetermined feature data, inferred label data calculating means which calculates label data (scalar) via machine learning based on feature data, and comparing and determining means which compares this label data with a predetermined threshold to acquire a determination result.

The feature value generating means identifies and reads, from graph data acquired by conversion from angular velocity data (raw data) measured by the gyro sensor 7 to angular velocity graph data in the Y-axis direction, each feature value appearing on this graph, and outputs as a form of feature data formed of a plurality of sets of numerical values. Note that the graph data acquired herein may be outputted to a predetermined display device so as to be displayable.

The inferred label data calculating means is means which takes feature data as an input and applies this feature data to a learning model called from the database 42, thereby calculating and outputting label data as an inferred value. In the case of a plurality of labels (dimensional value, leakage value), each learning model in accordance with the type of label is called.

The comparing and determining means takes the inferred label data as an input, compares this label data with a threshold set and stored in advance in accordance with the label, and outputs predetermined warning information (alert) as a determination result when the inferred label data exceeds the threshold and outputs predetermined information regarding the current state as a determination result when the inferred label data is smaller than the threshold. When the determination results for a plurality of labels are mutually contradictory, the determination result is associated with any one of these as appropriate. Note that instead of this binary return (OK, NG), a plurality of thresholds may be set and a determination result corresponding to the range of each threshold may be set.

For example, as for the dimensional data, a first threshold may be set to a wearing amount evaluated as failure (replacement required); as a wearing amount smaller than this first wearing amount, for example, data of a wearing amount corresponding to a period three months before evaluation is made as failure (three-months-before wearing amount) when a valve of the same type is used under a normal use condition may be separately acquired in advance; and this wearing amount may be set as a second threshold. For example, when the inferred label data value is equal to or larger than the second threshold and is smaller than the first threshold, a message indicating three months before replacement is required may be outputted as a determination result. Similarly, as for wearing thresholds (having a smaller value as a predetermined period is longer), which are acquired in time series in accordance with the wearing amount prior to the predetermined period (prior-to-predetermined-period wearing amount), a plurality of wearing thresholds may be set in the value order to make the determination results more highly accurate. Outputs of these multistage determination results can be performed similarly for leakage amount data.

Note that as for the timing of diagnosis conducted by the above-described first and second anomaly diagnosing means, for example, a diagnosis may be conducted by an instruction from a user via a terminal or may be conducted every time the valve is open and closed. Alternatively, the timing may be set with a predetermined valve open/close count or at predetermined time intervals.

In addition, means which transmits the determination result to an application at the terminal so that it is displayable and means which notifies a management server managed by the manufacturer (in charge of maintenance) of the valve of the determination result may be provided.

The teacher data (test data) using the above-described label is prepared in advance in the database 42 as a learning model for each label (characteristic value) of a wear component under a valve's specific condition such as a valve or a fluid for use. Thus, only applying the feature data to this learning model can conduct a diagnosis. Thus, while it is required to collect teacher data (test data) and generate learning models in advance, diagnosis processing can be performed at high speed during actual operation of the valve 3, and resources for system configuration can also be reduced.

Furthermore, unlike the scheme of the anomaly diagnosing means described above, the valve state grasping system of the present invention may be configured also by a scheme by unsupervised machine learning. Also in this case, the database 42 can be used as a data store of the same form as that of the above-described feature data. The anomaly diagnosing means by this scheme is the third anomaly diagnosing means, and includes at least data accumulating means, data control means, model data computing means, index calculating means, and comparing and determining means.

The data accumulating means generates the same feature data as described above from angular velocity graph data acquired from the angular velocity data measured by the gyro sensor 7, and transmits this feature data to the database 42 and causes the feature data to be stored in the database 42 in a predetermined format to generate accumulated feature data. The data accumulating means can use, as appropriate, the means for conversion from angular velocity data to graph data and the feature value generating means described above. This data storing is controlled by the data control means. The data control means controls the data accumulating means so that the acquired feature data is stored in the database 42 every time the valve is open and closed until the feature data of a predetermined amount set in advance is accumulated in the database 42. When the accumulated data reaches the predetermined amount, this is detected, and a notification as such is made to the model data computing means.

The model data computing means notified as such applies machine learning to all pieces of feature data accumulated in the database 42 at this moment (accumulated feature data) to generate a learning model. An output value of this learning model is referred to as consumption data. Therefore, the learning model is generated by a scheme of so-called unsupervised machine learning. This consumption data is so-called normal data, and is required to be data acquired and accumulated while the valve is normally operating.

Also as machine learning in this case, selection and improvement can be made as appropriate in accordance with implementation. As a known scheme, for example, a scheme of dimensionality reduction (such as PCA or SVD) is taken. For example, in the subspace method, a subspace U in normal operation is generated by taking, as a base, upper k vectors in a unique vector group (principal component subscripted in the distribution) acquired by conducting principal component analysis using all pieces of accumulated feature data (which is taken as N-dimensional vector) at the time of normal operation. This computation is performed by the model computing means. Thus, the learning model supports an n×k matrix (second-order tensor).

The index calculating means calculates and outputs a predetermined index defined between feature data (new feature data) by angular velocity data acquired from initial valve opening/closing after the data control means notifies the model computing means and the above described consumption data.

In the above-described subspace method, a degree of anomaly (index) as a predetermined distance can be defined between the normal subspace generated by the model data computing means and the new feature data (unknown data). For example, when a subspace U acquired from the normal data group is $(u_1 \ldots u_k)$ and unknown data is $x=(x_1 \ldots x_N)$, a degree of anomaly $d^2=x^T x - x^T U_k U^T_k x$ can be defined.

The comparing and determining means compares the above-described index with a threshold set and stored in advance and, for example, outputs, as an abnormal outlier, predetermined warning information (alert) as a determination result when the index becomes equal to or larger than the threshold and outputs predetermined information regarding the current state as a determination result when the index is smaller than the threshold.

Next, FIG. 32 depicts a general outline of a valve state grasping process according to the present invention. First, the sensor unit 1 is attached to the valve 3 as a target. Specifically, the unit is fixed in the above-described mode depicted in FIG. 1. Normally, the sensor unit 1 is a single independent unit automatically continued to monitor the valve 3 once after attached, and thus its power supply should be checked, such as sufficiently charging power. Also, normally, the unit is caused to perform wireless communication as depicted in FIG. 31, and it is thus required also to check a communication state with necessary communication targets, such as the cloud server 41, the terminals 44 and 45 via the Internet 43.

In FIG. 32, at initial setting 46, the open/close position of the valve is accurately set to the gyro sensor 7, and information regarding the valve 3 (such as the type and manufacturer of the valve, use environment and use fluid) is set to the sensor unit 1. In particular, information regarding labels (such as dimensional values, leakage amount, and thresholds) is also set. After initial setting 46 ends, the valve 3 is actually operated.

In FIG. 32, processes collectively provided with a reference numeral 47 correspond to a general outline of the diagnosis process by the above-described first to third anomaly diagnosing means. As described above, in the first and second anomaly diagnosing means, it is required to store predetermined data in advance in the database 42 of the cloud server 41. Thus, to execute the first and second anomaly diagnosing means, label values, that is, a sufficient number of pieces of sample data such as a specific dimensional value of a specific wear component and a leakage amount of a specific valve under a specific condition, has to be acquired in advance.

At process 47, graph data is first acquired at a predetermined timing by graph converting means from angular velocity data measured by the gyro sensor 7 from the valve stem 4 of the actually-operating valve 3. From this graph data, by the feature value generating means, feature data (a numerical value formed of one specific feature value in the first anomaly diagnosing means and a set of numerical values formed of all feature values in the second anomaly diagnosing means) is acquired.

Next, in the first anomaly diagnosing means, specific reference data is referred to by the data acquiring means. By the comparing and determining means, a specific feature value included in this reference data and a predetermined threshold are compared, and the determination result is delivered to the user. In the second anomaly diagnosing means, a learning model is called by inferred label data calculating means by model calling means from the database 42, and the feature data is applied to the learning model to acquire label data. This label data is compared by the comparing and determining means with a threshold, and its determination result is transmitted by result transmitting means to display means (terminal), thereby allowing the determination result to be delivered to the user.

Furthermore, at process 47, the third anomaly diagnosing means using the above-described scheme by unsupervised machine learning may be executed. In this case, while it is not required to accumulate teacher data, but a program in accordance with the product is required to be implemented, such as the data accumulating means, the data control means, the model data computing means, the index calculating means, or the learning model tailored to the product.

Next, fourth anomaly diagnosing means is described. The configuration in FIG. 31 and FIG. 32 is as described above. In the drawings, a valve state grasping system includes the valve 3, a gyro sensor unit 1 fixed to this valve 3 and including the gyro sensor 7, and the server 41 communicably connected to this gyro sensor unit 1 and including the database 42, wherein, this database 42 has stored therein a second reference data table including output data and product data in accordance with an open/close count of the valve 3, the gyro sensor unit 1 and/or the server 41 is provided with fourth anomaly diagnosing means configured to grasp a wearing state of a wear component (A, B, C) included in the valve 3 and conduct an anomaly diagnosis of the valve 3, this fourth anomaly diagnosing means includes data generating means which generates measurement data including output data and product data measured by the gyro sensor unit 1 in accordance with an open/close count of the valve 3, data acquiring means which acquires, from the second reference data table, second reference data having output data of the valve 3 substantially equal to the output data of the valve 3 included in this measurement data, and failure determining means which determines failure prediction of the valve 3 based on use frequency data of the valve 3 included in this acquired second reference data.

The second reference data contained in the second reference data table includes product data and output data. Table 3 is one example of this second reference data table, and a record in each row is the second reference data. The product data is data which identifies attributes and specifications of the product and, in the present example, as in the following, is formed of manufacturer name, valve type, wear component target part, and valve average use frequency (use frequency data). As for the output data, in the present example, from a new product state (opening/closing for the first time) to a failure state (varying for each product, for example, fifty thousand times), for each opening/closing (operation count), an output value of the gyro sensor for each opening degree step (1 degree→2 degrees to 89 degrees→90 degrees) collected in advance from the test valve with the gyro sensor fixed thereto is stored in the database 42 provided on a cloud server 41 side as a reference value. This means that, for example, if the product is manufactured by its own company, experiments are repeatedly conducted in advance, with conditions being varied, inside the company before selling to the market and the results are stored as basic reference data. However, the output data may not be these pieces of data for 0 degree to 90 degrees, but only feature portions (feature values) of the angular velocity data as described above may be partially used.

Also, in the present example, the gyro sensor 7 can output output data in a same format as that of the output data of the second reference data as being included in measurement data for each operation count. The measurement data is formed of product data and output data of the gyro sensor 7 for each open/close count (operation count) of the valve 3, and includes at least data included in the second reference data.

Note that the above-described use frequency data (valve's average use frequency) can be included as appropriate also in the output data, instead of the product data. For example, on a gyro sensor unit 1 side, the operation count may be acquired from the valve 3 in use at a predetermined timing, and use frequency may be calculated based on this operation count and outputted as being included in the output data. Also, when the monitoring unit 1 (sensor unit 1) is attached to the valve 3 in the course of use, if information about the operation count of the valve 3 at this moment has been acquired in advance, this operation count may be inputted to the monitoring unit 1 (sensor unit 1) to correct the operation count in the output data.

TABLE 3

| PRODUCT DATA | | | | OUTPUT DATA | | |
|---|---|---|---|---|---|---|
| MANUFACTURER NAME | VALVE TYPE | TARGET PART | VALVE'S AVERAGE USE FREQUENCY (TIME/MONTH) | OPERATION COUNT | ANGLE (deg) | ANGULAR VELOCITY (deg/sec) |
| OWN COMPANY | BALL VALVE A | BALL SEAT D | N1 | NEW (FIRST TIME) | 0 | y1 |
| | | | | | 1 | y2. |
| | | | | | . | . |
| | | | | | . | . |
| | | | | | . | . |
| | | | | | 89 | y89 |
| | | | | | 90 | y90 |
| | | | | (SECOND TIME) | 0 | y1 |
| | | | | | 1 | y2. |
| | | | | | . | . |
| | | | | | . | . |
| | | | | | . | . |
| | | | | | 90 | y90 |
| | | | | FAILED (FIFTY THOUSAND TIMES) | ... | ... |
| | | | | | 0 | Y1 |
| | | | | | . | . |
| | | | | | . | . |
| | | | | | 45 | Y45 |
| OWN COMPANY | BALL VALVE A | GLAND PACKING E | N1 | NEW (FIRST TIME) | 0 | y1 |
| | | | | | 90 | y90 |
| | | | | ... | ... | ... |
| | | | | FAILED (SIXTH THOUSAND TIMES) | 0 | Y1 |
| | | | | | ... | ... |
| | | | | | 37 | Y37 |
| ANOTHER COMPANY | BALL VALVE B | BALL SEAT F | N2 | NEW (FIRST TIME) | 0 | *** |
| | | | | | . | *** |
| | | | | | . | *** |
| | | | | | . | *** |
| | | | | | 90 | |
| | | | | ... | . | *** |
| | | | | FAILED | . | *** |
| | | | | | . | |

The data generating means is means which generates, as one piece of measurement data, measurement data (full-opening degree data of angular velocity) about one rotation from full open to full close measured by the gyro sensor 7 in the form of the above-described output data and the product data of the valve 3 inputted to the gyro sensor unit 1 in a predetermined format (for example, data manually inputted to the unit 1 or read the data by a predetermined optical read sensor), together with the open/close count of the valve 3 at this moment and transmits the generated measurement data to a server 41 side.

The data acquiring means is means which takes the above-described measurement data as an input and acquires, from the second reference data table, second reference data substantially equal to the output data included in this measurement data. Here, for similarity in output data for determining whether they are substantially equal (graph shape comparison method), an appropriate known scheme such as, for example, area comparison, is selected, and means for achieving this is also implemented. Here, a specific process when the second reference data to be acquired is not present in a referent or when the pieces of output data are not substantially equal to each other is described further below by using FIG. 33 and FIG. 34.

The failure determining means is means which refers to use frequency data of the valve include in the second reference data acquired by the data acquiring means and also refers to the open/close count of the valve 3 included in the measurement data, and calculates a failure timing of the valve 3, thereby determining failure prediction information of the valve 3 (furthermore, outputs the information to the terminal so that it is displayable).

For example, in Table 3, for a certain valve, while the average use frequency (times/month) and the open/close count until failure are acquired in advance, and the current open/close count of the valve is also acquired from the measurement data. Thus, from these, a period (month) from the current time to failure can be calculated with ease. In this case, if the data indicates three months before failure, a notification of information indicating three months before the replacement time of the ball seat can be made to the PC 45 at a service center via the Internet 43 or to a terminal carried by a serviceman. Alternatively, reference data corresponding to three-month-before is identified from the use frequency of each of a plurality of valves that are present in the market and, when the measured angular velocity becomes approximately equal to this reference data, a notification indicating three months before failure can be made.

As will be described further below, since all pieces of reference data of the product from a new product state to failure are stored, a notification of a replacement timing can be momently made stepwise, such as three months before or two months before. If a notification encouraging component replacement is made but maintenance is not performed, that is, for example, when the count reaches fifty thousand times, a warning indicating that a failure timing has come can be made. As will be described further below, as failure prediction control, control continues until a leakage of the fluid in use exceeding an allowable value actually occurs to cause a system failure in which the plumbing system cannot be controlled, and ends after acquiring output data at the time of failure.

In a plumbing system where a plurality of valves are disposed on single plumbing, this ball valve failure prediction control is nothing but allowing rational replacement in view of maintenance of the entire system. That is, even when maintenance is performed on only one valve, the operation of its plumbing system has to be stopped, causing enormous damage under present circumstances. Therefore, entire replacement is performed even if there is another disposed valve that is still usable. According to the present example, since a valve with less use frequency has a practical life expectancy longer than that of other valves of the same type and is therefore not required to be replaced until the next maintenance, it is possible to simultaneously achieve reduction in cost regarding component replacement of the plumbing system and shortening of the overall maintenance time of the plumbing system.

Furthermore, since data for the entire period is kept from a time when the product is new to a time when the product is failed, even if the gyro sensor is attached to a valve whose use period lapses to some extent, the use state can be grasped. Thus, failure prediction control can be quickly developed in the market. For example, when the sensor unit 1 is placed to a valve used for a half year, a search is made for reference data approximately equal to the measured angular velocity data, and a use period is found from the corresponding operation count and average use frequency. If the found use period is a half year, this operation count is recognized as correct, and failure prediction control can be started from a midcourse.

Figure 33:
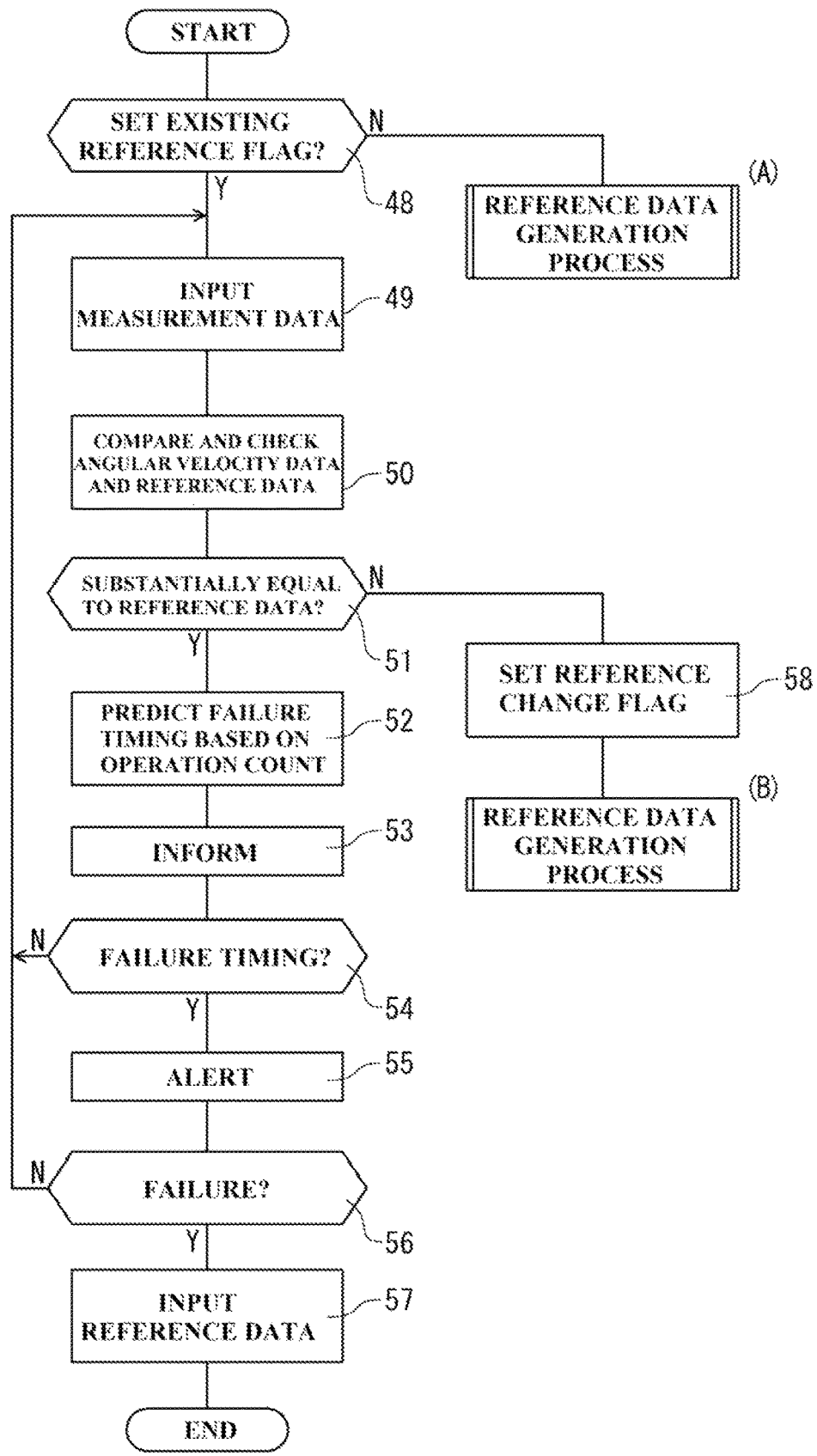
FIG. 33 is a data flow diagram depicting an anomaly diagnosis process (normal flow) by fourth anomaly diagnosing means.
Figure 34:
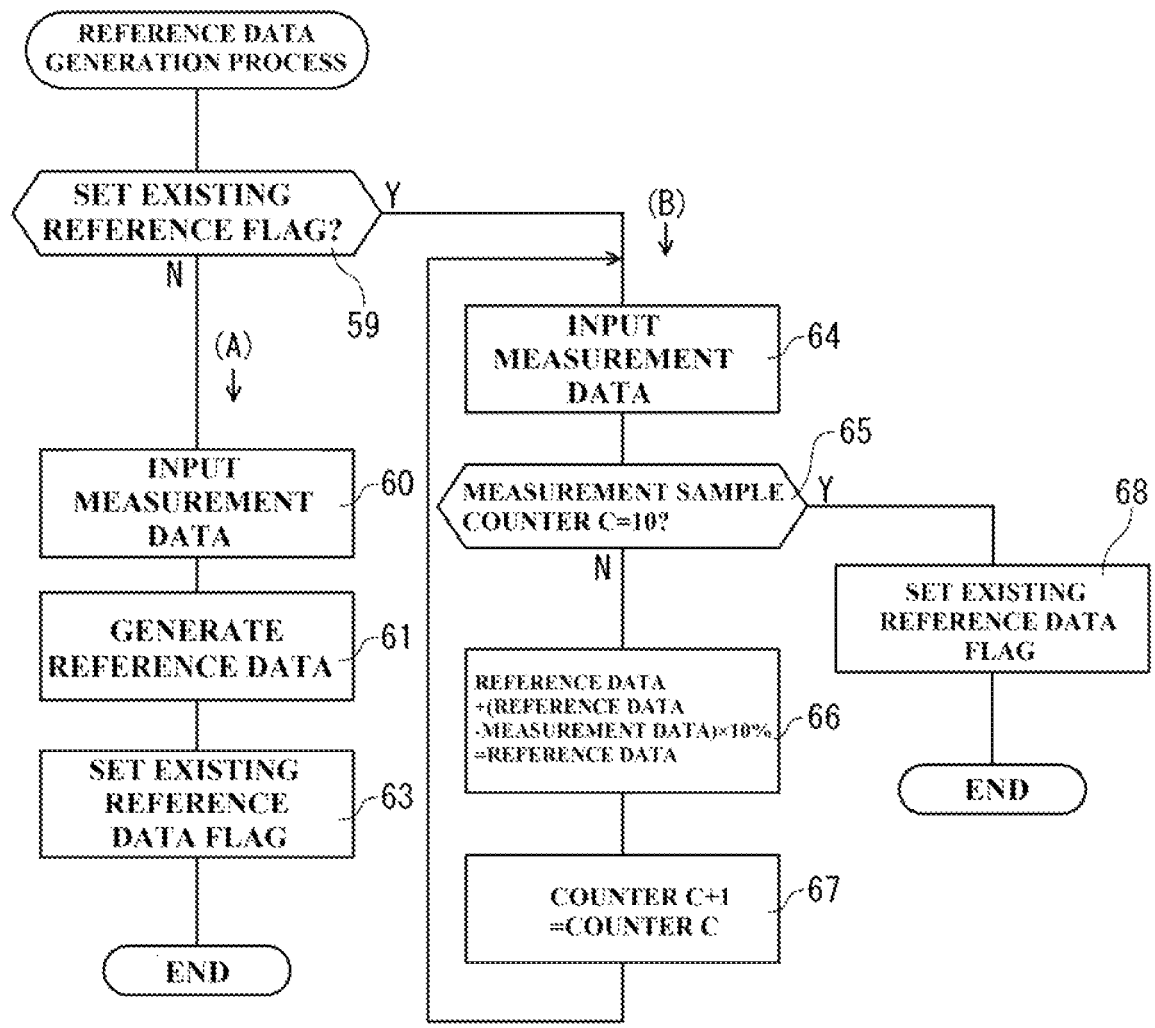
FIG. 34 is a data flow diagram depicting an anomaly diagnosis process (reference creation flow) by the fourth anomaly diagnosing means.

Next, with FIG. 33 and FIG. 34, an anomaly diagnosis process by the fourth anomaly diagnosing means is described. FIG. 33 is a data flow diagram depicting diagnosis process by the fourth anomaly diagnosing means. Process 48 is a process of determining, when this anomaly diagnosing means is first executed, for measurement data generated by the data generating means, whether a table matching the product data included in this measurement data is present in the database 42. In the drawing, for each piece of product data, whether a reference data table is present is managed in advance with an existing reference flag. Thus, with this flag, it is determined whether a table (the same product data) for search is present. If such a table is present, the process proceeds to process 49. If such a table is not present, the process proceeds to process A in FIG. 34.

In FIG. 33, process 49 is a process in which the measurement data is inputted to the database 42. At process 50, the process is such that the data acquiring means receiving the measurement data inputted to the database 42 searches for and acquires a table record with the same open/close count as the open/close count included in this measurement data and then determines whether the output data (angular velocity graph pattern) of this record (acquired data) is substantially equal to the output data included in the measurement data. If it is determined that they are substantially equal, the process proceeds to process 52. If it is determined that they are not substantially equal, the process proceeds to process B in FIG. 34. As a method of this comparison between two pieces of output data (a scheme of determining whether they are substantially equal), any of various known schemes (such as the concept of distance between data and similarity in set and shape) can be selected as appropriate.

In FIG. 33, at process 52, the process is such that failure period prediction based on the operation count is performed by failure determining means. Specifically, use frequency data (count/period) and a failure open/close count (time) included in the product data of the acquired data are acquired. On the other hand, a current open/close count (time) included in the measurement data is also acquired. From these, a failure-predicted timing of the valve 3 measured the measurement data can be acquired as (failure open/close count-current open/close count)/use frequency (period). This allows a failure-predicted timing to be specifically acquired only with simple processing without intervention of statistical processing (machine learning) with large processing cost.

Note that in this process, the determination result may be acquired with reference to, for example, a determination result table not depicted. For example, this determination result table may be generated in advance for each of the same product data in accordance with the open/close count; for example, records each with a notification detail (for example, normal, warning, or failure), a failure-predicted timing (for example, notification three months before or notification one month before), or the like as a column name may be prepared in the order of magnitude with the valve open/close count as a main key; and, via appropriate means, with reference to a determination result table record with the same open/close count as that of the open/close count included in the measurement data, each pieces of data such as the notification detail and the failure-predicted timing may be acquired as the determination result. The notification detail or the like may be partitioned with a plurality of predetermined thresholds. In this manner, the failure-predicted timing may be acquired by table reference without intervention of computation processing.

In process 52, a failure-predicted timing is acquired. In process 53, the notification detail is acquired. These can be transmitted to the terminal via appropriate means so that they are displayable. At the following process 54, it is determined whether a failure timing has come. As for this failure timing, for example, it is determined whether the failure-predicted timing has come by taking a predetermined threshold as a boundary. If it is determined at this process 54 that the failure timing has come, the process proceeds to process 55. If not so, the process may return to process 49 to continue anormal diagnosis.

Process 55 is a process of warning when it is determined that the failure timing has come. At the following process 56, it is determined whether a failure has occurred. If it is determined that a failure has not occurred, the process may return to process 49 to continue anormal diagnosis. Note that these processes 52 to 56 can be basically performed by the failure determining means but, needless to say, can be set as appropriate in accordance with implementation.

On the other hand, in FIG. 33, if a reference data table matching the product data is not present, a process of newly generating a second reference data table on the occasion of this anormal diagnosis. This process is process A depicted in FIG. 34, and this process A is formed of processes 61 and 63. As will be described further below, since whether the process proceeds to process B, which is a process of changing the second reference data table, is managed by a reference data change flag, a determination is first made at process 59 as to a reference data change flag.

That is, when the valves are the same but have a large difference in data in a 90-degree section from full close to full open and a tendency of a plurality of valves having a degree of difference substantially similar to the above continues, that is, for example, when reference data based on experiments performed in its own company is limited and data acquisition based on the number of products after sales on the market is overwhelmingly increased, it is assumed that data itself is degraded. Also, it is assumed that product data capable of identifying the attributes and specifications of the product, such as a special fluid in use and an overwide range of outer temperature and humidity, does not match the output data even if that product data exists as reference data. Also, it can also be assumed that, in the first place, product data of ball valves made by another company does not exist, in other words, reference data is not stored at all. To solve a variable factor of degradation in prediction in view of failure prediction control, in the present example, there are two reference data generation processes A and B. Process A is referred to as reference data newly generating mode, and process B is referred to as reference data changing mode. Also, the entire process depicted in FIG. 34 is referred to as a reference data generation process.

In FIG. 34, process 60 is a process of newly storing second reference data generated from the measurement data in the database 42. For example, a case is described in which a test is performed on a product manufactured by its own company before product shipping. First, as measurement data, product data is inputted manually or automatically from a known optical read sensor, and then, as output data, by rotation control over the ball valve by the actuator 2 attached to the valve 3, the valve's average use frequency approximately assumed and angular velocity data for each angle every time from full close to full open from a time when the product is new and to a time when the product is failed by tests are inputted. This series of tests is performed N times, and data is captured as highly-accurate measurement data. At the following process 61, a second reference data table is completed. At the following process 63, an existing reference data flag indicating that reference data is newly present is SET and the process ends, returning to the determination detail flow.

Next, in the process of newly generating second reference data, for example, a case is described in which, for example, a ball valve of a product manufactured by another company is measured. This corresponds to the record at the bottom of the second reference data table depicted in Table 3. According to this, at the stage in which the sensor unit 1 is attached and the product data is read, it is recognized that the product is not the one manufactured by the own company but another company. Thus, at process A, the series of measurements as described above is not performed N times, and reference data is generated with one measurement (process 66), and the process returns to the flow depicted in FIG. 33.

On the other hand, when the product has the same product data and thus the existing second reference data table is present but this reference data table does not have reference data that is approximately equal (process 51), this requires rewriting of the second reference data itself, and a reference data change flag is SET (process 59), and process B is performed. In this case, since the existing reference data is present, a gradually changing process is taken.

In process B, when output data is acquired from the measurement data (process 64), a difference between this output data and the existing second reference data is found, and the existing second reference data is increased or decreased by 10% of this difference and is set as a new second reference data. At processes 64 to 67, a counter C is set at 1, and angular velocity data is inputted as output data and subjected to similar processing repeatedly ten times, and then the process exits from the loop at process 65 and the existing reference flag is SET at process 68, and then the process ends.

With this, leveling is performed with the measurement data at least ten times. Thus, the second reference data is not rewritten with measurement data unique to only one ball valve. In particular, an abrupt change in specifications of a ball seat of a ball valve manufactured by another company is less possibly inputted as product data. Thus, it is quite effective, in view of accuracy, to compare and check not only the product data but also the measurement data, in particular, angular velocity data.

Furthermore, regarding reference data rewriting, as another means, there is also a way of weighting such as weighted averaging (weighting with the degree of difference at a characteristic portion). This is as follows. For example, when a valve manufactured by another company is a target, if an abrupt change in specifications of a ball seat due to some technical reason causes switching to another ball seat, since each ball seat has its unique angular velocity, the same valves have a large fluctuation width with respect to the existing reference data in most of the open/close section from full close to full open. When a similar tendency continuously appears in a plurality of valves, the product data is weighted, and the reference data is gradually written with a fluctuation ratio smaller than the fluctuation width (for example, if the output data is fluctuated from the one in the previous reference data by 10%, rewriting is gradually performed with a fluctuation ratio of 2%). This allows generation of reference data from the output data (measurement data) even if reference data is not stored in advance, facilitating achievement of a failure prediction system and an improvement in prediction accuracy.

In this manner, when reference data is generated, by combining a process of newly generating and establishing reference data and a process of rewriting the existing reference data as being leveled and weighted, reference data of the product can be generated before product shipping, reference data can be automatically generated by inputting measurement data of a product manufactured by another company on the market, and various situations such as an abrupt change in the use of a component on the market can be addressed.

Thus, with the above-described gyro sensor unit 1 used for the valve 3 in use, from the measurement data acquired by measurement by this gyro sensor unit 1, it is possible to perform a process of generating second reference data including the output data and the product data in accordance with the open/close count of the valve 3. This second reference data generation process includes, as depicted in FIG. 34, a reference data new generation mode and a reference data change mode.

Furthermore, in one plumbing system in which a plurality of valves subjected to maintenance at predetermined intervals are placed, it is possible to perform a plumbing system maintenance method of performing, for each of the plurality of valves, prediction of a failure timing for each individual valve by using the valve state grasping system of the present invention to acquire each prediction result, and excluding, from a maintenance target, a valve in which this prediction result exceeds the interval.

Figure 35:
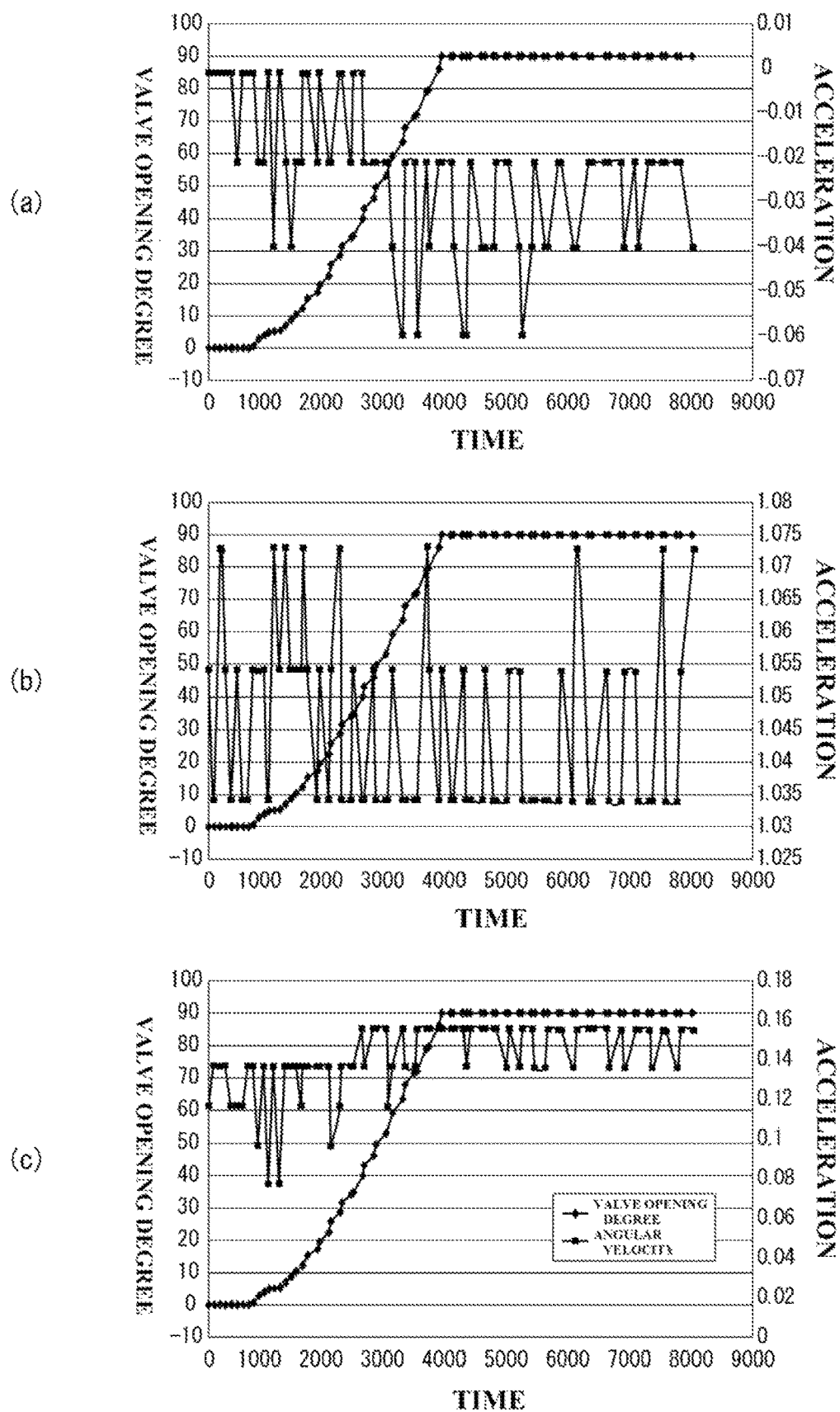
FIG. 35 is one example of an acceleration graph acquired in another example (initial motion).
Figure 36:
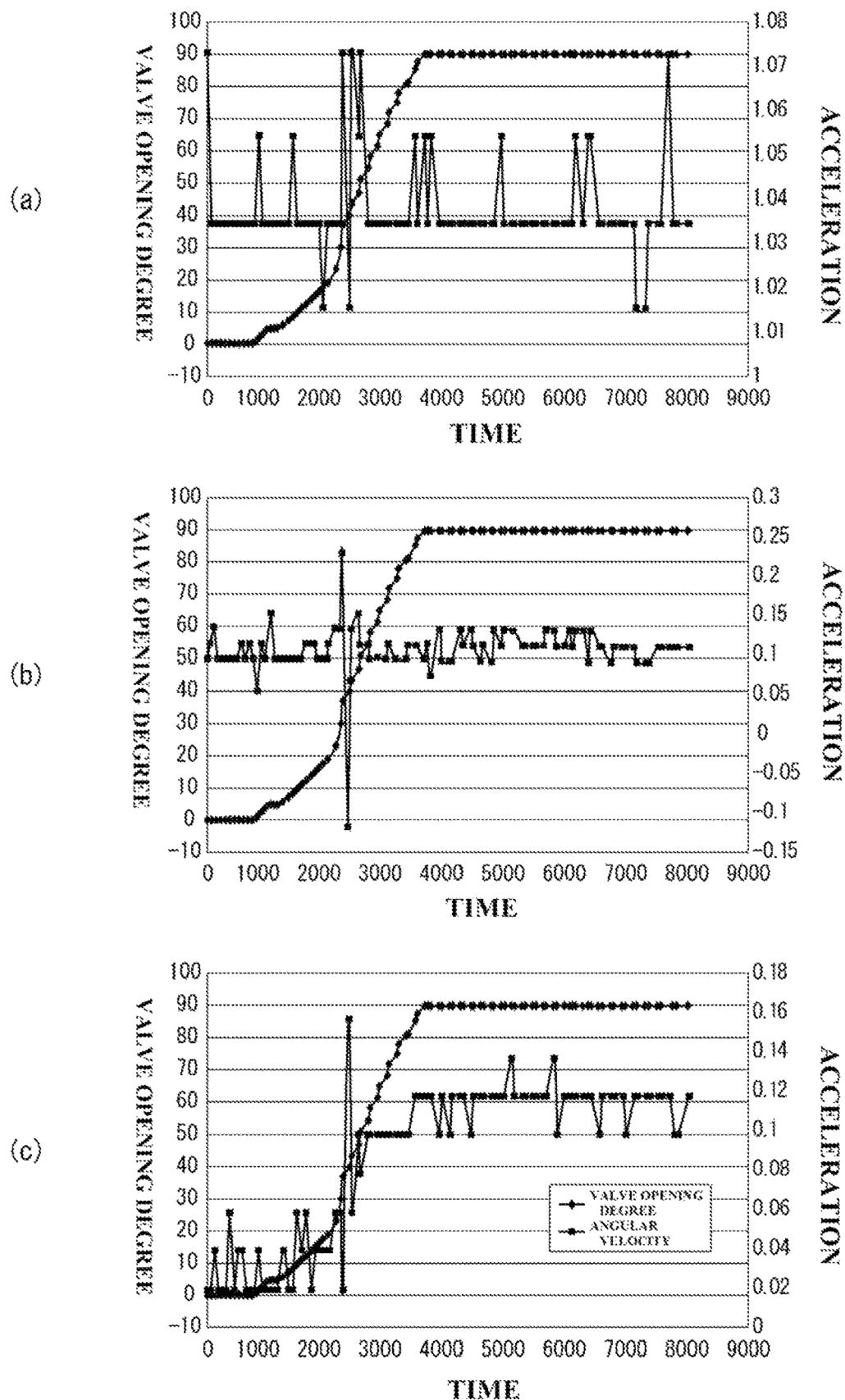
FIG. 36 is one example of an acceleration graph acquired in another example (twenty thousand times).

Note that FIG. 35 and FIG. 36 are graphs acquired by measuring a rotational motion by an acceleration sensor in place of the gyro sensor 7 under the same conditions as those depicted in the other examples (FIG. 25 to FIG. 30). This acceleration sensor is attached, although not depicted, to a position on the back surface side of the fitting 5 of the monitoring unit 1 to measure acceleration in three XYZ axes in FIG. 1. The measurement is performed at a position with approximately the same movement amount as that of the gyro sensor 7 incorporated in the monitoring unit 1.

In FIG. 35, acceleration is measured under conditions similar to those in FIG. 25 to FIG. 27. FIG. 35(*a*) is a graph of acceleration in the X-axis direction, FIG. 35(*b*) is a graph of acceleration in the Y-axis direction, and FIG. 35(*c*) is a graph of acceleration data in the Z-axis direction. The same goes for FIG. 36, and acceleration is measured under conditions similar to those in FIG. 28 to FIG. 30. FIG. 36(*a*) is a graph of acceleration in the X-axis direction, FIG. 36(*b*) is a graph of acceleration in the Y-axis direction, and FIG. 36(*c*) is a graph of acceleration data in the Z-axis direction. Also, while graph markings are similar to those of the other drawings, the right vertical axis in FIG. 35 and FIG. 36 represents acceleration, and both has extremely small increments (0.005 G to 0.02 G, G is acceleration of gravity).

As can be found from FIG. 35 and FIG. 36, for acceleration in any of three axis directions, only a pattern randomly fluctuating in an extremely small range can be acquired. Although a protruding peak-like pattern is partially measured, this is merely a pattern which appears only after setting an extremely small acceleration scale, and it cannot be said that measurement is not at a level of acquiring a graph pattern with accuracy practical to valve diagnosis. Thus, it has been confirmed that, although the acceleration sensor is an inertial sensor of the same type as that of the gyro sensor, the rotational motion of the valve cannot be captured only by the acceleration sensor with necessary accuracy.

While the embodiments of the present invention have been described in detail in the foregoing, the present invention is not limited to the description of the above embodiments, and can be variously changed in a range not deviating from the gist of the invention described in the scope of claim for patent of the present invention.

REFERENCE SIGNS LIST

1 monitoring unit (sensor unit)
2 actuator
3 ball valve (rotary valve)
4 control shaft (rotating shaft, valve stem)
7 gyro sensor
14 output shaft (rotating shaft, valve stem)
15 stem (rotating shaft, valve stem)
26*a*, 27*a*, 30*a* flow path
30 ball (valve body)
41 cloud server
42 database
A1, A2 ball seat (valve seat) (wear component)
B stem bearing (wear component)
C gland packing (wear component)
$T_1$, $T_2$, $T_3$ feature value

The invention claimed is:

1. A valve state grasping system comprising:
   a valve configured as a rotational valve for opening and closing a flow path by rotating a valve stem;
   a sensor unit including a motion sensor fixed to the valve stem; and
   a server communicably connected to the sensor unit and including a database,
   wherein the valve state is grasped based on output data relating to a rotation of the valve stem output from the motion sensor to the sensor unit and/or the server,
   wherein the database stores in advance and as reference data, the output data from an opening step, which is an opening degree divided into multiple steps between fully open and fully closed of the valve, measured by the sensor unit for a number of valve openings and closings, and
   wherein the sensor unit and/or the server include an abnormality diagnosis means for determining whether or not the output data actually measured by the motion sensor and the output data of the reference data satisfy an equality condition at a same number of valve openings and closings, and determining the valve state when it is determined that both the output data actually measured and the output data of the reference data satisfy the equality condition, and rewriting the output data of the reference data based on the output data actually measured by the motion sensor when it is determined that both the output data actually measured and the output data of the reference data do not satisfy the equality condition.

2. The valve state grasping system according to claim 1, wherein the reference data includes usage frequency data of the valve, and the abnormality diagnosis means uses the usage frequency data of the valve included in the reference data and the number of valve openings and closings to calculate a period until the valve fails, and notifies a replacement timing of the valve.

3. The valve state grasping system according to claim 1, wherein the motion sensor is a gyro sensor, and the output data is angular velocity data of the valve stem.

* * * * *